United States Patent
Masuda et al.

(10) Patent No.: US 11,547,987 B2
(45) Date of Patent: Jan. 10, 2023

(54) STRUCTURED CATALYST FOR OXIDATION FOR EXHAUST GAS PURIFICATION, METHOD FOR PRODUCING SAME, AUTOMOBILE EXHAUST GAS TREATMENT DEVICE, CATALYTIC MOLDING, AND GAS PURIFICATION METHOD

(71) Applicant: FURUKAWA ELECTRIC CO., LTD., Tokyo (JP)

(72) Inventors: Takao Masuda, Sapporo (JP); Yuta Nakasaka, Sapporo (JP); Takuya Yoshikawa, Sapporo (JP); Sadahiro Kato, Tokyo (JP); Masayuki Fukushima, Tokyo (JP); Hiroko Takahashi, Tokyo (JP); Yuichiro Banba, Tokyo (JP); Kaori Sekine, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 116 days.

(21) Appl. No.: 16/698,602

(22) Filed: Nov. 27, 2019

(65) Prior Publication Data
US 2020/0114339 A1 Apr. 16, 2020

Related U.S. Application Data

(63) Continuation of application No. PCT/JP2018/021084, filed on May 31, 2018.

(30) Foreign Application Priority Data

May 31, 2017 (JP) .............................. JP2017-108615
May 31, 2017 (JP) .............................. JP2017-108616
May 31, 2017 (JP) .............................. JP2017-108617

(51) Int. Cl.
*B01J 29/14* (2006.01)
*B01J 29/08* (2006.01)
(Continued)

(52) U.S. Cl.
CPC ............ *B01J 29/14* (2013.01); *B01D 53/944* (2013.01); *B01J 29/085* (2013.01); *B01J 29/16* (2013.01);
(Continued)

(58) Field of Classification Search
CPC .......... B01J 29/14; B01J 29/085; B01J 29/16; B01J 29/405; B01J 29/46; B01J 29/48;
(Continued)

(56) References Cited

U.S. PATENT DOCUMENTS 3,898,180 A 8/1975 Crooks et al.
4,552,855 A * 11/1985 Ozin ...................... B01J 29/061
502/60

(Continued)

FOREIGN PATENT DOCUMENTS

AU 2012324802 A1 6/2014
CA 2256515 A1 12/1997
(Continued)

OTHER PUBLICATIONS

English machine translation of CN 106362787 A, entitled "Preparation method for zeolite-immobilized photocatalyst" dated Feb. 1, 2017.
(Continued)

Primary Examiner — Anita Nassiri-Motlagh
(74) Attorney, Agent, or Firm — Dorsey & Whitney LLP

(57) ABSTRACT

The structured catalyst for oxidation for exhaust gas purification includes a support having a porous structure constituted by a zeolite-type compound, and at least one type of oxidation catalyst that is present in the support and selected
(Continued)

from the group consisting of metal and metal oxide, the support having channels that communicate with each other, and the oxidation catalyst being present in at least the channels of the support.

13 Claims, 4 Drawing Sheets

(51) Int. Cl.

| | | |
|---|---|---|
| B01J 29/16 | (2006.01) | |
| B01J 29/40 | (2006.01) | |
| B01J 29/46 | (2006.01) | |
| B01J 29/48 | (2006.01) | |
| B01J 29/65 | (2006.01) | |
| B01J 29/68 | (2006.01) | |
| B01J 29/69 | (2006.01) | |
| B01J 29/70 | (2006.01) | |
| B01J 29/76 | (2006.01) | |
| B01J 29/78 | (2006.01) | |
| B01J 35/00 | (2006.01) | |
| B01J 37/02 | (2006.01) | |
| F01N 3/28 | (2006.01) | |
| B01D 53/94 | (2006.01) | |
| B01J 35/04 | (2006.01) | |
| B01J 37/00 | (2006.01) | |
| B01J 37/10 | (2006.01) | |
| B01J 37/18 | (2006.01) | |

(52) U.S. Cl.
CPC ............ *B01J 29/405* (2013.01); *B01J 29/46* (2013.01); *B01J 29/48* (2013.01); *B01J 29/655* (2013.01); *B01J 29/68* (2013.01); *B01J 29/69* (2013.01); *B01J 29/7084* (2013.01); *B01J 29/7669* (2013.01); *B01J 29/7869* (2013.01); *B01J 35/006* (2013.01); *B01J 35/0013* (2013.01); *B01J 35/0066* (2013.01); *B01J 35/04* (2013.01); *B01J 37/0018* (2013.01); *B01J 37/0205* (2013.01); *B01J 37/0211* (2013.01); *B01J 37/10* (2013.01); *B01J 37/18* (2013.01); *F01N 3/2828* (2013.01); *B01D 2255/2042* (2013.01); *B01D 2255/2063* (2013.01); *B01D 2255/2073* (2013.01); *B01D 2255/2092* (2013.01); *B01D 2255/20738* (2013.01); *B01D 2255/20746* (2013.01); *B01D 2255/20753* (2013.01); *B01D 2255/20761* (2013.01); *B01D 2255/402* (2013.01); *B01D 2255/9155* (2013.01); *B01J 2229/14* (2013.01); *B01J 2229/186* (2013.01); *F01N 2330/06* (2013.01); *F01N 2330/30* (2013.01); *F01N 2370/04* (2013.01); *F01N 2510/063* (2013.01)

(58) Field of Classification Search
CPC ......... B01J 29/655; B01J 29/68; B01J 29/69; B01J 29/7084; B01J 29/7669; B01J 29/7869; B01J 35/0013; B01J 35/006; B01J 35/0066; B01J 35/04; B01J 37/0018; B01J 37/0205; B01J 37/0211; B01J 37/10; B01J 37/18; B01D 53/944; F01N 3/2828
USPC ..................................................... 423/245.3
See application file for complete search history.

(56) References Cited

U.S. PATENT DOCUMENTS

| | | | |
|---|---|---|---|
| 5,026,673 A | 6/1991 | Gates et al. | |
| 5,236,575 A | 8/1993 | Bennett et al. | |
| 5,275,720 A | 1/1994 | Ward | |
| 5,849,652 A | 12/1998 | Davies et al. | |
| 5,994,603 A | 11/1999 | Mohr et al. | |
| 6,040,259 A | 3/2000 | Mohr et al. | |
| 6,831,203 B1 | 12/2004 | Mohr et al. | |
| 6,881,703 B2* | 4/2005 | Cutler .................. | B01J 19/2485 502/439 |
| 7,074,373 B1 | 7/2006 | Warren et al. | |
| 7,592,291 B2 | 9/2009 | Rollins et al. | |
| 7,893,311 B2 | 2/2011 | Takamatsu et al. | |
| 11,161,101 B2 | 11/2021 | Kato et al. | |
| 2003/0109383 A1 | 6/2003 | Koike et al. | |
| 2003/0188991 A1 | 10/2003 | Shan et al. | |
| 2004/0176245 A1 | 9/2004 | Hagemeyer et al. | |
| 2004/0192947 A1 | 9/2004 | Chane-Ching et al. | |
| 2005/0201920 A1 | 9/2005 | Shan et al. | |
| 2006/0211777 A1 | 9/2006 | Severinsky | |
| 2006/0216227 A1 | 9/2006 | Idem et al. | |
| 2007/0167551 A1 | 7/2007 | Goodwin et al. | |
| 2008/0045400 A1 | 2/2008 | Rollins et al. | |
| 2008/0045403 A1 | 2/2008 | Rollins et al. | |
| 2008/0051280 A1 | 2/2008 | Hagemeyer et al. | |
| 2008/0072705 A1 | 3/2008 | Chaumonnot et al. | |
| 2008/0280754 A1 | 11/2008 | Toledo et al. | |
| 2008/0293990 A1 | 11/2008 | Stevenson et al. | |
| 2009/0286677 A1 | 11/2009 | Takeshima et al. | |
| 2009/0325790 A1 | 12/2009 | Haller et al. | |
| 2010/0004118 A1 | 1/2010 | Liu et al. | |
| 2011/0085944 A1 | 4/2011 | Rolllins et al. | |
| 2011/0092356 A1 | 4/2011 | Rollins et al. | |
| 2011/0092745 A1 | 4/2011 | Senoo et al. | |
| 2011/0121238 A1 | 5/2011 | Wakatsuki | |
| 2011/0293941 A1 | 12/2011 | Chaumonnot et al. | |
| 2012/0042631 A1 | 2/2012 | Schmieg et al. | |
| 2012/0060472 A1* | 3/2012 | Li ......................... | F01N 3/2073 60/274 |
| 2012/0130138 A1 | 5/2012 | Yamaguchi et al. | |
| 2012/0142238 A1 | 6/2012 | Saitou et al. | |
| 2012/0231948 A1 | 9/2012 | Saito | |
| 2013/0041174 A1 | 2/2013 | Yamamoto et al. | |
| 2013/0090445 A1 | 4/2013 | Hattori et al. | |
| 2014/0021096 A1 | 1/2014 | Chaumonnot et al. | |
| 2014/0128246 A1 | 5/2014 | Garcia-Martinez | |
| 2014/0147362 A1 | 5/2014 | Sasaki et al. | |
| 2014/0284524 A1 | 9/2014 | Lee et al. | |
| 2014/0303266 A1 | 10/2014 | Hyman | |
| 2015/0018590 A1 | 1/2015 | Stevenson et al. | |
| 2015/0290635 A1 | 10/2015 | Inokawa et al. | |
| 2015/0367332 A1 | 12/2015 | Kuvettu et al. | |
| 2016/0017238 A1 | 1/2016 | Stamires et al. | |
| 2016/0023913 A1 | 1/2016 | Goel et al. | |
| 2016/0024400 A1 | 1/2016 | Iwasa et al. | |
| 2016/0030934 A1 | 2/2016 | Zhan et al. | |
| 2016/0032202 A1 | 2/2016 | Yonemura et al. | |
| 2016/0087285 A1 | 3/2016 | Watanabe et al. | |
| 2016/0114314 A1 | 4/2016 | Ali et al. | |
| 2016/0137516 A1 | 5/2016 | Kegnæs et al. | |
| 2017/0036197 A1 | 2/2017 | Kegnæs et al. | |
| 2018/0194700 A1 | 7/2018 | Pan et al. | |
| 2019/0039056 A1 | 2/2019 | Kato et al. | |
| 2020/0094229 A1 | 3/2020 | Masuda et al. | |
| 2020/0094232 A1 | 3/2020 | Masuda et al. | |
| 2020/0108374 A1 | 4/2020 | Masuda et al. | |
| 2020/0108378 A1 | 4/2020 | Masuda et al. | |
| 2020/0114335 A1 | 4/2020 | Masuda et al. | |
| 2020/0114336 A1 | 4/2020 | Masuda et al. | |
| 2020/0114337 A1 | 4/2020 | Masuda et al. | |
| 2020/0114338 A1 | 4/2020 | Masuda et al. | |
| 2020/0114341 A1 | 4/2020 | Masuda et al. | |

(56) References Cited

U.S. PATENT DOCUMENTS

| | | | |
|---|---|---|---|
| 2020/0115248 A1 | 4/2020 | Masuda et al. | |
| 2020/0115640 A1 | 4/2020 | Masuda et al. | |
| 2020/0254432 A1 | 8/2020 | Shirman et al. | |

FOREIGN PATENT DOCUMENTS

| | | |
|---|---|---|
| CN | 1223602 A | 7/1999 |
| CN | 1720098 A | 1/2006 |
| CN | 1729138 A | 2/2006 |
| CN | 1876766 A | 12/2006 |
| CN | 101130466 A | 2/2008 |
| CN | 101180125 A | 5/2008 |
| CN | 101362959 A | 2/2009 |
| CN | 101720252 A | 6/2010 |
| CN | 101909750 A | 12/2010 |
| CN | 102056869 A | 5/2011 |
| CN | 102099114 A | 6/2011 |
| CN | 102247887 A | 11/2011 |
| CN | 102400744 A | 4/2012 |
| CN | 102574120 A | 7/2012 |
| CN | 102844115 A | 12/2012 |
| CN | 103459012 A | 12/2013 |
| CN | 103663490 A | 3/2014 |
| CN | 103889577 A | 6/2014 |
| CN | 104650291 A | 5/2015 |
| CN | 105008492 A | 10/2015 |
| CN | 105347359 A | 2/2016 |
| CN | 106362787 A | 2/2017 |
| EP | 0485180 A1 | 5/1992 |
| EP | 1709125 A1 | 10/2006 |
| EP | 2484444 A1 | 8/2012 |
| EP | 2692439 A1 | 2/2014 |
| EP | 2992984 A1 | 3/2016 |
| JP | S5746925 A | 3/1982 |
| JP | H0549943 A | 3/1993 |
| JP | H06-142456 A | 5/1994 |
| JP | H07-096195 A | 4/1995 |
| JP | H08155303 A | 6/1996 |
| JP | H1133412 A | 2/1999 |
| JP | H11151440 A | 6/1999 |
| JP | 2000197822 A | 7/2000 |
| JP | 2000511107 A | 8/2000 |
| JP | 2000323164 A | 11/2000 |
| JP | 2002255537 A | 9/2002 |
| JP | 2002336704 A | 11/2002 |
| JP | 2004528158 A | 9/2004 |
| JP | 2005189586 A | 7/2005 |
| JP | 2005270734 A | 10/2005 |
| JP | 2005314208 A | 11/2005 |
| JP | 2006021994 A | 1/2006 |
| JP | 2007130525 A | 5/2007 |
| JP | 2007519799 A | 7/2007 |
| JP | 2008012382 A | 1/2008 |
| JP | 2008542177 A | 11/2008 |
| JP | 2009505830 A | 2/2009 |
| JP | 2009255014 A | 11/2009 |
| JP | 2010501496 A | 1/2010 |
| JP | 2010099638 A | 5/2010 |
| JP | 2010527769 A | 8/2010 |
| JP | 4879574 B2 | 2/2012 |
| JP | 2012153654 A | 8/2012 |
| JP | 2012170951 A | 9/2012 |
| JP | 2012210557 A | 11/2012 |
| JP | 2013255911 A | 12/2013 |
| JP | 2014104428 A | 6/2014 |
| JP | 2014534902 A | 12/2014 |
| JP | 5700376 B2 | 4/2015 |
| JP | 2015165138 A | 9/2015 |
| JP | 2015189586 A | 11/2015 |
| JP | 2016002527 A | 1/2016 |
| JP | 2016064407 A | 4/2016 |
| JP | 2016069318 A | 5/2016 |
| JP | 2016087522 A | 5/2016 |
| JP | 2016529190 A | 9/2016 |
| JP | 2017039218 A | 2/2017 |
| JP | 2017064647 A | 4/2017 |
| JP | 2017128480 A | 7/2017 |
| WO | 9745197 A1 | 12/1997 |
| WO | 9745387 A1 | 12/1997 |
| WO | 2005083014 A1 | 9/2005 |
| WO | 2007023558 A1 | 3/2007 |
| WO | 2009096548 A1 | 8/2009 |
| WO | 2010097108 A1 | 9/2010 |
| WO | 2010097224 A2 | 9/2010 |
| WO | 2011065194 A1 | 6/2011 |
| WO | 2011517439 A | 6/2011 |
| WO | 2012105581 A1 | 8/2012 |
| WO | 2012170421 A1 | 12/2012 |
| WO | 2013057319 A2 | 4/2013 |
| WO | 2013115213 A1 | 8/2013 |
| WO | 2014083772 A1 | 6/2014 |
| WO | 2014132367 A1 | 9/2014 |
| WO | 2015001123 A2 | 1/2015 |
| WO | 2015155216 A1 | 10/2015 |
| WO | 2016014691 A1 | 1/2016 |
| WO | 2016181622 A1 | 11/2016 |
| WO | 2017000427 A1 | 1/2017 |
| WO | 2017072698 A1 | 5/2017 |

OTHER PUBLICATIONS

English machine translation of JP 2002255537 A entitled "Solid Acid Catalyst" dated Sep. 11, 2002.
English machine translation of JP 2005314208 A entitled "Combined Porous Body and its Manufacturing Method and Organic Substance Converting Method Using the Same" dated Nov. 10, 2005.
English machine translation of JP 2012170951 A entitled "Photocatalyst-Adsorbent Composite Powder" dated Sep. 10, 2012.
English machine translation of JP 2015165138 A entitled "Exhaust Gas Emission Control Device" dated Sep. 17, 2015.
English machine translation of JP 2016069318 A entitled "Storing Method for Secondary Alcohol and Loaded Body" dated May 9, 2016.
English machine translation of JP 2017128480 A entitled "Zeolite Including Metal Particle" dated Jul. 27, 2017.
English machine translation of JP H0549943A entitled "Oxidizing Catalyst" dated Mar. 2, 1993.
English machine translation of JPH1133412 entitled "A Production of Metal-Supporting Catalyst" dated Feb. 9, 1999.
English machine translation of WO 2007/023558 A1 entitled "Tungsten Oxide Photocatalyst, Process for Producing the Same, and Fiber Cloth Having Deodorizing/Antifouling Function" dated Mar. 1, 2007.
English machine translation of WO 2009/096548 A1 entitled "Silver-(Titanium Oxide)-Zeolite Adsorbent/Decomposing Material and Process for Production Thereof" dated Aug. 6, 2009.
English machine translation of WO 2012/105581 A1 entitled "Method for Producing Oxide Semiconductor Layer" dated Sep. 8, 2012.
Partial Supplemental European Search report received in EP App. No. 18810518.3 dated Jan. 11, 2021.
Dai, Chengyi et al., "Hollow Zeolite Encapsulated Ni—Pt Bimetals for Sintering and Coking Resistant Dry Reforming of Methane", Journal of Materials Chemistry A, vol. 3, No. 32, Jun. 29, 2015, pp. 16461-16468.
Liu, Xue et al., "Drying Of Ni/Alumina Catalysts: Control of the Metal Distribution Using Surfacants and the Melt Infiltration Methods", Industrial & Engineering Chemistry Research, vol. 53, No. 14, Apr. 9, 2014, pp. 5792-5800.
Makshina, Ekaterina et al., "Methanol Oxidation on LaCo Mixed Oxide Supported Onto MCM-41 Molecular Sieve", Catalysis Today, vol. 131, No. 1, Nov. 2007, pp. 427-430.
Maneesha, Mishra et al., "[alpha]-Fe2O3 as a photocatalytic material: A review", Applied Catalysis A: General, Elsevier, Amsterdam, NL, vol. 498, Mar. 28, 2015 (Mar. 28, 2015), pp. 126-141, XP029220089, ISSN: 0926-860X, DOI: 10.1016/J.APCATA.2015.03.023.
Wang, Hong et al., "Research into eliminating particulate from diesel engine exhaust over zeolite covered with catalysts of perovskite-

(56) References Cited

OTHER PUBLICATIONS type oxides", 2009 International Conference on Energy and Environment Technology : ICEET 2009 ; Guilin, China, Oct. 16-18, 2009, IEEE, Piscataway, NJ, USA, Oct. 16, 2009 (Oct. 16, 2009), pp. 493-495, XP031588294, ISBN: 978-0-7695-3819-8.
Yokoi, Toshiyuki , "Characterization of Zeolites by Advanced SEM/STEM Techniques", The Hitachi Scientific Instrument News, vol. 7, Sep. 2016, pp. 17-23.
Yue, Ming B. et al., "Directly Transforming as-Synthesized MCM-41 to Mesoporous MFI Zeolite", Journal of Material Chemistry, vol. 18, No. 17, Mar. 13, 2008, p. 2044.
Zhijie, Wu et al., Hydrothermal synthesis of L TA-encapsulated metal clusters and consequences for catalyst stability, reactivity, and selectivity, Journal of Catalysis, Academic Press, Duluth, MN, US, vol. 311, Jan. 31, 2014 (Jan. 31, 2014), pp. 458-468, XP028612174, ISSN 0021-9517, DOI: 10.1016/J.JCAT.2013.12.021.
English machine translation of JP 2000-511107 A, entitled "Metal-containing zeolite catalyst, its preparation and use for the conversion of hydrocarbons".
English machine translation of JPH0796195 A, entitled "Exhaust Gas Purification Catalyst" dated Sep. 29, 1993.
Extended European Search Report for EP Application No. 18810518.3, dated Mar. 23, 2021, https://sites.engineering.ucsb.edu/~jbraw/chemreacfun/ch7/slides-masswrxn-2up.pdf, College of Engineering, UC Santa Barbara accessed Apr. 26, 2021.
Dai, Chengyi et al., "Hollow zeolite-encapsulated Fe—Cu bimetallic catalysts for phenol degradation", Catalysis Today, Elsevier, Amsterdam, NL, vol. 297, Feb. 7, 2007 (Feb. 7, 2007), pp. 335-343, XP085215768, ISSN: 0920-5861, DOI: 10.1016/J.Cattod.2017.02.001.
Li, Shiwen et al., "Diffusion Driven Selectivity in Oxidation of Co in Presence of Propylene Using Zeolite Nano Shell as Membrane", ACS Catalysis, vol. 4, No. 12, Dec. 2014, pp. 4299-4303.
Li, Shiwen et al., "Diffusion-Driven Selectivity in Oxidation of Co in the Presence of Propylene Using Zeolite Nano Shell as Membrane", ACS Catalysis, vol. 4, No. 12, Nov. 2014.
English translation of International Preliminary Report on Patentability for Application No. PCT/JP2018/021084, dated Dec. 3, 2019.
English translation of Written Opinion for Application No. PCT/JP2018/021084, dated Jul. 31, 2018.
International Search Report (EN translation of ISR only) and Written Opinion for Application No. PCT/JP2018/021084, dated Jul. 31, 2018.
Fujikawa, Takashi , "Current Status and Future Prospects of Petroleum Refining Catalysts", The Nikkan Kogyo Shimbun, Ltd., vol. 65, No. 1, Jan. 1, 2017, p. 22.
Fumoto, Eri et al., "Catalytic Cracking of Heavy Oil With Iron Oxide-Based Catalysts Using Hydrogen and Oxygen Species From Steam", Journal of the Japan Petroleum Institute, vol. 58, No. 5, Feb. 25, 2015, 329-335.
Haruta, Masatake , "Low-Temperature Combustion Catalysts Mainly for Co Oxidation", Journal of The Japan Petroleum Institute, vol. 37, No. 5, Sep. 1, 1994, pp. 480-491.
Ichikawa, Masaru et al., "Advanced Technology of Methane Chemical Conversion", CMC Publishing Co., Ltd., Jan. 2008.
Ismagilov, Z.R. et al., "Structural Changes of MO/ZSM-5 Catalysts During the Ethane Dehydroaromatization", Eurasian Chemico-Technological Journal, Journal 12, Nov. 2009, 9-16.
Laprune, David et al., "Highly Dispersed Nickel Particles Encapsulated in Multi-Hollow Silicalite-1 Single Crystal Nanoboxes: Effects of Siliceous Deposits and Phosphorous Species on the Catalytic Performances", ChemCatChem, vol. 9, Issue 12, dated Feb. 18, 2017, pp. 2297-2307.
Muroi, Takajyo , "Development Trends of Methane Chemistry Catalysts", Catalyst Round-table Conference News, No. 96, Nov. 1, 2016.
Muroi, Takashiro , "Reverse Water Gas Shift Catalysts", Industrial Catalyst News, No. 107, Aug. 1, 2017, 2 pages.
Sasaki, Makoto et al., "Templating Fabrication of Platinum Nanoparticles and Nanowires Using the Confined Mesoporous Channels of FSM-16—Their Structural Characterization and Catalytic Performances in Water Gas Shift Reaction", Journal of Molecular Catalysis A: Chemical, vol. 141, No. 1/3, May 6, 1999, p. 223-240.
Wu, Zhijie et al., "Hydrothermal Synthesis of LTA-Encapsulated Metal Clusters and Consequences for Catalyst Stability, Reactivity, and Selectivity", Journal of Catalysis, vol. 311, dated Jan. 31, 2014, pp. 458-468.
Cho, Hong J. et al., "Zeolite-Encapsualted Pt Nanoparticlles for Tandem Catalysis", J. Am. Chem. Soc., Sep. 24, 2018, 13514-13520.
Li, Peijun et al., "Ultrastable Perovskite-Zeolite Composite Enabled by Encapsulation and In Situ Passivation", Angewandte Chemie International Edition vol. 59, Issue 51, Sep. 5, 2020, 23300-23306.
Wang, Junwen et al., "In Situ Encapsulated Pt Nanoparticles Dispersed in Low Temperature Oxygen for Partial Oxidation of Methane to Syngas", Catalysts, Aug. 27, 2019, 720-734.
English Translation of CN 102247887(A).
Wang, D Y. et al., Study on methane aromatization over MoO3/HMCM-49 catalyst, 2004, Catalysis Today, 93-95, Jul. 2, 2004, 75-80.
Do, Trong-On et al., "Zeolite Nanoclusters Coated onto the Mesopore Walls of SBA-15", J. Am. Chem. SOC. vol. 126, No. 44, 2004, pp. 14324-14325.
[English Translation] Notice of Reasons for Refusal dated Mar. 16, 2022 for Japanese Patent Application No. 2019-521322.
[English Translation] Notice of Reasons for Refusal dated Mar. 28, 2022 for Japanese Patent Application No. 2019-521324.
Cai et al. "Gold Nanoclusters Confined in a Supercage of Y Zeolite for Aerobic Oxidation of HMF under Mild Conditions", Chem. Rur. J, 2013, 19, pp. 14215-14223.
Corma et al. "A zeolite with interconnected 8-, 10-, and 12-ring pores and its unique catalytic selectivity", Nature Materials, vol. 2, Jun. 22, 2003, pp. 493-499.
Corma et al. "ITQ-15: The First ultralarge pore zeolite with a bi-directional pore system formed by intersecting 14- and 12-ring channels, and its catalytic implications", Chem. Commun., May 18, 2004, pp. 1356-1357.
Kalogeras et al. "Electrical Properties of Zeolitic Catalysts", Defect and Diffusion Forum vol. 164, Sep. 1998, pp. 1-36.
Mitra et al. "Molecular dynamics using quasielastic neutron scattering", Current Science, vol. 84, No. 5, Mar. 2003; pp. 653-662.
Nan Jiang et al. "The Adsorption Mechanisms of Organic Micropollutants on High-Silica Zeolites Causing S-Shaped Adsorption Isotherms: an Experimental and Monte Carlo Simulations Study", Chemical Engineering Journal; Nov. 2019; pp. all.
[English Translation] Notice of Reasons for Refusal dated Feb. 7, 2022 for Japanese Patent Application No. 2019-521334.
[English Translation] Notice of Reasons for Refusal dated Feb. 7, 2022 for Japanese Patent Application No. 2019-521335.
[English Translation] Notice of Reasons for Refusal dated Feb. 7, 2022 for Japanese Patent Application No. JP2019-521325.
[English Translation] Saudi Arabian Office Action dated Jan. 27, 2022 for Saudi Arabian Patent Application No. 519410663.
[English Translation] Notice of Reasons for Refusal dated Mar. 16, 2022 for Japanese Patent Application No. 2019-521331.
Newsam, J.M. , "The Zeolite Cage Structure", Science, Mar. 7, 1986, New Series, vol. 231, No. 2742, pp. 1093-1099 (Year: 1986).
Wen, et al., "Enhanced catalytic performance of Co/MFI by hydrothermal treatment", Catalysis Letters vol. 86, No. 1-3, Mar. 2003.
[English Translation] First Office Action dated May 16, 2022 for Chinese Patent Application No. 201880036071.3; pp. all.
[English Translation] First Office Action dated May 5, 2022 for Chinese Patent Application No. 201880036312.4; pp. all.
[English Translation] First Office Action dated May 7, 2022 for Chinese Patent Application No. 201880035210.0; pp. all.
[English Translation] Notice of Reasons for Refusal dated Jun. 6, 2022 for Japanese Patent Application No. 2019-521326; pp. all.
First Office Action dated May 6, 2022 for Australian Patent Application No. 2021202968; pp. all.

(56) References Cited

OTHER PUBLICATIONS

Dai, Chengyi, et al., "Hollow Zeolite encapsulated Ni-Pt bimetals for sintering and coking resistant dry reforming of methane", Journal of Materials Chemistry A, Jan. 1, 2015, 9 pages.
[Partial English Translation] Zhang, Yicheng, et al., "Advances in the catalysis of methanol to aromatics reaction", Chemical Industry and Engineering Progress, vol. 35 No. 3, Mar. 5, 2016, pp. 801-806.
[English Abstract] Zhang, Lian-Zhong, et al., "Preparation of Phenol and Acetone with Solid Acid Catalyst", [With Chemical World, Mar. 16, 2012, pp. 487-490.
[English Translation] First Office Action dated Apr. 20, 2022 for Chinese Patent Application No. 201880035803.7; pp. all.
[English Translation] Li, Jinlin, et al., "SBA-16 with Different Pore Size Supported Cobal Catalyst for Fischer-Tropsch Synthesis", Journal of South-Central University for Nationalities (National Science Edition); vol. 34 No. 4, Key Laboratory of Catalysis and Materials Science of the State, Ethnic Affairs Commission & Ministry of Education, Dec. 2015; pp. all.
[English Translation] Liu, Quansheng, et al., "Progress in Water-Gas-Shift Catalysts", Progress in Chemistry; vol. 17 No. 3; Institute of Chemical Engineering, Inner Mongolia University of Technology, Hohhot 010062, China, May 2005; pp. all.
[English Translation] Notice of Reasons for Refusal dated Jun. 28, 2022 for Japanese Patent Application No. 2019-521318; pp all.
[English Translation] Notice of Reasons for Refusal dated Jun. 28, 2022 for Japanese Patent Application No. 2019-521319; pp all.
[English Translation] Notice of Reasons for Refusal dated Jun. 28, 2022 for Japanese Patent Application No. 2019-521320; pp. all.
[English Translation] Notice of Reasons for Refusal dated Jun. 28, 2022 for Japanese Patent Application No. 2019-521321; pp. all.
[English Translation] First Office Action dated Jul. 11, 2022 for Chinese Patent Application No. 201880036382.X.
[English Translation] First Office Action dated Jul. 13, 2022 for Chinese Patent Application No. 201880035026.6.
[English Translation] First Office Action dated Jul. 5, 2022 for Chinese Patent Application No. 201880035017.7.
[English Translation] First Office Action dated Jun. 29, 2022 for Chinese Patent Application No. 201880036388.7.
[English Translation] First Office Action dated Jun. 27, 2022 for Chinese Patent Application No. 201880035525.5.
[English Translation] Notice of Reasons for Refusal dated Aug. 3, 2022 for Japanese Patent Application No. 2019-521322.
[English Translation] Notice of Reasons for Refusal dated Aug. 3, 2022 for Japanese Patent Application No. 2019-521331.
[English Translation] The First Office Action dated Jul. 20, 2022 for Chinese Patent Application No. 201880035173.3.
[English Translation] The First Office Action dated Jul. 20, 2022 for Chinese Patent Application No. 201880035360.1.
Dai, Chengyi, et al., "Synthesis of Hollow Nanocubes and Macroporous Monoliths of Silicalite-1 by Alkaline Treatment", Chemistry of Materials, Oct. 7, 2013, pp. 4197-4205.
Hosseinpour, Negahdar, et al., "Cumene cracking activity and enhanced regeneration of FCC catalystscomprising HY-zeolite and $LaBO_3$(B=Co, Mn, and Fe) perovskites", Applied Catalysis A, vol. 487,, Oct. 2014, pp. 26-35.
Laprune, David, et al., "Highly Disperesed Nickel Particles Encapsulated in Multihollow Silicalite-1 Single Crystal Nanoboxes: Effects of Siliceous Deposits and Phosphorous Species on the Catalytic Performances", ChemCatChem, Sep. 2017, pp. 2297-2307.
Liang, Wenping, et al., "Surfactant Applications in Dispersion Systems", China Light Industry Press, Feb. 2003.
Miao, Tao, et al., "Highly dispersed nickel within mesochannels of SBA-15 for CO methanation with enhanced activity and excellent thermostability", Fuel, Journal vol. 188, No. 12; homepage: www.elsevier.com/locate/fuel, 2017, pp. 267-276.
Roque-Malherbe, Rolando M.A., "Adsorption and Diffusion in Nanoporous Materials", Materials Chemistry, Mar. 5, 2007.
[English Translation] First. Office Action dated August 3. 2022 for Chinese Patent Application No. 201880035569.8, pp. all.
[English Translation] First. Office Action dated Aug. 3, 2022 for Chinese Patent Application No. 201880036313.9, pp, all.
[English Translation] Notice of Reasons for Refusal dated Aug. 16, 2022 for Japanese Patent Application No. 2019-521324, pp. all.
[English Translation] "Preparation and Application of Molecular Sieves", Edited by Shanghai Reagent Factory, Jun. 1976, pp. all.
[English Translation] Notice of Reasons for Refusal dated Sep. 27, 2022 for Japanese Patent Application No. 2019-521325; pp. all.
[English Translation] Notice of Reasons for Refusal dated Sep. 27, 2022 for Japanese Patent Application No. 2019-521334, pp. all.
[English Translation] Notice of Reasons for Refusal dated Sep. 27, 2022 for Japanese Patent Application No. 2019-521335, pp. all.
[English Translation] Notice of Reasons for Refusal for Japanese Patent Application No. 2019-521325 dated Sep. 27, 2022, pp. all.
[English Translation] Notice of Reasons for Refusal for Japanese Patent Application No. 2019-521334, dated Sep. 27, 2022, pp. all.
[English Translation] Notice of Reasons for Refusal for Japanese Patent Application No. 2019-521335, dated Sep. 27, 2022, pp. all.
[English Translation] Notice of Reasons for Refusal for Japanese Patent Application No. 2019-521326 dated Nov. 25, 2022, pp. all.
[English Translation] Second Office Action for Chinese Patent Application No. 201880035803.7 dated Nov. 10, 2022, pp. all.
[English Translation] Second Office Action for Chinese Patent Application No. 201880036312.4 dated Nov. 10, 2022, pp. all.
[English Translation] Zhong, Bangke, "Catalysis i Fine chemical process", Sinopec Press; ISBN 7-80164-251-1, Aug. 2002, 4 pages.

\* cited by examiner

STRUCTURED CATALYST FOR OXIDATION FOR EXHAUST GAS PURIFICATION, METHOD FOR PRODUCING SAME, AUTOMOBILE EXHAUST GAS TREATMENT DEVICE, CATALYTIC MOLDING, AND GAS PURIFICATION METHOD

CROSS REFERENCE TO RELATED APPLICATIONS

The present application is a continuation application of International Patent Application No. PCT/JP2018/021084 filed on May 31, 2018, which claims priority to Japanese Patent Application No. 2017-108615, filed on May 31, 2017, Japanese Patent Application No. 2017-108616, filed on May 31, 2017, and Japanese Patent Application No. 2017-108617, filed on May 31, 2017. The contents of these applications are incorporated herein by reference in their entirety.

TECHNICAL FIELD

The present disclosure relates to a structured catalyst for oxidation for exhaust gas purification, a method for producing the same, an automobile exhaust gas treatment device, a catalytic molding, and a gas purification method.

BACKGROUND ART

As the environmental awareness increases in recent years, automobile exhaust gas regulations are getting more severe. Exhaust gases discharged from automobiles include hazardous substances such as carbon monoxide (CO), hydrocarbons (HC), and particulate matter (PM). Environmental standards require that the amounts of these hazardous substances in the exhaust gas be less than or equal to predetermined concentrations. In particular, exhaust gas discharged from diesel engine cars contains large amounts of hazardous substances, so that reduction of the hazardous substances in exhaust gas is strongly demanded.

Therefore, in the related art, exhaust gas treatment devices are installed in automobiles, whereby the amounts of hazardous substances in the exhaust gas are reduced so as to conform to environmental standards. For example, gaseous hazardous substances such as carbon monoxide and hydrocarbons are detoxified by oxidation with an oxidation catalyst. In addition, particulate matter is collected and removed with a filter. However, due to the fact that particulate matter is deposited in the filter over time of use and the pressure loss in the filter increases, the collecting efficiency of the particulate matter is reduced. In addition, particulate matter deposited in the filter causes reduction of engine output and deterioration of fuel consumption. The particulate matter is composed of, for example, solid soot and soluble organic fractions (SOF). Thus, particulate matter collected in the filter is combusted and oxidized to remove the particulate matter, and thus the filter is regenerated.

In order to efficiently perform oxidation of the gaseous hazardous substances and particulate matter described above, oxidation catalysts are typically used. These oxidation catalysts are generally supported on a heat resistant support.

U.S. 2003/0,109,383 proposes a ceramic catalyst body as a structured catalyst for exhaust gas purification for diesel cars, in which a ceramic support is disposed on a ceramic surface of a substrate, and both a main catalyst component and a co-catalyst component are supported on the ceramic support. In this ceramic catalyst body, a large number of pores formed from lattice defects and the like in the crystal lattice are formed in the surface of a ceramic support made of γ-alumina, and a main catalyst component including Ce—Zr, Pt, and the like is directly supported near the surface of the ceramic support.

Journal of the Society of Oil Engineers (1994) vol. 37, No. 5, p. 480 to 491 reports catalytic activity of oxidation catalysts composed of various metals and metal oxides in a CO oxidation reaction. More specifically, it is reported that $Ag_2O$, $Co_3O_4$, $MnO_2$, CuO, NiO, $Cr_2O_3$, $Fe_2O_3$, $SnO_2$, CdO, ZnO, $TiO_2$, $V_2O_5$, $MoO_3$, $WO_3$, $Bi_2O_3$, MgO, $Al_2O_3$, $SiO_2$, Pd, Pt, Au, and others have catalytic activity in a CO oxidation reaction (Table 1).

SUMMARY OF DISCLOSURE

Technical Problem

In a car, a device for removing other hazardous substances in an exhaust gas is normally disposed at the subsequent stage of the exhaust gas treatment device having an oxidation catalyst (downstream in the direction in which exhaust gas flows). For example, a device for reducing nitrogen oxide ($NO_x$) contained in the exhaust gas is disposed at the subsequent stage of the exhaust gas treatment device having an oxidation catalyst. The main flow of this reduction device is one in which the reduction of nitrogen oxides is performed by ammonia ($NH_3$) produced by hydrolysis of urea. When the exhaust gas becomes high temperature, the oxidation catalyst supported in the exhaust gas treatment device may scatter to the reduction device at the subsequent stage. The scattered oxidation catalyst is mixed into the reduction device at the subsequent stage. When a catalyst having high oxidation force for Pt and others is used as the oxidation catalyst, ammonia in the reduction device is oxidized by the oxidation catalyst and turns to a nitrogen oxide. As a result, ammonia in the reduction device cannot function so as to reduce the nitrogen oxide in the exhaust gas, whereby the purification rate for the nitrogen oxide by the reduction device is reduced.

Furthermore, high-temperature exhaust gas is discharged for a long time from an automobile during operation. Therefore, the oxidation catalyst is required to secure stability and reliability during long-term use, and excellent heat resistance. Known oxidation catalysts are supported in a dispersed state on the surface of supports at normal temperature and normal pressure. However, in the temperature region at 300° C. or higher where the oxidation catalyst functions, the oxidation catalyst moves on the support, and the oxidation catalysts cause aggregation and calcination. This reduces the effective surface area of the oxidation catalyst, and thus decreases the catalytic activity. In addition, a typical exhaust gas treatment device requires an overabundant amount of oxidation catalyst, because an excessive amount of the oxidation catalyst is supported on the support on the assumption of reduction in catalytic activity. This leads to cost increase.

Furthermore, the exhaust gas from an automobile may contain components that become catalyst poisons for oxidation catalysts. For example, when palladium (Pd) was used as the oxidation catalyst and sulfur dioxide ($SO_2$) was contained in the exhaust gas, sulfur dioxide strongly and chemically adsorbed to palladium to form a stable adsorption layer on the surface of the oxidation catalyst. As a result, the activity of the oxidation catalyst decreased, and its purification function for target hazardous substances markedly decreased. Therefore, in the related art, reactivation of the oxidation catalyst was performed by heating the oxidation catalyst periodically, thereby subjecting the catalyst poisons adsorbed to the oxidation catalyst to heat desorption. However, there is a problem that the oxidation catalyst can cause aggregation and fusion as described above when subjected to the heat treatment, and its catalytic activity decreases.

An object of the present disclosure is to provide a structured catalyst for oxidation for exhaust gas purification, a method for producing the same, an exhaust gas treatment device for automobiles, a catalytic molding, and a gas purification method, the structured catalyst can realize a long life time by suppressing the decline in catalytic function of the oxidation catalyst and can attempt to save resources without requiring a complicated replacement operation.

Solution to Problem

As a result of diligent research to achieve the object described above, the present inventors have found that the structured catalyst for oxidation for exhaust gas purification that can suppress the decline in function of the oxidation catalyst (e.g., catalytic function) and that can realize a long life time can be obtained by including:

a support of a porous structure composed of a zeolite-type compound; and at least one oxidation catalyst present in the support and being selected from the group consisting of metals and metal oxides, in which the support has channels that communicate with each other, and the oxidation catalyst is present at least in the channels of the support, and thus completed the present disclosure based on such finding.

The summary configurations of the present disclosure are as follows.

[1] A structured catalyst for oxidation for exhaust gas purification, including:

a support of a porous structure composed of a zeolite-type compound; and at least one oxidation catalyst present in the support and selected from the group consisting of metals and metal oxides, in which the support has channels that communicate with each other, and the oxidation catalyst is present at least in the channels of the support.

[2] The structured catalyst for oxidation for exhaust gas purification according to [1], in which the metal oxides contain at least one perovskite-type oxide.

[3] The structured catalyst for oxidation for exhaust gas purification according to [1], in which the channels have any one of a one-dimensional pore, a two-dimensional pore, and a three-dimensional pore defined by a framework of the zeolite-type compound and an enlarged pore portion that is different from any of the one-dimensional pore, the two-dimensional pore, and the three-dimensional pore, and the oxidation catalyst is present at least in the enlarged pore portion.

[4] The structured catalyst for oxidation for exhaust gas purification according to [3], in which the enlarged pore portion causes a plurality of pores constituting any one of the one-dimensional pore, the two-dimensional pore, and the three-dimensional pore to communicate with each other.

[5] The structured catalyst for oxidation for exhaust gas purification according to [3], in which the oxidation catalyst is made of at least one type of oxidation catalytic nanoparticles selected from the group consisting of metal nanoparticles and metal oxide nanoparticles, and an average particle size of the oxidation catalytic nanoparticles is greater than an average inner diameter of the channels and is less than or equal to an inner diameter of the enlarged pore portion.

[6] The structured catalyst for oxidation for exhaust gas purification according to [5], in which the oxidation catalytic nanoparticles are made of at least one type of metal selected from the group consisting of cobalt, iron, copper, silver, manganese, nickel, chromium, tin, zinc, titanium, and platinum, and oxides of the metals.

[7] The structured catalyst for oxidation for exhaust gas purification according to [5], in which the average inner diameter of the channels is from 0.1 nm to 1.5 nm, and the inner diameter of the enlarged pore portion is from 0.5 nm to 50 nm.

[8] The structured catalyst for oxidation for exhaust gas purification according to [5], in which the content of the metal element (M) of the oxidation catalytic nanoparticles is from 0.5 to 2.5 mass % with respect to the oxidation catalyst.

[9] The structured catalyst for oxidation for exhaust gas purification according to [5], in which an average particle size of the metal oxide nanoparticles is from 0.1 nm to 50 nm.

[10] The structured catalyst for oxidation for exhaust gas purification according to [9], in which an average particle size of the metal oxide nanoparticles is from 0.5 nm to 14.0 nm.

[11] The structured catalyst for oxidation for exhaust gas purification according to [5], in which the ratio of the average particle size of the metal oxide nanoparticles to the average inner diameter of the channels is from 0.06 to 500.

[12] The structured catalyst for oxidation for exhaust gas purification according to [11], in which the ratio of the average particle size of the metal oxide nanoparticles to the average inner diameter of the channels is from 0.1 to 36.

[13] The structured catalyst for oxidation for exhaust gas purification according to [12], in which the ratio of the average particle size of the metal oxide nanoparticles to the average inner diameter of the channels is from 1.7 to 4.5.

[14] The structured catalyst for oxidation for exhaust gas purification according to [5], in which the average particle size of the metal nanoparticles is from 0.08 nm to 30 nm.

[15] The structured catalyst for oxidation for exhaust gas purification according to [14], in which the average particle size of the metal nanoparticles is from 0.4 nm to 11.0 nm.

[16] The structured catalyst for oxidation for exhaust gas purification according to [5], in which the ratio of the average particle size of the metal nanoparticles to the average inner diameter of the channels is from 0.05 to 300.

[17] The structured catalyst for oxidation for exhaust gas purification according to [16], in which the ratio of the average particle size of the metal nanoparticles to the average inner diameter of the channels is from 0.1 to 30.

[18] The structured catalyst for oxidation for exhaust gas purification according to [17], in which the ratio of the average particle size of the metal nanoparticles to the average inner diameter of the channels is from 1.4 to 3.6.

[19] The structured catalyst for oxidation for exhaust gas purification according to [1], further including at least another one functional substance held on an outer surface of the support.

[20] The structured catalyst for oxidation for exhaust gas purification according to [19], in which the content of the at least one oxidation catalyst present in the support is greater than that of at least the other one functional substance held on the outer surface of the support.

[21] The structured catalyst for oxidation for exhaust gas purification according to [1], in which the zeolite-type compound is a silicate compound.

[22] An automobile exhaust gas treatment device including the structured catalyst for oxidation for exhaust gas purification described in [1].

[23] A catalytic molding including a honeycomb substrate and the structured catalyst for oxidation for exhaust gas purification described in [1] on a surface of the honeycomb substrate.

[24] A method for producing a structured catalyst for oxidation for exhaust gas purification, including:
a calcination step of a precursor material (B) obtained by impregnating a precursor material (A) for obtaining a support of a porous structure composed of zeolite-type compound with a metal-containing solution; and
a hydrothermal treatment step of hydrothermally treating a precursor material (C) obtained by calcining the precursor material (B) to obtain the support and an oxidation catalyst present in the support.

[25] The method for producing a structured catalyst for oxidation for exhaust gas purification according to [24], further including a step of performing reduction treatment on the hydrothermally treated precursor material (C) after the hydrothermal treatment step.

[26] The method for producing a structured catalyst for oxidation for exhaust gas purification according to [24], in which from 50 to 500 mass % of a non-ionic surfactant is added to the precursor material (A) before the calcination step.

[27] The method for producing a structured catalyst for oxidation for exhaust gas purification according to [24], in which the precursor material (A) is impregnated with the metal-containing solution by adding the metal-containing solution to the precursor material (A) in multiple portions before the calcination step.

[28] The method for producing a structured catalyst for oxidation for exhaust gas purification according to [24], in which in impregnating the precursor material (A) with the metal-containing solution before the calcination step, a value obtained by converting the added amount of the metal-containing solution added to the precursor material (A) to a ratio of silicon (Si) constituting the precursor material (A) to a metal element (M) included in the metal-containing solution added to the precursor material (A) (a ratio of number of atoms Si/M) is adjusted to from 10 to 1000.

[29] The method for producing a structured catalyst for oxidation for exhaust gas purification according to [24], in which in the hydrothermal treatment step, the precursor material (C) and a structure directing agent are mixed.

[30] The method for producing a structured catalyst for oxidation for exhaust gas purification according to [25], in which the hydrothermal treatment step is performed in a basic condition.

[31] A gas purification method for purifying a gas containing carbon monoxide and hydrocarbon using a structured catalyst, in which the structured catalyst includes a support of a porous structure composed of a zeolite-type compound and at least one type of oxidation catalyst being present in the support and selected from the group consisting of metals and metal oxides, the support has channels that communicate with each other, and the oxidation catalyst is present in at least the channels of the support.

[32] The gas purification method according to [31], in which the structured catalyst is a structured catalyst for oxidation for exhaust gas purification described in [1].

[33] The gas purification method according to [32], in which the gas is discharged from an internal combustion engine.

[34] A gas purification method for purifying gas discharged from an internal combustion engine with the automobile exhaust gas treatment device described in [22].

Advantageous Effects of Disclosure

Provided is a structured catalyst for oxidation for exhaust gas purification, a method for producing the same, an automobile exhaust gas treatment device, a catalytic molding, and a gas purification method, the structured catalyst for oxidation realizing a long life time by suppressing the decline in catalytic function of the oxidation catalyst and saving resources without requiring a complicated replacement operation can be provided.

BRIEF DESCRIPTION OF DRAWINGS

FIG. 1A is a perspective view (partially shown in cross-section), and FIG. 1B is a partially enlarged cross-sectional view.

FIG. 2A is a diagram illustrating the function of a sieve, and FIG. 2B is a diagram explaining the catalytic function.

DESCRIPTION OF EMBODIMENTS

Hereinafter, embodiments of the present disclosure will be described in detail with reference to drawings.
Configuration of Structured Catalyst for Oxidation for Exhaust Gas Purification The structured catalyst for oxidation for exhaust gas purification of one embodiment includes a support of a porous structure composed of a zeolite-type compound, and at least one type of oxidation catalyst that is present in the support and selected from the group consisting of metals and metal oxides, the support having channels that communicate with each other, and the oxidation catalyst being present in at least the channels of the support.

Figure 1A:
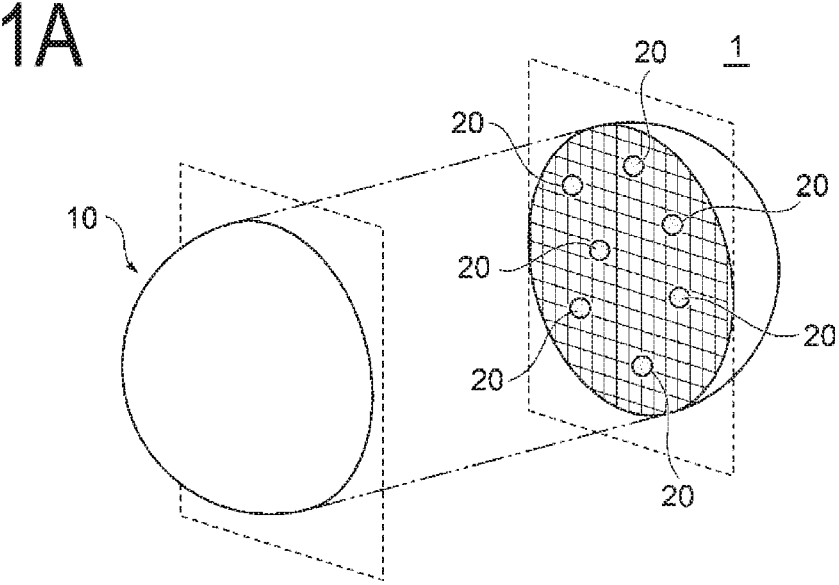
FIGS. 1A and 1B are diagrams schematically illustrating a structured catalyst for oxidation for exhaust gas purification according to an embodiment of the present disclosures [[o]] that the inner structure can be understood.
Figure 1B:
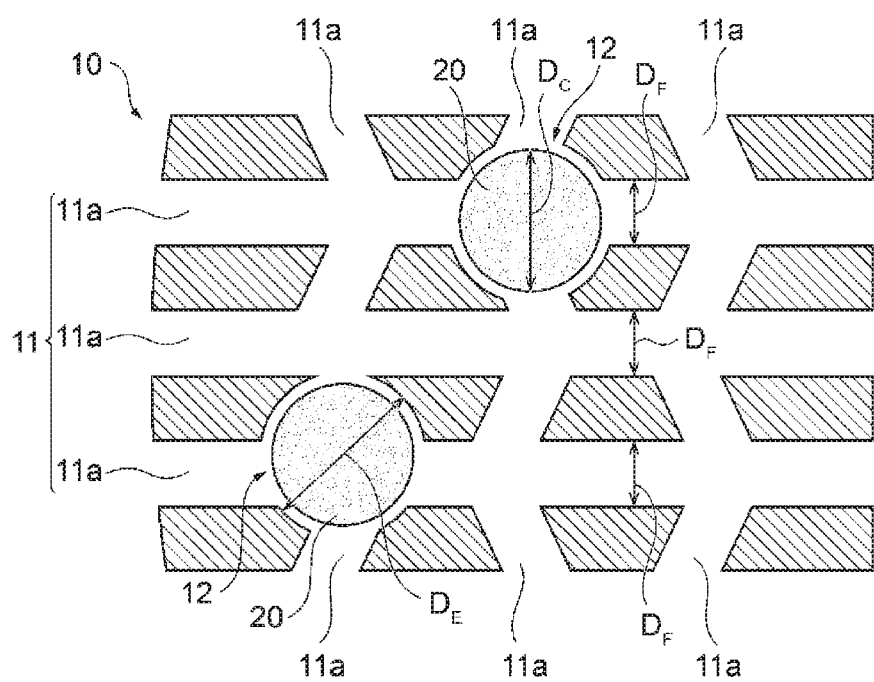

FIGS. 1A and 1B are diagrams schematically illustrating a configuration of a structured catalyst for oxidation for exhaust gas purification according to an embodiment of the present disclosure. FIG. 1A is a perspective view (partially shown in cross-section), and FIG. 1B is a partially enlarged cross-sectional view. The structured catalyst for oxidation for exhaust gas purification in FIGS. 1A and 1B are examples thereof, and the shape, dimension, and the like of each of the configurations according to the present disclosure are not limited to those illustrated in FIGS. 1A and 1B.

As illustrated in FIG. 1A, a structured catalyst for oxidation for exhaust gas purification 1 includes a support 10 of a porous structure composed of a zeolite-type compound, and at least one oxidation catalyst 20 present in the support 10.

The oxidation catalyst 20 is a catalytic substance having catalytic function by working alone or in cooperation with the support 10. The support 10 supports a catalytic substance. The oxidation catalyst 20 may have one or a plurality of functions other than a catalytic function, and examples of the function other than the catalytic function include light emission (or fluorescent) functions, light-absorbing functions, and identification functions.

In the structured catalyst for oxidation for exhaust gas purification 1, a plurality of oxidation catalysts 20, 20, . . . are embedded in the porous structure of the support 10. The catalytic substance as an example of the oxidation catalyst 20 is at least one type selected from the group consisting of metals and metal oxides, and the metal oxide may contain at least one perovskite-type oxide. The oxidation catalyst 20 is preferably made of at least one type of oxidation catalytic nanoparticles selected from the group consisting of metal nanoparticles and metal oxide nanoparticles. The metal nanoparticles and metal oxide nanoparticles are described in detail below.

The support 10 is a porous structure, and as illustrated in FIG. 1B, a plurality of pores 11a, 11a, . . . are preferably formed so as to have channels 11 that communicate with each other. Here, the oxidation catalyst 20 is present at least in the channel 11 of the support 10, and is preferably held at least in the channel 11 of the support 10.

With such a configuration, movement of the oxidation catalyst 20 within the support 10 is restricted, and aggregation between the oxidation catalysts 20 and 20 is effectively prevented. As a result, the decrease in effective surface area of the oxidation catalyst 20 can be effectively suppressed, and the function of the oxidation catalyst 20 lasts for a long period of time. In other words, according to the structured catalyst for oxidation for exhaust gas purification 1, the decline in function due to aggregation of the oxidation catalyst 20 can be suppressed, and the life of the structured catalyst for oxidation for exhaust gas purification 1 can be extended. In addition, due to the long life time of the structured catalyst for oxidation for exhaust gas purification 1, the replacement frequency of the structured catalyst for oxidation for exhaust gas purification 1 can be reduced, and the amount of waste of the used structured catalyst for oxidation for exhaust gas purification 1 can be significantly reduced, and thereby can save resources.

Typically, when the structured catalyst for oxidation for exhaust gas purification is used in a fluid (e.g., an exhaust gas containing carbon monoxide (CO), hydrocarbon (HC), particulate matter (PM), etc.), it can be subjected to external forces from the fluid. In this case, if the oxidation catalyst is only held in the state of attachment to the outer surface of the support 10, there is a problem in that it is easy to disengage from the outer surface of the support 10 due to the influence of external force from the fluid. In contrast, in the structured catalyst for oxidation for exhaust gas purification 1, the oxidation catalyst 20 is held at least in the channel 11 of the support 10, and therefore, even if subjected to an external force caused by a fluid, the oxidation catalyst 20 is less likely to detach from the support 10. That is, when the structured catalyst for oxidation for exhaust gas purification 1 is in the fluid, the fluid flows into the channel 11 from the pore 11a of the support 10, so that the speed of the fluid flowing through the channel 11 is slower than the speed of the fluid flowing on the outer surface of the support 10 due to the flow path resistance (frictional force). Due to the influence of such flow path resistance, the pressure experienced by the oxidation catalyst 20 held in the channel 11 from the fluid is lower than the pressure at which the oxidation catalyst is received from the fluid outside of the support 10. As a result, detachment of the oxidation catalyst 20 present in the support 11 can be effectively suppressed, and the function of the oxidation catalyst 20 can be stably maintained over a long period of time. Note that the flow path resistance as described above is thought to be larger so that the channel 11 of the support 10 has a plurality of bends and branches, and the interior of the support 10 becomes a more complex three-dimensional structure.

Preferably, the channel 11 has any one of a one-dimensional pore, a two-dimensional pore, and a three-dimensional pore defined by the framework of the zeolite-type compound and an enlarged pore portion which has a diameter different from that of any of the one-dimensional pore, the two-dimensional pore, and the three-dimensional pore. In this case, the oxidation catalyst 20 is preferably present at least in the enlarged pore portion 12. More preferably, the oxidation catalyst 20 is embedded at least in the enlarged pore portion 12. Here, the "one-dimensional pore" refers to a tunnel-type or cage-type pore forming a one-dimensional channel, or a plurality of tunnel-type or cage-type pores (a plurality of one-dimensional channels) forming a plurality of one-dimensional channels. Also, the "two-dimensional pore" refers to a two-dimensional channel in which a plurality of one-dimensional channels are connected two-dimensionally. The "three-dimensional pore" refers to a three-dimensional channel in which a plurality of one-dimensional channels is connected three-dimensionally. As a result, the movement of the oxidation catalyst 20 within the support 10 is further restricted, and it is possible to further effectively prevent separation of the oxidation catalyst 20 and aggregation between the oxidation catalysts 20, 20. The term "embedding" refers to a state in which the oxidation catalyst 20 is included in the support 10. At this time, the oxidation catalyst 20 and the support 10 need not necessarily be in direct contact with each other, but may be indirectly held by the support 10 with other substance (e.g., a surfactant, etc.) interposed between the oxidation catalyst 20 and the support 10.

Although FIG. 1B illustrates the case in which the oxidation catalyst 20 is embedded in the enlarged pore portion 12, the oxidation catalyst 20 is not limited to this configuration only, and the oxidation catalyst 20 may be present in the channel 11 with a portion thereof protruding outward of the enlarged pore portion 12. Furthermore, the oxidation catalyst 20 may be partially embedded in a portion of the channel 11 other than the enlarged pore portion 12 (for example, an inner wall portion of the channel 11), or may be held by fixing, for example. Additionally, the enlarged pore portion 12 preferably connects with the plurality of pores 11a, 11a constituting any one of the one-dimensional pore, the two-dimensional pore, and the three-dimensional pore. As a result, a separate channel different from the one-dimensional pore, the two-dimensional pore, or the three-dimensional pore is provided in the interior of the support 10, so that the function of the oxidation catalyst 20 can be further exhibited.

Additionally, the channel 11 is formed three-dimensionally by including a branch portion or a merging portion within the support 10, and the enlarged pore portion 12 is preferably provided in the branch portion or the merging portion of the channel 11.

The average inner diameter $D_F$ of the channel 11 formed in the support 10 is calculated from the average value of the short diameter and the long diameter of the pore 11a constituting any of the one-dimensional pore, the two-dimensional pore, and the three-dimensional pore. For example, it is from 0.1 nm to 1.5 nm, and preferably from 0.5 nm to 0.8 nm. The inner diameter $D_E$ of the enlarged pore portion 12 is from 0.5 nm to 50 nm, for example. The inner diameter $D_E$ is preferably from 1.1 nm to 40 nm, and more preferably from 1.1 nm to 3.3 nm. For example, the inner diameter $D_E$ of the enlarged pore portion 12 depends on the pore diameter of the precursor material (A) described below and the average particle size $D_C$ of the oxidation catalyst 20 present therein. The inner diameter $D_E$ of the enlarged pore portion 12 is sized so that it allows the presence of the oxidation catalyst 20.

The support 10 is composed of a zeolite-type compound. Examples of zeolite-type compounds include zeolite analog compounds such as zeolites (alminosilicate salts), cation exchanged zeolites, silicate compounds such as silicalite, alminoborate salts, alminoarsenate salts, and germanate salts; and phosphate-based zeolite analog materials such as molybdenum phosphate. Among these, the zeolite-type compound is preferably a silicate compound.

The framework of the zeolite-type compound is selected from FAU type (Y type or X type), MTW type, MFI type (ZSM-5), FER type (ferrierite), LTA type (A type), MWW type (MCM-22), MOR type (mordenite), LTL type (L type), and BEA type (beta type). Preferably, it is MFI type, and more preferably ZSM-5. A plurality of pores having a pore diameter corresponding to each framework is formed in the zeolite-type compound. For example, the maximum pore diameter of MFI type is 0.636 nm (6.36 Å) and the average pore diameter is 0.560 nm (5.60 Å).

The case where the oxidation catalyst 20 is made of metal nanoparticles and metal oxide nanoparticles will be described below in detail.

When the oxidation catalyst 20 is made of at least one type of oxidation catalytic nanoparticles selected from the group consisting of metal nanoparticles and metal oxide nanoparticles, the oxidation catalytic nanoparticles 20 may be primary particles or secondary particles formed by aggregation of primary particles, but the average particle size $D_C$ of the oxidation catalytic nanoparticles 20 is preferably larger than the average inner diameter $D_F$ of the channel 11 and not greater than the inner diameter $D_E$ of the enlarged pore portion 12 ($D_F<D_C<D_E$). Such oxidation catalytic nanoparticles 20 are present in the channel 11, preferably embedded in the enlarged pore portion 12, and the movement of the oxidation catalytic nanoparticles 20 within the support 10 is restricted. Thus, even if the oxidation catalytic nanoparticles 20 are subjected to external force from the fluid, movement of the oxidation catalytic nanoparticles 20 within the support 10 is suppressed, and it is possible to effectively prevent the oxidation catalytic nanoparticles 20, 20, . . . embedded in the enlarged pore portions 12, 12, . . . dispersed in the channel 11 of the support 10 from coming into contact with each other.

In addition, when the oxidation catalyst 20 is made of metal nanoparticles, the average particle size $D_C$ of the metal nanoparticles 20 is preferably from 0.08 nm to 30 nm, more preferably 0.08 nm or higher and less than 25 nm, and further preferably from 0.4 nm to 11.0 nm, and particularly preferably from 0.8 nm to 2.7 nm for primary particles and second particles. Furthermore, the ratio ($D_C/D_F$) of the average particle size $D_C$ of the metal nanoparticles 20 to the average inner diameter $D_F$ of the channel 11 is preferably from 0.05 to 300, more preferably from 0.1 to 30, even more preferably from 1.1 to 30, and particularly preferably from 1.4 to 3.6. When the oxidation catalyst 20 is made of metal nanoparticles, the metal element (M) of the metal nanoparticles is preferably contained in from 0.5 to 2.5 mass % relative to the structured catalyst for oxidation for exhaust gas purification 1, and more preferably from 0.5 to 1.5 mass % relative to the structured catalyst for oxidation for exhaust gas purification 1. For example, when the metal element (M) is Co, the content of the Co element (mass %) is expressed as ((mass of Co element)/(mass of all elements in the structured catalyst for oxidation for exhaust gas purification 1))×100.

The metal nanoparticles 20 only needs to be constituted by a metal that is not oxidized, and may be constituted by a single metal or a mixture of two or more types of metals, for example. Note that in the present specification, the "metal" constituting the metal nanoparticles (as the raw material) refers to an elemental metal containing one type of metal element (M) and a metal alloy containing two or more types of metal elements (M), and the term is a generic term for a metal containing one or more metal elements (M).

Examples of the metal include complex metals composed mainly of any one or two or more of gold (Au), silver (Ag), rhodium (Rh), iridium (Ir), osmium (Os), platinum (Pt), palladium (Pd), ruthenium (Ru), nickel (Ni), cobalt (Co), molybdenum (Mo), tungsten (W), iron (Fe), chromium (Cr), cerium (Ce), copper (Cu), magnesium (Mg), aluminum (Al), manganese (Mn), tin (Sn), Zinc (Zn), and titanium (Ti).

When the oxidation catalyst 20 is made of metal oxide nanoparticles, the average particle size $D_C$ of the metal oxide nanoparticles 20 is preferably from 0.1 nm to 50 nm, more preferably 0.1 nm or higher and less than 30 nm, and further preferably from 0.5 nm to 14.0 nm, and particularly preferably from 1.0 nm to 3.3 nm for primary particles and second particles. Furthermore, the ratio ($D_C/D_F$) of the average particle size $D_C$ of the metal oxide nanoparticles 20 to the average inner diameter $D_F$ of the channel 11 is preferably from 0.06 to 500, more preferably from 0.1 to 36, even more preferably from 1.1 to 36, and particularly preferably from 1.7 to 4.5. When the oxidation catalyst 20 is made of metal oxide nanoparticles, the content of the metal element (M) of the metal oxide nanoparticles in the structured catalyst for oxidation for exhaust gas purification 1 is preferably from 0.5 to 2.5 mass %, and more preferably from 0.5 to 1.5 mass %. For example, when the metal element (M) is Co, the content of the Co element (mass %) is expressed as {(mass of Co element)/(mass of all elements of the structured catalyst for oxidation for exhaust gas purification 1)}×100.

The metal oxide nanoparticles 20 only need to be constituted by a metal oxide. For example, the metal oxide nanoparticles may be constituted by a single metal oxide, or may be constituted by a mixture of two or more types of metal oxides. Note that in the present specification, the "metal oxide" constituting the metal oxide nanoparticles (as the raw material) refers to an oxide containing one type of metal element (M) and a complex oxide containing two or more types of metal elements (M), and the term is a generic term for an oxide containing one or more metal elements (M).

Examples of such metal oxides include cobalt oxide ($CoO_x$), nickel oxide ($NiO_x$), iron oxide ($FeO_x$), copper oxide ($CuO_x$), zirconium oxide ($ZrO_x$), cerium oxide ($CeO_x$), aluminum oxide ($AlO_x$), niobium oxide ($NbO_x$), titanium oxide ($TiO_x$), bismuth oxide ($BiO_x$), molybdenum oxide ($MoO_x$), vanadium oxide ($VO_x$), chromium oxide ($CrO_x$), silver oxide ($AgO_x$), manganese oxide ($MnO_x$), tin oxide ($SnO_x$), and zinc oxide ($ZnO_x$). Preferably, any one of oxides described above is the major component.

The oxidation catalytic nanoparticles are preferably selected from the group consisting of at least one metal selected from cobalt, iron, copper, silver, manganese, nickel, chromium, tin, zinc, titanium, and platinum, and oxides of these metals. As also described in Journal of the Society of Oil Engineers (1994) vol. 37, No. 5, p. 480 to 491, the oxidation catalytic nanoparticles formed of any of the metals or metal oxides described above have excellent oxidation catalytic activity.

Furthermore, the metal oxide nanoparticles may contain at least one perovskite-type oxide as a metal oxide. The perovskite-type oxide is an $ABO_3$-type compound composed of a metal ion (ion A) with a large ion radius (>0.90 Å) such as a rare earth element or an alkaline earth metal, and a metal ion (ion B) with a small ion radius (>0.51 Å). Perovskite-type oxides, which are important as catalysts, are compounds based on a combination of a rare earth element (A-site) and a transition metal (B-site), whose catalytic properties depend primarily on the nature of the B-site transition metal. The perovskite catalyst species to be embedded is not particularly limited as long as it is a compound that satisfies the general formula of perovskite $ABO_3$ (A: at least one element selected from rare earth elements and alkaline earth metals, B: at least one element selected from transition metal elements), and a compound having catalytic activity. Specific examples of the perovskite-type oxide include $LaBO_3$ (B=Mn, Cr, Co, Fe, Al, Pd, or Mg), $BaZrO_3$, $La_{0.8}Sr_{0.2}Ga_{0.8}Mg_{0.2}O_3$ (LSGM), $LaFe_{0.57}Co_{0.38}Pd_{0.05}O_3$, and $Ba_{0.8}La_{0.2}Mn_{0.2}O_3$. The metal oxide nanoparticles 20 may, for example, be composed of a single perovskite-type oxide, or a complex oxide composed of two or more types of perovskite-type oxides, or a complex oxide composed of a perovskite-type oxide and other oxide.

Furthermore, the ratio of silicon (Si) constituting the support 10 to a metal element (M) constituting the oxidation catalytic nanoparticles 20 (the ratio of number of atoms Si/M) is preferably from 10 to 1000, and more preferably from 50 to 200. If the ratio is greater than 1000, the activity is low, so that the action as the oxidation catalyst may not be sufficiently achieved. On the other hand, if the ratio is smaller than 10, the proportion of the oxidation catalytic nanoparticles 20 becomes too large, and the strength of the support 10 tends to decrease. The oxidation catalytic nanoparticles 20 herein refer to the nanoparticles present in the support 10, and do not include nanoparticles adhered to the outer surface of the support 10.

Function of Structured Catalyst for Oxidation for Exhaust Gas Purification

Figure 2A:
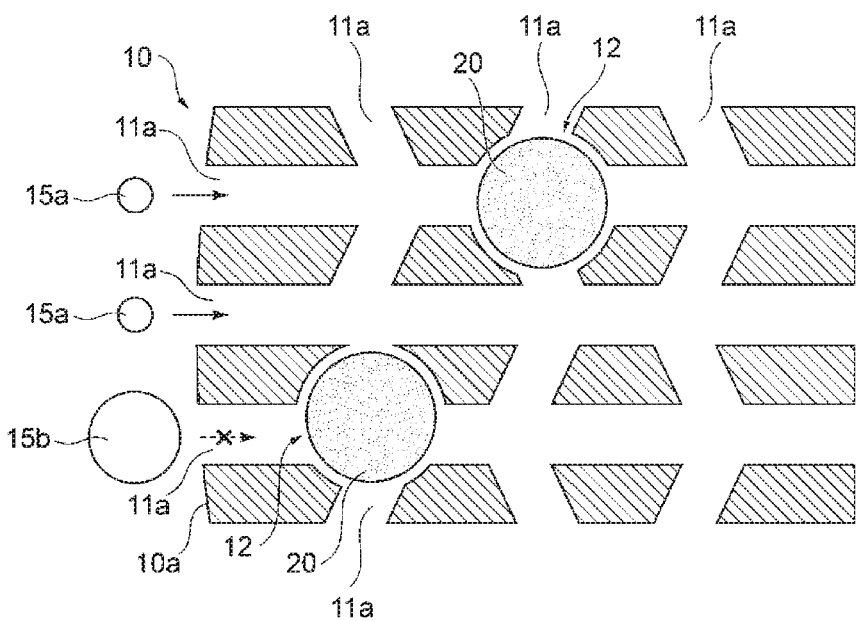
FIGS. 2A and 2B are partial enlarged cross-sectional views for explaining an example of the function of the structured catalyst for oxidation for exhaust gas purification of FIGS. 1A and 1B.
Figure 2B:
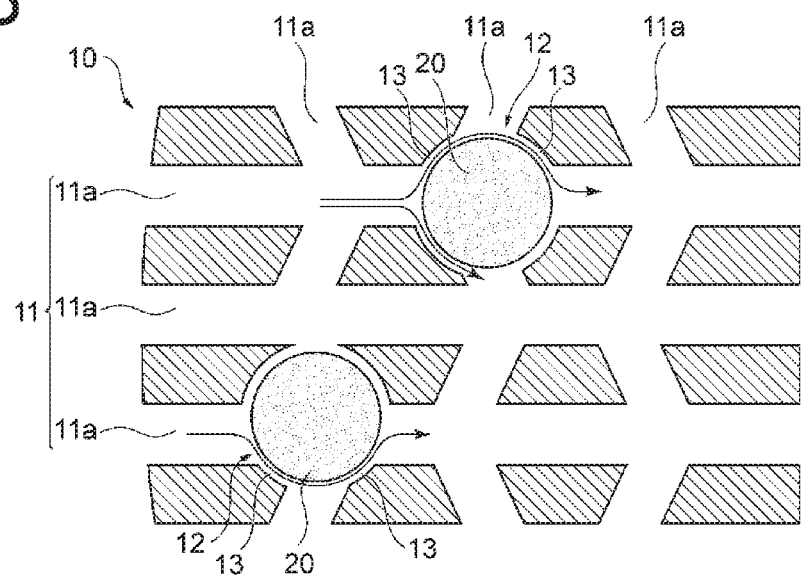

The structured catalyst for oxidation for exhaust gas purification 1 has molecular sieving capability to transmit hazardous substances (e.g., carbon monoxide (CO), hydrocarbons (HC), and particulate matter (PM)) contained in the exhaust gas of an automobile. Specifically, as illustrated in FIG. 2A, a hazardous substance 15a having a size equal to or less than the inner diameter of the pore 11a formed in the outer surface 10a of the support 10 can enter into the support 10, and the exhaust gas component 15b having a size larger than the inner diameter of the pore 11a is restricted from entering into the support 10. This sieving capability allows preferential reaction of hazardous substances that can enter into the pore 11a. In addition, of the substances produced in the pore 11a by the reaction described above, only substances that can exit from the pore 11a to the exterior of the support 10 can be obtained as products, and the substances that cannot exit the support 10 from the pore 11a are converted to substances sized to exit the pore 11a and then exit the support 10 from the pore 11a. As a result, the product obtained by the oxidation catalyst reaction can be limited to a predetermined substance.

In addition, in the structured catalyst for oxidation for exhaust gas purification 1, an oxidation catalyst 20 is present in the enlarged pore portion 12 of the channels 11. Thus, hazardous substances that have entered into the pores 11a, or the channels 11 come into contact with the oxidation catalyst 20. When the oxidation catalyst 20 is made of metal nanoparticles or metal oxide nanoparticles, if the average particle size $D_C$ of the metal nanoparticles or metal oxide nanoparticles is larger than the average inner diameter $D_F$ of the channel 11 and smaller than the inner diameter $D_E$ of the enlarged pore portion 12 ($D_F<D_C<D_E$), a small channel 13 is formed between the metal nanoparticles or metal oxide nanoparticles and the enlarged pore portion 12 (arrow in the figure), and the molecules that have entered into the small channel 13 come into contact with the metal nanoparticles or metal oxide nanoparticles. At this time, the oxidation catalyst 20 is present in the enlarged pore portion 12 and thus its movement is limited, and maintains its contact area with the fluid containing hazardous substances that has entered into the channel 11. When the hazardous substances that have entered into the channel 11 contact the metal nanoparticles or metal oxide nanoparticles as the oxidation catalyst 20, the hazardous substances are detoxified by oxidation reaction. For example, as described below, carbon monoxide and hydrocarbons, which are hazardous substances in the exhaust gas, are efficiently converted to carbon dioxide and water. The oxidation treatment by the catalyst of metal nanoparticles or metal oxide nanoparticles effectively reduces the amount of hazardous substances in the exhaust gas.

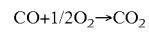

$$CO + 1/2 O_2 \rightarrow CO_2$$

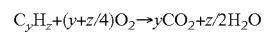

$$C_y H_z + (y+z/4) O_2 \rightarrow y CO_2 + z/2 H_2O$$

Similarly, particulate matter in the exhaust gas such as solid soot and soluble organic fractions are efficiently converted to carbon dioxide and water, and the like, and detoxified by oxidation reaction of the metal nanoparticles or metal oxide nanoparticles as the oxidation catalysts 20. For example, regeneration of a filter can be performed by converting the particulate matter, which has been trapped in the filter, to other substance through oxidization with the oxidation catalyst 20.

Here, when the exhaust gas is at an elevated temperature, the metal nanoparticles or metal oxide nanoparticles 20 are diffused by heat from the exhaust gas, and tuned to ultrafine nanoparticles by the diffusion, and thus can be detached from the enlarged pore portion 12. However, the phenomenon of diffusion of small metal nanoparticles or metal oxide nanoparticles having a small particle size of approximately 5 nm diffuse as smaller metal nanoparticles or metal oxide nanoparticles is unstable, and the progress of the diffusion requires high activation energy. Therefore, the diffusion as described above is difficult to progress. In addition, even if diffusion has progressed, the metal nanoparticles or metal oxide nanoparticles 20 become finely divided, so the effective surface area as a catalyst after diffusion becomes larger than before diffusion. In addition, although the channel 11 is illustrated in a simplified form in FIG. 1B, the channel 11 actually has a three-dimensionally complex structure by the embedded metal nanoparticles or metal oxide nanoparticles 20. Therefore, it is hypothesized that movement of the metal nanoparticles or metal oxide nanoparticles along the inner wall surface of the channel 11 can be regulated to a certain degree, and thus aggregation (sintering) caused by the movement of the metal nanoparticles or metal oxide nanoparticles can be suppressed. Furthermore, even when the metal nanoparticles or metal oxide nanoparticles 20 are detached from the enlarged pore portion 12, it is hypothesized that the time that the metal nanoparticles or metal oxide nanoparticles remain within the support 10 is increased due to the above structure of the channel 11. Therefore, the presence of the metal nanoparticles or metal oxide nanoparticles 20 in the enlarged pore portion 12 allows exhibition of functions of the oxidation catalyst for a long period of time. Additionally, a long life time is achieved by suppressing the decline in catalytic function of the oxidation catalyst and resource saving is achieved without requiring a complicated replacement operation.

Automobile Exhaust Gas Treatment Device

In one embodiment, an exhaust gas treatment device for an automobile having a structured catalyst for oxidation for exhaust gas purification may be provided. The exhaust gas treatment device of an automobile may have a structured catalyst for oxidation for exhaust gas purification alone, or the structured catalyst for oxidation may be combined with, for example, other structured catalyst such as a reduction structured catalyst for exhaust gas purification, and a collecting filter for particulate matter. By using the structured catalyst for oxidation for exhaust gas purification in a device having such a configuration, the same effects as those described above can be achieved. In the gas purification method of an embodiment, the gas discharged from the internal combustion engine is preferably purified by an exhaust gas treatment device of an automobile.

Method for Producing Structured Catalyst for Oxidation for Exhaust Gas Purification The method for producing a structured catalyst for oxidation for exhaust gas purification according to one embodiment includes:

a calcination step of a precursor material (B) obtained by impregnating a precursor material (A) for obtaining a support of a porous structure composed of zeolite-type compound with a metal-containing solution; and a hydrothermal treatment step of hydrothermally treating a precursor material (C) obtained by calcining the precursor material (B).

Figure 3:
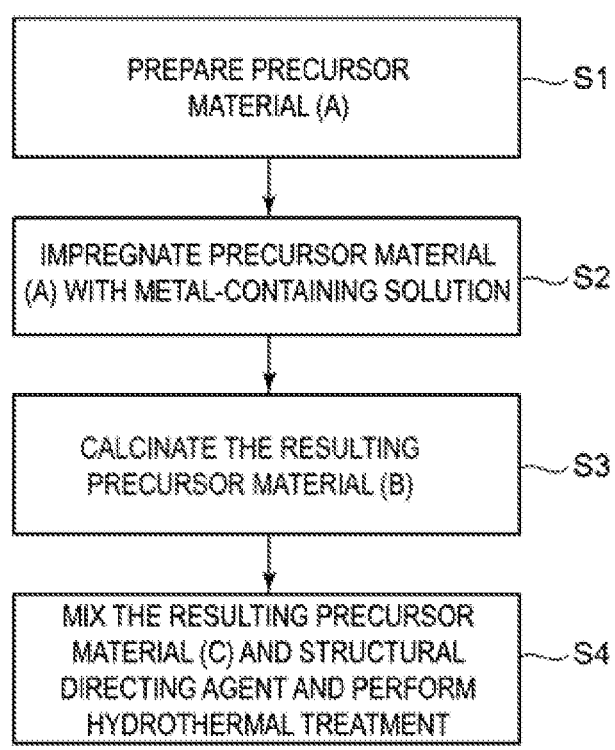
FIG. 3 is a flowchart illustrating an example of a method for producing the structured catalyst for oxidation for exhaust gas purification of FIGS. 1A and 1B.

FIG. 3 is a flowchart illustrating a method for producing the structured catalyst for oxidation for exhaust gas purification 1 of FIGS. 1A and 1B. An example of the method for producing the structured catalyst for oxidation for exhaust gas purification will be described below as an example of the case in which the oxidation catalyst present in the support is made of metal nanoparticles and metal oxide nanoparticles.

Step S1: Preparation Step

As illustrated in FIG. 3, the precursor material (A) is first prepared for obtaining the support of the porous structure composed of the zeolite-type compound. The precursor material (A) is preferably a regular mesopore material, and can be appropriately selected according to the type (composition) of the zeolite-type compound constituting the support of the structured catalyst for oxidation for exhaust gas purification.

Here, in a case where the zeolite-type compound constituting the structured catalyst for oxidation for exhaust gas purification is a silicate compound, the regular mesopore material is preferably a compound including a Si—O skeletal body in which pores having a pore diameter from 1 to 50 nm are uniformly sized and regularly developed one-dimensionally, two-dimension-ally, or three-dimensionally. While such a regular mesopore material is obtained as a variety of synthetic materials depending on the synthetic conditions. Specific examples of the synthetic material include SBA-1, SBA-15, SBA-16, KIT-6, FSM-16, and MCM-41. Among them, MCM-41 is preferred. Note that the pore diameter of SBA-1 is from 10 to 30 nm, the pore diameter of SBA-15 is from 6 to 10 nm, the pore diameter of SBA-16 is 6 nm, the pore diameter of KIT-6 is 9 nm, the pore diameter of FSM-16 is from 3 to 5 nm, and the pore diameter of MCM-41 is from 1 to 10 nm. Examples of such a regular mesopore material include mesoporous silica, mesoporous aluminosilicate, and mesoporous metallosilicate.

The precursor material (A) may be a commercially available product or a synthetic product. When the precursor material (A) is synthesized, it can be synthesized by a known method for synthesizing a regular mesopore material. For example, a mixed solution including a raw material containing the constituent elements of the precursor material (A) and a molding agent for defining the structure of the precursor material (A) is prepared, and the pH is adjusted as necessary to perform hydrothermal treatment (hydrothermal synthesis). Thereafter, the precipitate (product) obtained by hydrothermal treatment is recovered (e.g., filtered), washed and dried as necessary, and then calcined to obtain a precursor material (A) which is a powdered regular mesopore material. Here, examples of the solvent of the mixed solution that can be used include water, an organic solvent such as alcohol, or a mixed solvent thereof. In addition, the raw material is selected according to the type of the support, but examples include silica agents such as tetraethoxysilane (TEOS), fumed silica, and quartz sand. In addition, various types of surfactants, block copolymers, and the like can be used as the molding agent, and it is preferably selected depending on the type of the synthetic materials of the regular mesopore material. For example, a surfactant such as hexadecyltrimethylammonium bromide is preferable when producing MCM-41. The hydrothermal treatment can be performed at from 0 to 2000 kPa at 80 to 800° C. for 5 hours to 240 hours in a sealed container. For example, the calcination treatment can be performed in air, at 350 to 850° C. for 2 hours to 30 hours.

Step 2: Impregnating Step

The prepared precursor material (A) is then impregnated with the metal-containing solution to obtain the precursor material (B).

The metal-containing solution is a solution containing a metal component (for example, a metal ion) corresponding to the metal element (M) constituting the metal nanoparticles and metal oxide nanoparticles of the structured catalyst for oxidation for exhaust gas purification, and can be prepared, for example, by dissolving a metal salt containing a metal element (M) in a solvent. Examples of such metal salts include metal salts such as chlorides, hydroxides, oxides, sulfates, and nitrates. Of these, nitrates are preferable. Examples of the solvent that can be used include water, an organic solvent such as alcohol, or a mixed solvent thereof.

The method for impregnating the precursor material (A) with the metal-containing solution is not particularly limited; however, for example, the metal-containing solution is preferably added in portions in a plurality of times while mixing the powdered precursor material (A) before the calcination step described below. In addition, the surfactant is preferably added to the precursor material (A) as the additive before adding the metal-containing solution to the precursor material (A) from the perspective of allowing the metal-containing solution to enter the pores of the precursor material (A) more easily. It is believed that such additives serve to cover the outer surface of the precursor material (A) and inhibit the subsequently added metal-containing solution from adhering to the outer surface of the precursor material (A), making it easier for the metal-containing solution to enter the pores of the precursor material (A).

Examples of such additives include non-ionic surfactants such as polyoxyethylene oleyl ether, polyoxyethylene alkyl ether, and polyoxyethylene alkylphenyl ether. It is believed that these surfactants do not adhere to the interior of the pores because their molecular size is large and cannot enter the pores of the precursor material (A), and will not interfere with the penetration of the metal-containing solution into the pores. As the method for adding the non-ionic surfactant, for example, it is preferable to add from 50 to 500 mass % of the non-ionic surfactant to the precursor material (A) before the calcination step described below. In a case where the added amount of the non-ionic surfactant to the precursor material (A) is less than 50 mass %, the aforementioned suppressing action will not easily occur, and when more than 500 mass % of the non-ionic surfactant is added to the precursor material (A), the viscosity is too high, which is not preferable. Thus, the added amount of the non-ionic surfactant to the precursor material (A) is a value within the range described above.

Furthermore, the added amount of the metal-containing solution added to the precursor material (A) is preferably adjusted as appropriate in consideration of the amount of the metal element (M) contained in the metal-containing solution with which the precursor material (A) is impregnated (that is, the amount of the metal element (M) present in the precursor material (B)). For example, before the calcination step described below, the value obtained by converting the added amount of the metal-containing solution added to the precursor material (A) to a ratio of silicon (Si) constituting the precursor material (A) to a metal element (M) included in the metal-containing solution added to the precursor material (A) (the ratio of number of atoms Si/M) is preferably adjusted to from 10 to 1000, and more preferably from 50 to 200. For example, if the surfactant is added to the precursor material (A) as the additive before adding the metal-containing solution to the precursor material (A), when the value obtained by converting the added amount of the metal-containing solution added to the precursor material (A) to the ratio of number of atoms Si/M is from 50 to 200, from 0.5 to 2.5 mass % of the metal element (M) of the metal nanoparticles and metal oxide nanoparticles can be included in the structured catalyst for oxidation for exhaust gas purification. In the state of the precursor material (B), the amount of the metal element (M) present within the pores is generally proportional to the added amount of the metal-containing solution added to the precursor material (A) in a case where the metal concentration of the metal-containing solution, the presence or absence of additives, and other conditions such as temperature, pressure, and the like are the same. The amount of metal element (M) present in the precursor material (B) is also in a proportional relationship to the amount of metal element constituting the metal nanoparticles metal oxide nanoparticles present in the support of the structured catalyst for oxidation for exhaust gas purification. Thus, by controlling the added amount of the metal-containing solution added to the precursor material (A) to the range described above, the pores of the precursor material (A) can be sufficiently impregnated with the metal-containing solution, and thus the amount of the metal nanoparticles and the metal oxide nanoparticles present in the support of the structured catalyst for oxidation for exhaust gas purification can be adjusted.

After impregnating the precursor material (A) with the metal-containing solution, a washing treatment may be performed as necessary. Examples of the solvent of the washing solution that can be used include water, an organic solvent such as alcohol, or a mixed solution thereof. Furthermore, the precursor material (A) is preferably impregnated with the metal-containing solution, and after the washing treatment is performed as necessary, the precursor material (A) is further subjected to drying treatment. Drying treatments include overnight natural drying and high temperature drying at 150° C. or lower. Note that when calcination treatment described below is performed in the state in which there is a large amount of moisture remaining in the metal-containing solution and the wash solution in the precursor material (A), the skeletal structure as the regular mesopore material of the precursor material (A) may be broken, and thus it is preferable to dry them sufficiently.

Step S3: Calcination Step

Next, a precursor material (C) is obtained by calcining the precursor material (B) obtained by impregnating the precursor material (A) for obtaining the support of the porous structure composed of zeolite-type compound with the metal-containing solution.

For example, the calcination treatment is preferably performed in air, at 350 to 850° C. for 2 hours to 30 hours. The metal component that has entered into the pores of the regular mesopore material undergoes crystal growth by such a calcination treatment, and metal nanoparticles or metal oxide nanoparticles are formed in the pores.

Step S4: Hydrothermal Treatment Step

A mixed solution of the precursor material (C) and the structure directing agent is then prepared, and the precursor material (C) obtained by calcining the precursor material (B) is hydrothermally treated to obtain a structured catalyst for oxidation for exhaust gas purification.

The structure directing agent is a molding agent for defining the skeletal structure of the support of the structured catalyst for oxidation for exhaust gas purification, and may be, for example, a surfactant. The structure directing agent is preferably selected according to the skeletal structure of the support of the structured catalyst for oxidation for exhaust gas purification, and for example, a surfactant such as tetramethylammonium bromide (TMABr), tetraethylammonium bromide (TEABr), and tetrapropylammonium bromide (TPABr) is preferable.

The mixing of the precursor material (C) and the structure directing agent may be performed during the hydrothermal treatment step or may be performed before the hydrothermal treatment step. Furthermore, the method for preparing the mixed solution is not particularly limited, and the precursor material (C), the structure directing agent, and the solvent may be mixed simultaneously, or each of the dispersion solutions may be mixed after the precursor material (C) and the structural defining agent are each dispersed in individual solutions. Examples of the solvent that can be used include water, an organic solvent such as alcohol, or a mixed solvent thereof. In addition, it is preferable that the pH of the mixed solution is adjusted using an acid or a base before performing the hydrothermal treatment.

The hydrothermal treatment can be performed by a known method. For example, the hydrothermal treatment can be preferably performed at 0 to 2,000 kPa at 80 to 800° C. for 5 hours to 240 hours in a sealed container. Furthermore, the hydrothermal treatment is preferably performed under a basic condition. Although the reaction mechanism here is not necessarily clear, by performing hydrothermal treatment using the precursor material (C) as a raw material, the skeletal structure of the regular mesopore material of the precursor material (C) becomes increasingly disrupted. However, the action of the structure directing agent forms a new skeletal structure (porous structure) as the support of the structured catalyst for oxidation for exhaust gas purification while maintaining the positions of the metal nanoparticles and the metal oxide nanoparticles within the pores of the precursor material (C). The structured catalyst for oxidation for exhaust gas purification obtained in this way includes the support having a porous structure and at least one oxidation catalyst that is present in the support and selected from the group consisting of metal nanoparticles and metal oxide nanoparticles, the support having channels in which a plurality of pores communicate with each other by the porous structure, and at least a portion of the oxidation catalyst being present in the channel of the support. Furthermore, in the present embodiment, in the hydrothermal treatment step, a mixed solution in which the precursor material (C) and the structural defining agent are mixed is prepared, and the precursor material (C) is subjected to hydrothermal treatment, which is not a limitation. The precursor material (C) may be subjected to hydrothermal treatment without mixing the precursor material (C) and the structure directing agent.

The precipitate obtained after hydrothermal treatment (structured catalyst for oxidation for exhaust gas purification) is preferably washed, dried, and calcined as necessary after recovery (e.g., filtration). Examples of the washing solution that can be used include water, an organic solvent such as alcohol, or a mixed solution thereof. Drying treatments include overnight natural drying and high temperature drying at 150° C. or lower. Note that when calcination treatment is performed in the state in which there is a large amount of moisture remaining in the precipitate, the skeletal structure as a support of the structured catalyst for oxidation for exhaust gas purification may be broken, and thus it is preferable to dry the precipitate sufficiently. The calcination treatment may be performed, for example, in air at 350 to 850° C. for 2 hours to 30 hours. Such calcination treatment burns out the structure directing agent that has been attached to the structured catalyst for oxidation for exhaust gas purification. Furthermore, the structured catalyst for oxidation for exhaust gas purification can be used as-is without subjecting the recovered precipitate to calcination, depending on the intended use. For example, in a case where the environment in which the structured catalyst for oxidation for exhaust gas purification is used is a high temperature environment of an oxidizing atmosphere, exposing the structured catalyst for oxidation for exhaust gas purification to a usage environment for a period of time allows the structure directing agent to be burned out and to obtain an structured catalyst for oxidation for exhaust gas purification similar to that when subjected to calcination treatment. Thus, the obtained structured catalyst for oxidation for exhaust gas purification can be used as is.

The producing method described above is an example in which the metal element (M) contained in the metal-containing solution that impregnates the precursor material (A) is a metal species (e.g., a noble metal) that is resistant to oxidation.

When the metal element (M) contained in the metal-containing solution for impregnating the precursor material (A) is a metal species that is easily oxidized (e.g., Fe, Co, or Cu), and metal nanoparticles are used as the oxidation catalyst, the hydrothermally treated precursor material (C) is preferably subjected to reduction treatment after the hydrothermal treatment step. If the metal element (M) contained in the metal-containing solution is a metal species that is easily oxidized, the metal component is oxidized by the heat treatment in the step (step S3 to 4) after the impregnating step (step S2). Therefore, metal oxide nanoparticles are present in the support formed in the hydrothermal treatment step (step S4). Therefore, in order to obtain a structured catalyst for oxidation for exhaust gas purification in which metal nanoparticles are present in the support, the recovered precipitate is preferably subjected to calcination treatment after the hydrothermal treatment, and further to reduction treatment in a reducing gas atmosphere such as hydrogen gas. Through the reduction treatment, the metal oxide nanoparticles present in the support are reduced, and metal nanoparticles corresponding to the metal element (M) constituting the metal oxide nanoparticles are formed. As a result, obtained is a structured catalyst for oxidation for exhaust gas purification including metal nanoparticles present in the support. The reduction treatment may be performed as necessary. For example, when the environment in which the structured catalyst for oxidation for exhaust gas purification is to be used is a reducing atmosphere, the metal oxide nanoparticles are reduced by being exposed to the usage environment for a certain period of time, and the same structured catalyst for oxidation for exhaust gas purification as that subjected to reduction treatment is obtained. Therefore, the structural body can be used as it is with the metal oxide nanoparticles present in the support.

Modified Example of Structured Catalyst for Oxidation for Exhaust Gas Purification 1

Figure 4:
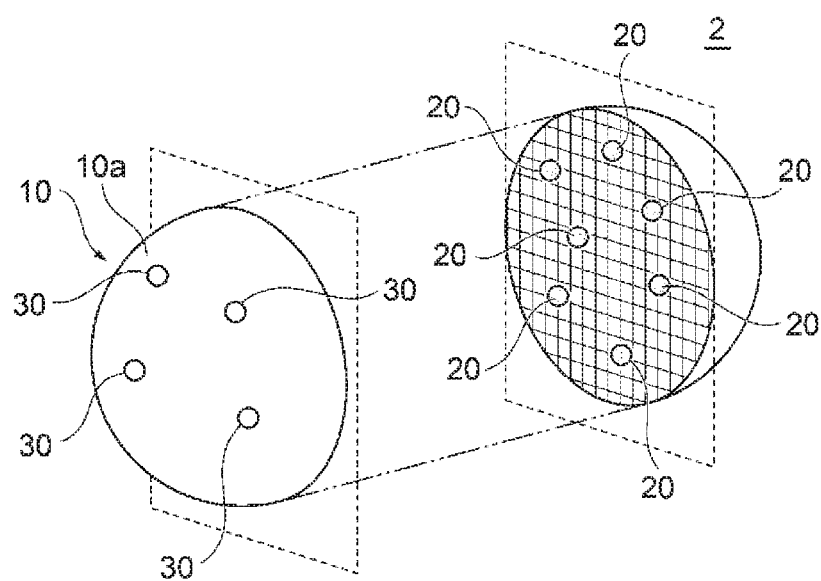
FIG. 4 is a schematic view illustrating a modified example of the structured catalyst for oxidation for exhaust gas purification of FIGS. 1A and 1B.

FIG. 4 is a schematic view illustrating a modified example of the structured catalyst for oxidation for exhaust gas purification 1 in FIGS. 1A and 1B. Although the structured catalyst for oxidation for exhaust gas purification 1 in FIGS. 1A and 1B illustrate the case in which it includes the support 10 and the oxidation catalyst 20 present in the support 10, the structured catalyst for oxidation for exhaust gas purification 1 is not limited to this configuration. For example, as illustrated in FIG. 4, the structured catalyst for oxidation for exhaust gas purification 2 may further include other functional substance 30 held on the outer surface 10a of the support 10.

This functional substance 30 is a substance that exhibits one or more functions. The functions of the other functional substance 30 may be the same or different from the catalytic function of the oxidation catalyst 20. A specific example of the function of the other functional substance 30 is the same as that described for the oxidation catalyst 20, and preferably has a catalytic function, and the oxidation catalyst 30 is a catalytic substance. Also, in a case where both of the oxidation catalyst 20 and the functional substance 30 are materials having the same function, the material of the other functional substance 30 may be the same as or different from the material of the oxidation catalyst 20. According to this configuration, the content of the oxidation catalyst present in the structured catalyst for oxidation for exhaust gas purification 2 can be greater than the content of at least another one functional substance held on the outer surface of the support, and the functions of the oxidation catalyst can be further promoted.

In this case, the content of the oxidation catalyst 20 present in the support 10 is preferably greater than that of the other functional substance 30 held on the outer surface 10a of the support 10. As a result, the function of the oxidation catalyst 20 supported in the support 10 becomes dominant, and functions of the functional substance are stably exhibited.

Catalytic Molding

In one embodiment, a catalytic molding having a structured catalyst for oxidation for exhaust gas purification may be provided. The catalytic molding may have a structured catalyst for oxidation for exhaust gas purification alone, or may have other structured catalyst such as a reduction structured catalyst for exhaust gas purification. By using the structured catalyst for oxidation for exhaust gas purification in the catalytic molding having such a configuration, the same effects as those described above can be achieved.

The catalytic molding preferably has a substrate and a structured catalyst for oxidation for exhaust gas purification on the surface of the substrate. The substrate is a member having a tubular channel through which exhaust gas passes in the axial direction. That is, the structure having a tubular channel through which exhaust gas passes increases the contact area of the exhaust gas of the structured catalyst for oxidation for exhaust gas purification. By increasing the contact area between exhaust gas and the structured catalyst for oxidation for exhaust gas purification in this way, the capacity for purifying exhaust gas can be improved. Examples of such substrate include honeycomb substrates. The shape of the honeycomb substrate is not particularly limited, and may be selected from known honeycomb substrates (monolithic supports). Examples of the material of the honeycomb substrate include metals such as stainless steel, and heat resistant ceramics such as cordierite.

Method for Producing Catalytic Molding

In the method for producing a catalytic molding according to one embodiment, the structured catalyst for oxidation for exhaust gas purification is subjected to pulverization treatment or the like, thereby obtaining a structured catalyst for oxidation for exhaust gas purification in a particulate state. Next, the structured catalyst for oxidation for exhaust gas purification in a particulate state is mixed with a medium such as water to obtain a slurry. Thereafter, the slurry is applied to a honeycomb substrate, and dried to produce a catalytic molding having a honeycomb substrate and a structured catalyst for oxidation for exhaust gas purification on a surface of the honeycomb substrate. The method for applying the slurry to the honeycomb substrate is not particularly limited, but a wash coat method is preferable. The drying temperature is preferably from 100 to 300° C., and more preferably from 100 to 200° C. The heating means may be a known heating means such as an electric furnace or a gas furnace.

Gas Purification Method

The gas purification method according to one embodiment is a gas purification method for purifying a gas containing carbon monoxide and a hydrocarbon using a structured catalyst, the structured catalyst including a support of a porous structure composed of a zeolite-type compound, and at least one type of oxidation catalyst that is present in the support and selected from the group consisting of metals and metal oxides, the support having channels that communicate with each other, and the oxidation catalyst being present in at least the channels of the support. The same effects as described above can be exhibited by a gas purification method using a structured catalyst having such a configuration. In one embodiment, a structured catalyst for oxidation for exhaust gas purification can be used as the structured catalyst. The gas to be purified by the gas purification method is preferably a gas discharged from an internal combustion engine.

Hereinbefore, the structured catalyst for oxidation for exhaust gas purification according to the present embodiments has been described, but the present disclosure is not limited to the above embodiments, and various modifications and changes are possible on the basis of the technical concept of the present disclosure.

EXAMPLES

Examples 1 to 1248

Synthesis of Precursor Material (A)

A mixed aqueous solution was prepared by mixing a silica agent (tetraethoxysilane (TEOS), manufactured by Wako Pure Chemical Industries, Ltd.) and a surfactant as the molding agent. The pH was adjusted as appropriate, and hydrothermal treatment was performed at 80 to 350° C. for 100 hours in a sealed container. Thereafter, the produced precipitate was filtered out, washed with water and ethanol, and then calcined in air at 600° C. for 24 hours to obtain the precursor material (A) of the type and having the pore diameter shown in Tables 1 to 26. Note that the following surfactant was used depending on the type of the precursor material (A).

MCM-41: Hexadecyltrimethylammonium bromide (CTAB) (available from Wako Pure Chemical Industries, Ltd.)

SBA-1: Pluronic P123 (available from BASF)

Fabrication of Precursor Material (B) and (C)

Next, a metal-containing aqueous solution was prepared by dissolving a metal salt containing the metal element (M) in water according to the metal element (M) constituting the metal nanoparticles and metal oxide nanoparticles of the type shown in Tables 1 to 26. Note that the metal salt was used in accordance with the type of the metal nanoparticles and metal oxide nanoparticles. In the following, the metal, metal oxide, and metal salt are expressed in the order of "metal oxide nanoparticles: metal salt" or "metal nanoparticles: metal salt".

$CoO_x$: Cobalt nitrate (II) hexahydrate (available from Wako Pure Chemical Industries, Ltd.)

$NiO_x$: Nickel nitrate (II) hexahydrate (available from Wako Pure Chemical Industries, Ltd.)

$FeO_x$: Iron nitrate (III) nonahydrate (available from Wako Pure Chemical Industries, Ltd.)

$CuO_x$: Copper nitrate (II) trihydrate (available from Wako Pure Chemical Industries, Ltd.)

$LaMnO_3$: Lz-Mn nitrate salt ($La(NO_3)_3 \cdot 6H_2O$ (99%) and $Mn(NO_3)_2 \cdot 9H_2O$ (99%) were used, both manufactured by Wako Pure Chemical Industries, Ltd.

$BaMnO_3$: Ba—Mn nitrate salt ($Ba(NO_3)_2$ (99%) and $Mn(NO_3)_2 \cdot 9H_2O$ (99%) were used, both available from Wako Pure Chemical Industries, Ltd.

$LaAlO_3$: La—Al nitrate salt ($La(NO_3)_3 \cdot 6H_2O$ (99%) and $Al(NO_3)_3 \cdot 9H_2O$ (99%) were used, both available from Wako Pure Chemical Industries, Ltd.

$LaCoO_3$: La—Co nitrate salt ($La(NO_3)_3 \cdot 6H_2O$ (99%) and $Co(NO_3)_2 \cdot 6H_2O$ (99%) were used, both available from Wako Pure Chemical Industries, Ltd.

Co: cobalt nitrate (II) hexahydrate (available from Wako Pure Chemical Industries, Ltd.)

Ni: nickel nitrate (II) hexahydrate (available from Wako Pure Chemical Industries, Ltd.)

Fe: Iron nitrate (III) nonahydrate (available from Wako Pure Chemical Industries, Ltd.)

Cu: Copper nitrate (II) trihydrate (available from Wako Pure Chemical Industries, Ltd.)

Pt: Platinum (IV) chloride hexahydrate (available from Wako Pure Chemical Industries, Ltd.)

Next, a metal-containing aqueous solution was added to the powdered precursor material (A) in portions, and dried at room temperature (20° C.±10° C.) for 12 hours or longer to obtain the precursor material (B).

Note that when the presence or absence of additives shown in Tables 1 to 26 is "yes", pretreatment in which an aqueous solution of polyoxyethylene (15) oleyl ether (NIKKOL BO-15V, available from Nikko Chemicals Co., Ltd.) was added as the additive to the precursor material (A) before adding the metal-containing aqueous solution, and then the metal-containing aqueous solution was added as described above. Note that when "no" is used in the presence or absence of an additive, pretreatment with an additive such as that described above has not been performed.

Furthermore, the added amount of the metal-containing aqueous solution added to the precursor material (A) was adjusted so that the value obtained by converting to a ratio of silicon (Si) constituting the precursor material (A) to a metal element (M) included in the metal-containing aqueous solution is in Tables 1 to 26.

Next, the precursor material (B) impregnated with the metal-containing aqueous solution obtained as described above was calcined in air at 600° C. for 24 hours to obtain the precursor material (C).

Synthesis of Structured Catalyst for Oxidation for Exhaust Gas Purification

The precursor material (C) obtained as described above and the structure directing agent shown in Tables 1 to 26 were mixed to produce a mixed aqueous solution. Hydrothermal treatment was performed under the conditions of at 80 to 350° C., at pH and time shown in Tables 1 to 26 in a sealed container. Thereafter, the produced precipitate was filtered out, washed with water, dried at 100° C. for 12 hours or longer, and further calcined in air at 600° C. for 24 hours to obtain a structured catalyst for oxidation for exhaust gas purification having the support shown in Tables 1 to 16 and metal oxide nanoparticles as the oxidation catalyst (Examples 1 to 768). The calcined product was then recovered and reduction treatment was performed under the inflow of hydrogen gas at 400° C. for 350 minutes to obtain oxidation catalytic structural bodies for exhaust gas purification including the support shown in Tables 17 to 26 and metal nanoparticles as the oxidation catalyst (Examples 769 to 1248).

Comparative Example 1

In Comparative Example 1, cobalt oxide powder (II, III) having an average particle size of 50 nm or less (available from Sigma-Aldrich Co. LLC.) was mixed with MFI type silicalite, thus obtaining a structured catalyst for oxidation for exhaust gas purification in which cobalt oxide nanoparticles were attached as the oxidation catalyst to the outer surface of the silicalite as the support. MFI type silicalite was synthesized in the similar manner as in Examples 52 to 57 except for a step of adding a metal.

Comparative Example 2

In Comparative Example 2, MFI type silicalite was synthesized in the similar manner as in Comparative Example 1 except that the step of attaching the cobalt oxide nanoparticles was omitted.

Comparative Example 3

In Comparative Example 1, cobalt oxide powder (II, III) having an average particle size of 50 nm or less (available from Sigma-Aldrich Co. LLC.) was mixed with MFI type silicalite, thus obtaining a structured catalyst for oxidation for exhaust gas purification in which cobalt oxide nanoparticles were attached as the oxidation catalyst to the outer surface of the silicalite as the support. MFI type silicalite was synthesized in the similar manner as in Examples 436 to 441 except for the step of adding a metal.

Evaluation

Various characteristic evaluations were performed on the oxidation catalytic structural bodies for exhaust gas purification of the above examples including a support and an oxidation catalyst and comparative examples, and silicalite itself under the conditions described below.

[A] Cross Sectional Observation

Observation samples were made using a pulverization method for the oxidation catalytic structural bodies for exhaust gas purification of the examples including a support and an oxidation catalyst and comparative examples described above and silicalite itself, and the cross section observation was performed using a transmission electron microscope (TEM) (TITAN G2, available from FEI Company).

As a result, it was confirmed that, in the structured catalyst for oxidation for exhaust gas purification of the examples described above, the oxidation catalyst was present and held inside the support made of silicalite or zeolite. On the other hand, in the oxidation catalytic structural bodies for exhaust gas purification of Comparative Examples 1 and 3, the oxidation catalyst was only attached to the outer surface of the support and was not present in the support.

In addition, of the examples described above, the structured catalyst for oxidation for exhaust gas purification in which the oxidation catalyst was iron oxide nanoparticles (FeOx) and the structured catalyst for oxidation for exhaust gas purification in which the oxidation catalyst was iron nanoparticles (Fe) were subjected to FIB (focused ion beam) processing to cut out their cross sections, and the section element analysis was performed using SEM (SU8020, manufactured by Hitachi High-Technologies Corporation) and EDX (X-Max, available from HORIBA, Ltd.). As a result, the Fe element was detected in the support.

It was confirmed that iron oxide nanoparticles or iron nanoparticles were present in the support from the results of the cross-sectional observation using TEM and SEM/EDX.

[B] Average Inner Diameter of the Channel of the Support and Average Particle Size of the Oxidation Catalyst In the TEM image taken by the cross-sectional observation performed in evaluation [A] above, 500 channels of the support were randomly selected, and the respective major diameter and the minor diameter were measured, and the respective inner diameters were calculated from the average values (N=500), and the average value of the inner diameter was determined to be the average inner diameter $D_F$ of the channel of the support. In addition, for the oxidation catalysts, 500 oxidation catalysts were randomly selected from the TEM image, and the respective particle sizes were measured (N=500), and the average value thereof was determined to be the average particle size $D_C$ of the oxidation catalyst. The results are shown in Tables 1 to 26.

Also, SAXS (small angle X-ray scattering) was used to analyze the average particle size and dispersion status of the oxidation catalyst. Measurements by SAXS were performed using a Spring-8 beam line BL19B2. The obtained SAXS data was fitted with a spherical model using the Guinier approximation method, and the particle size was calculated. The particle size was measured for the structured catalyst for oxidation for exhaust gas purification including iron oxide nanoparticles as the oxidation catalyst, and the structured catalyst for oxidation for exhaust gas purification including iron nanoparticles as the oxidation catalyst. Furthermore, as a comparative reference, commercially available iron oxide nanoparticles and iron nanoparticles (available from Wako Pure Chemical Industries, Ltd.) were observed and measured on SEM.

As a result, in commercial products, various sizes of iron oxide nanoparticles or iron nanoparticles were randomly present in a range of particle sizes from approximately 50 nm to 400 nm, whereas in the measurement results of SAXS, scattering peaks with particle sizes of 10 nm or less were also detected in the oxidation catalytic structural bodies for exhaust gas purification of each example having an average particle size from 1.2 nm to 2.0 nm determined from the TEM image. From the results of SAXS measurement and the SEM/EDX cross-sectional measurement, it was found that oxidation catalysts having a particle size of 10 nm or less are present in the support in a highly dispersed state with uniform particle sizes.

[C] Relationship Between the Added Amount of the Metal-Containing Solution and the Amount of Metal Embedded in the Support A structured catalyst for oxidation for exhaust gas purification in which metal oxide nanoparticles were embedded in the support and a structured catalyst for oxidation for exhaust gas purification in which metal nanoparticles were embedded in the support at added amount of the ratio of number of atoms of Si/M=50, 100, 200, 1,000 (M=Co, Ni, Fe, Cu) were produced, and then the amounts of metal (mass %) that was embedded in the supports of the oxidation catalytic structural bodies for exhaust gas purification produced at the above added amount were measured. In the present measurement, the oxidation catalytic structural bodies for exhaust gas purification having the ratio of number of atoms of Si/M=100, 200, and 1000 were produced in the same manner as that for the oxidation catalytic structural bodies for exhaust gas purification having the ratio of number of atoms of Si/M=100, 200, and 1000 among those of Examples 1 to 1248, except for the added amount of the metal-containing solution was adjusted, and the structured catalyst for oxidation for exhaust gas purification having the ratio of number of atoms of Si/M=50 was produced in the same manner as that for the oxidation catalytic structural bodies for exhaust gas purification having the ratio of number of atoms of Si/M=100, 200, and 1000, except for the added amount of the metal-containing solution was changed.

The amount of metal was quantified by ICP (radiofrequency inductively coupled plasma) alone or in combination with ICP and XRF (fluorescence X-ray analysis). XRF (energy dispersive fluorescent x-ray analyzer "SEA1200VX", available from SII Nanotechnology) was performed under conditions of a vacuum atmosphere, an accelerating voltage 15 kV (using a Cr filter), or an accelerating voltage 50 kV (using a Pb filter).

XRF is a method for calculating the amount of metal present in terms of fluorescence intensity, and XRF alone cannot calculate a quantitative value (in terms of mass %). Therefore, the metal content of the structured catalyst for oxidation for exhaust gas purification to which the metal was added at Si/M=100 was determined by ICP analysis, and the metal content of the structured catalyst for oxidation for exhaust gas purification in which the metal was added at Si/M=50 and less than 100 was calculated based on XRF measurement results and ICPO measurement results.

As a result, it was confirmed that the amount of metal embedded in the structured catalyst for oxidation for exhaust gas purification increased as the added amount of the metal-containing solution increases, at least within a range that the ratio of numbers of atom Si/M was within from 50 to 1000.

[D] Performance Evaluation

The catalytic capacity (catalytic activity and durability) of the metal nanoparticles or metal oxide nanoparticles (oxidation catalytic substance) was evaluated for the structured catalyst for oxidation for exhaust gas purification of the above examples and comparative examples including a support and Mmetal nanoparticles or metal oxide nanoparticles. The results are shown in Tables 1 to 26.

(1) Catalytic Activity of CO Oxidation Reaction

First, 10 mg of the structured catalyst for oxidation for exhaust gas purification was charged into a normal pressure flow reactor, CO (127 µL/minute) and air (21 ml/minute) were supplied thereto, and subjected to CO oxidation reaction while heating at 100 to 600° C. The normal pressure flow reactor used was a single microreactor (available from Frontier Laboratories, Ltd. Rx-3050SR). The generated product was analyzed by gas chromatography mass spectrometry (GC/MS). TRACE 1310GC (available from Thermo Fischer Scientific Inc., detector: thermal conductivity detector) was used as the analysis device for the generated gas. The lowest temperature at which the reaction to generate a $CO_2$-containing gas had occurred was measured, and the oxidation catalytic structural bodies for exhaust gas purification were evaluated by "A", "B", "C", and "D" based on the following evaluation criteria.

(2) Catalytic Activity of Propane Oxidation Reaction 10 mg of the structured catalyst for oxidation for exhaust gas purification was charged into a normal pressure flow reactor, $C_3H_8$ (21 µL/minute) and air (21 ml minute) were supplied thereto, and a propane oxidation reaction was performed while heating at 100 to 600° C. The lowest temperature at which the reaction to generate a $CO_2$-containing gas had occurred was measured, and the structured catalyst for oxidation for exhaust gas purification was evaluated by "A", "B", "C", and "D" based on the following evaluation criteria.

(3) Confirmation of Intermediate Product

In recent years, regulations on automobile exhaust gas are getting more severe, and catalysts for exhaust gas purifications are desired to minimize intermediate products (e.g., acetone) during the purification reaction of exhaust gas (e.g., less than 1 ppm). According to the analysis of the gas components after the oxidation reactions of (1) and (2) described above at a reaction temperature of 450° C., the acetone concentration was 0.1 ppm or less.

Evaluation Criteria for Catalytic Activity (a) CO Oxidation Reaction

"A": The reaction starting temperature ($CO_2$ generation starting temperature) is 200° C. or lower.

"B": The reaction starting temperature ($CO_2$ generation starting temperature) is higher than 200° C. and 250° C. or lower.

"C": The reaction starting temperature ($CO_2$ generation starting temperature) is higher than 250° C. and 300° C. or lower.

"D": The reaction starting temperature ($CO_2$ generation starting temperature) is higher than 300° C.

(b) Propane Oxidation Reaction

"A": The reaction starting temperature ($CO_2$ generation starting temperature) is 400° C. or lower.

"B": The reaction starting temperature ($CO_2$ generation starting temperature) is higher than 400° C. and 500° C. or lower.

"C": The reaction starting temperature ($CO_2$ generation starting temperature) is higher than 500° C. and 600° C. or lower.

"D": The reaction starting temperature ($CO_2$ generation starting temperature) is higher than 600° C. and 700° C. or lower.

(4) Durability (Life Time)

The oxidation catalytic structural bodies for exhaust gas purification were subjected to a heat cycle test including ten times of heating the structural bodies at 650° C. for 12 hours, followed by cooling to room temperature and allowed to stand for 30 minutes. Thereafter, the same oxidation reaction test as that in (1) and (2) described above was performed. Durability was measured for both the CO oxidation reaction and the propane oxidation reaction by measuring the lowest temperature at which the reaction to generate a $CO_2$-containing gas had occurred, and the oxidation catalytic structural bodies for exhaust gas purification were evaluated by "A", "B", "C", and "D" based on the following evaluation criteria.

Evaluation Criteria for Durability
(a) CO Oxidation Reaction

"A": The reaction starting temperature ($CO_2$ generation starting temperature) is 200° C. or lower.

"B": The reaction starting temperature ($CO_2$ generation starting temperature) is higher than 200° C. and 250° C. or lower.

"C": The reaction starting temperature ($CO_2$ generation starting temperature) is higher than 250° C. and 300° C. or lower.

"D": The reaction starting temperature ($CO_2$ generation starting temperature) is higher than 300° C.

(b) Propane Oxidation Reaction

"A": The reaction starting temperature ($CO_2$ generation starting temperature) is 400° C. or lower.

"B": The reaction starting temperature ($CO_2$ generation starting temperature) is higher than 400° C. and 500° C. or lower.

"C": The reaction starting temperature ($CO_2$ generation starting temperature) is higher than 500° C. and 600° C. or lower.

"C": The reaction starting temperature ($CO_2$ generation starting temperature) is higher than 600° C. and 700° C. or lower.

These evaluation results are shown in Table 1 to Table 26.

TABLE 1

Production Conditions for Structured Catalyst for Oxidation for Exhaust Gas Purification

| | Precursor Material (A) | | Addition to Precursor Material (A) | | Hydrothermal Treatment Conditions using Precursor Material (C) | | |
|---|---|---|---|---|---|---|---|
| No. | Type | Pore Diameter (nm) | Presence or Absence of Additives | Conversion Ratio of Added Amount of Metal-containing Solution (ratio of number of atoms) Si/M | Type of Structural Directing Agent | pH | Time (h) |
| Example 1 | MCM-41 | 1.3 | Yes | 1000 | TEABr | 12 | 120 |
| Example 2 | | | | 500 | | | |
| Example 3 | | | | 200 | | | |
| Example 4 | | | | 100 | | | |
| Example 5 | | 2.0 | | | | | |
| Example 6 | | 2.4 | | | | | |
| Example 7 | | 2.6 | | | | | |
| Example 8 | | 3.3 | | | | | |
| Example 9 | | 6.6 | | | | | |
| Example 10 | SBA-1 | 13.2 | | | | | |
| Example 11 | | 19.8 | | | | | |
| Example 12 | | 26.4 | | | | | |
| Example 13 | MCM-41 | 1.3 | None | 1000 | | | |
| Example 14 | | | | 500 | | | |
| Example 15 | | | | 200 | | | |
| Example 16 | | | | 100 | | | |
| Example 17 | | 2.0 | | | | | |
| Example 18 | | 2.4 | | | | | |
| Example 19 | | 2.6 | | | | | |
| Example 20 | | 3.3 | | | | | |
| Example 21 | | 6.6 | | | | | |
| Example 22 | SBA-1 | 13.2 | | | | | |
| Example 23 | | 19.8 | | | | | |
| Example 24 | | 26.4 | | | | | |
| Example 25 | MCM-41 | 1.1 | Yes | 1000 | | 11 | 72 |
| Example 26 | | | | 500 | | | |
| Example 27 | | | | 200 | | | |
| Example 28 | | | | 100 | | | |
| Example 29 | | 1.6 | | | | | |
| Example 30 | | 2.0 | | | | | |
| Example 31 | | 2.2 | | | | | |
| Example 32 | | 2.7 | | | | | |

TABLE 1-continued

| | | | | | |
|---|---|---|---|---|---|
| Example 33 | | 5.4 | | | |
| Example 34 | SBA-1 | 10.9 | | | |
| Example 35 | | 16.3 | | | |
| Example 36 | | 21.8 | | | |
| Example 37 | MCM-41 | 1.1 | None | 1000 | |
| Example 38 | | | | 500 | |
| Example 39 | | | | 200 | |
| Example 40 | | | | 100 | |
| Example 41 | | 1.6 | | | |
| Example 42 | | 2.0 | | | |
| Example 43 | | 2.2 | | | |
| Example 44 | | 2.7 | | | |
| Example 45 | | 5.4 | | | |
| Example 46 | SBA-1 | 10.9 | | | |
| Example 47 | | 16.3 | | | |
| Example 48 | | 21.8 | | | |

| | Structured Catalyst for Oxidation for Exhaust Gas Purification | | | | | | |
|---|---|---|---|---|---|---|---|
| | Support Zeolite-Type Compound | | Oxidation Catalyst Metal Oxide Nanoparticles | | | Performance Evaluation | |
| No. | Framework | Average Inner Diameter of Channels $D_F$ (nm) | Type | Average Particle Size $D_C$ (nm) | $D_C/D_F$ | Catalytic Activity | Durability |
| Example 1 | FAU | 0.74 | $CoO_x$ | 0.13 | 0.2 | C | C |
| Example 2 | | | | 0.40 | 0.5 | C | C |
| Example 3 | | | | 0.66 | 0.9 | B | C |
| Example 4 | | | | 1.32 | 1.8 | A | B |
| Example 5 | | | | 1.98 | 2.7 | A | B |
| Example 6 | | | | 2.38 | 3.2 | A | A |
| Example 7 | | | | 2.64 | 3.6 | A | A |
| Example 8 | | | | 3.30 | 4.5 | A | A |
| Example 9 | | | | 6.61 | 8.9 | B | A |
| Example 10 | | | | 13.21 | 17.9 | B | A |
| Example 11 | | | | 19.82 | 26.8 | C | A |
| Example 12 | | | | 26.43 | 35.7 | C | A |
| Example 13 | | | | 0.13 | 0.2 | C | C |
| Example 14 | | | | 0.40 | 0.5 | C | C |
| Example 15 | | | | 0.66 | 0.9 | B | C |
| Example 16 | | | | 1.32 | 1.8 | A | B |
| Example 17 | | | | 1.98 | 2.7 | A | B |
| Example 18 | | | | 2.38 | 3.2 | B | A |
| Example 19 | | | | 2.64 | 3.6 | B | A |
| Example 20 | | | | 3.30 | 4.5 | B | A |
| Example 21 | | | | 6.61 | 8.9 | C | A |
| Example 22 | | | | 13.21 | 17.9 | C | A |
| Example 23 | | | | 19.82 | 26.8 | C | A |
| Example 24 | | | | 26.43 | 35.7 | C | A |
| Example 25 | MTW | 0.61 | | 0.11 | 0.2 | C | C |
| Example 26 | | | | 0.33 | 0.5 | C | C |
| Example 27 | | | | 0.54 | 0.9 | B | C |
| Example 28 | | | | 1.09 | 1.8 | A | B |
| Example 29 | | | | 1.63 | 2.7 | A | B |
| Example 30 | | | | 1.96 | 3.2 | A | B |
| Example 31 | | | | 2.18 | 3.6 | A | A |
| Example 32 | | | | 2.72 | 4.5 | A | A |
| Example 33 | | | | 5.45 | 8.9 | B | A |
| Example 34 | | | | 10.89 | 17.9 | B | A |
| Example 35 | | | | 16.34 | 26.8 | C | A |
| Example 36 | | | | 21.79 | 35.7 | C | A |
| Example 37 | | | | 0.11 | 0.2 | C | C |
| Example 38 | | | | 0.33 | 0.5 | C | C |
| Example 39 | | | | 0.54 | 0.9 | B | C |
| Example 40 | | | | 1.09 | 1.8 | A | B |
| Example 41 | | | | 1.63 | 2.7 | A | B |
| Example 42 | | | | 1.96 | 3.2 | A | B |
| Example 43 | | | | 2.18 | 3.6 | B | A |
| Example 44 | | | | 2.72 | 4.5 | B | A |

TABLE 1-continued

| | | | | | |
|---|---|---|---|---|---|
| Example 45 | | 5.45 | 8.9 | C | A |
| Example 46 | | 10.89 | 17.9 | C | A |
| Example 47 | | 16.34 | 26.8 | C | A |
| Example 48 | | 21.79 | 35.7 | C | A |

TABLE 2

Production Conditions for Structured Catalyst for Oxidation for Exhaust Gas Purification

| | Precursor Material (A) | | Addition to Precursor Material (A) | | Hydrothermal Treatment Conditions using Precursor Material (C) | | |
|---|---|---|---|---|---|---|---|
| | | | Presence | Conversion Ratio of Added Amount of | Type of | | |
| No. | Type | Pore Diameter (nm) | or Absence of Additives | Metal-containing Solution (ratio of number of atoms) Si/M | Structural Directing Agent | pH | Time (h) |
| Example 49 | MCM-41 | 1.0 | Yes | 1000 | TPABr | 12 | 72 |
| Example 50 | | | | 500 | | | |
| Example 51 | | | | 200 | | | |
| Example 52 | | | | 100 | | | |
| Example 53 | | 1.5 | | | | | |
| Example 54 | | 1.8 | | | | | |
| Example 55 | | 2.0 | | | | | |
| Example 56 | | 2.5 | | | | | |
| Example 57 | | 5.0 | | | | | |
| Example 58 | SBA-1 | 10.0 | | | | | |
| Example 59 | | 15.0 | | | | | |
| Example 60 | | 20.0 | | | | | |
| Example 61 | MCM-41 | 1.0 | None | 1000 | | | |
| Example 62 | | | | 500 | | | |
| Example 63 | | | | 200 | | | |
| Example 64 | | | | 100 | | | |
| Example 65 | | 1.5 | | | | | |
| Example 66 | | 1.8 | | | | | |
| Example 67 | | 2.0 | | | | | |
| Example 68 | | 2.5 | | | | | |
| Example 69 | | 5.0 | | | | | |
| Example 70 | SBA-1 | 10.0 | | | | | |
| Example 71 | | 15.0 | | | | | |
| Example 72 | | 20.0 | | | | | |
| Example 73 | MCM-41 | 1.0 | Yes | 1000 | TMABr | 12 | 120 |
| Example 74 | | | | 500 | | | |
| Example 75 | | | | 200 | | | |
| Example 76 | | | | 100 | | | |
| Example 77 | | 1.5 | | | | | |
| Example 78 | | 1.8 | | | | | |
| Example 79 | | 2.0 | | | | | |
| Example 80 | | 2.5 | | | | | |
| Example 81 | | 5.1 | | | | | |
| Example 82 | SBA-1 | 10.2 | | | | | |
| Example 83 | | 15.3 | | | | | |
| Example 84 | | 20.4 | | | | | |
| Example 85 | MCM-41 | 1.0 | None | 1000 | | | |
| Example 86 | | | | 500 | | | |
| Example 87 | | | | 200 | | | |
| Example 88 | | | | 100 | | | |
| Example 89 | | 1.5 | | | | | |
| Example 90 | | 1.8 | | | | | |
| Example 91 | | 2.0 | | | | | |
| Example 92 | | 2.5 | | | | | |
| Example 93 | | 5.1 | | | | | |
| Example 94 | SBA-1 | 10.2 | | | | | |
| Example 95 | | 15.3 | | | | | |
| Example 96 | | 20.4 | | | | | |

TABLE 2-continued

| | Structured Catalyst for Oxidation for Exhaust Gas Purification | | | | | | |
|---|---|---|---|---|---|---|---|
| | Support Zeolite-Type Compound | | Oxidation Catalyst Metal Oxide Nanoparticles | | | Performance Evaluation | |
| No. | Framework | Average Inner Diameter of Channels $D_F$ (nm) | Type | Average Particle Size $D_C$ (nm) | $D_C/D_F$ | Catalytic Activity | Durability |
| Example 49 | MFI | 0.56 | $CoO_x$ | 0.10 | 0.2 | C | C |
| Example 50 | | | | 0.30 | 0.5 | C | C |
| Example 51 | | | | 0.50 | 0.9 | B | C |
| Example 52 | | | | 1.00 | 1.8 | A | B |
| Example 53 | | | | 1.50 | 2.7 | A | B |
| Example 54 | | | | 1.80 | 3.2 | A | A |
| Example 55 | | | | 2.00 | 3.6 | A | A |
| Example 56 | | | | 2.50 | 4.5 | A | A |
| Example 57 | | | | 5.00 | 8.9 | B | A |
| Example 58 | | | | 10.00 | 17.9 | B | A |
| Example 59 | | | | 15.00 | 26.8 | C | A |
| Example 60 | | | | 20.00 | 35.7 | C | A |
| Example 61 | | | | 0.10 | 0.2 | C | C |
| Example 62 | | | | 0.30 | 0.5 | C | C |
| Example 63 | | | | 0.50 | 0.9 | B | C |
| Example 64 | | | | 1.00 | 1.8 | A | B |
| Example 65 | | | | 1.50 | 2.7 | A | B |
| Example 66 | | | | 1.80 | 3.2 | B | A |
| Example 67 | | | | 2.00 | 3.6 | B | A |
| Example 68 | | | | 2.50 | 4.5 | B | A |
| Example 69 | | | | 5.00 | 8.9 | C | A |
| Example 70 | | | | 10.00 | 17.9 | C | A |
| Example 71 | | | | 15.00 | 26.8 | C | A |
| Example 72 | | | | 20.00 | 35.7 | C | A |
| Example 73 | FER | 0.57 | | 0.10 | 0.2 | C | C |
| Example 74 | | | | 0.31 | 0.5 | C | C |
| Example 75 | | | | 0.51 | 0.9 | B | C |
| Example 76 | | | | 1.02 | 1.8 | A | B |
| Example 77 | | | | 1.53 | 2.7 | A | B |
| Example 78 | | | | 1.83 | 3.2 | A | B |
| Example 79 | | | | 2.04 | 3.6 | A | A |
| Example 80 | | | | 2.54 | 4.5 | A | A |
| Example 81 | | | | 5.09 | 8.9 | B | A |
| Example 82 | | | | 10.18 | 17.9 | B | A |
| Example 83 | | | | 15.27 | 26.8 | C | A |
| Example 84 | | | | 20.36 | 35.7 | C | A |
| Example 85 | | | | 0.10 | 0.2 | C | C |
| Example 86 | | | | 0.31 | 0.5 | C | C |
| Example 87 | | | | 0.51 | 0.9 | B | C |
| Example 88 | | | | 1.02 | 1.8 | A | B |
| Example 89 | | | | 1.53 | 2.7 | A | B |
| Example 90 | | | | 1.83 | 3.2 | A | B |
| Example 91 | | | | 2.04 | 3.6 | B | A |
| Example 92 | | | | 2.54 | 4.5 | B | A |
| Example 93 | | | | 5.09 | 8.9 | C | A |
| Example 94 | | | | 10.18 | 17.9 | C | A |
| Example 95 | | | | 15.27 | 26.8 | C | A |
| Example 96 | | | | 20.36 | 35.7 | C | A |

TABLE 3

Production Conditions for Structured Catalyst for Oxidation for Exhaust Gas Purification

| No. | Precursor Material (A) Type | Precursor Material (A) Pore Diameter (nm) | Addition to Precursor Material (A) Presence or Absence of Additives | Conversion Ratio of Added Amount of Metal-containing Solution (ratio of number of atoms) Si/M | Hydrothermal Treatment Conditions using Precursor Material (C) Type of Structural Directing Agent | pH | Time (h) |
|---|---|---|---|---|---|---|---|
| Example 97 | MCM-41 | 1.3 | Yes | 1000 | TEABr | 12 | 120 |
| Example 98 | | | | 500 | | | |
| Example 99 | | | | 200 | | | |
| Example 100 | | | | 100 | | | |
| Example 101 | | 2.0 | | | | | |
| Example 102 | | 2.4 | | | | | |
| Example 103 | | 2.6 | | | | | |
| Example 104 | | 3.3 | | | | | |
| Example 105 | | 6.6 | | | | | |
| Example 106 | SBA-1 | 13.2 | | | | | |
| Example 107 | | 19.8 | | | | | |
| Example 108 | | 26.4 | | | | | |
| Example 109 | MCM-41 | 1.3 | None | 1000 | | | |
| Example 110 | | | | 500 | | | |
| Example 111 | | | | 200 | | | |
| Example 112 | | | | 100 | | | |
| Example 113 | | 2.0 | | | | | |
| Example 114 | | 2.4 | | | | | |
| Example 115 | | 2.6 | | | | | |
| Example 116 | | 3.3 | | | | | |
| Example 117 | | 6.6 | | | | | |
| Example 118 | SBA-1 | 13.2 | | | | | |
| Example 119 | | 19.8 | | | | | |
| Example 120 | | 26.4 | | | | | |
| Example 121 | MCM-41 | 1.1 | Yes | 1000 | | 11 | 72 |
| Example 122 | | | | 500 | | | |
| Example 123 | | | | 200 | | | |
| Example 124 | | | | 100 | | | |
| Example 125 | | 1.6 | | | | | |
| Example 126 | | 2.0 | | | | | |
| Example 127 | | 2.2 | | | | | |
| Example 128 | | 2.7 | | | | | |
| Example 129 | | 5.4 | | | | | |
| Example 130 | SBA-1 | 10.9 | | | | | |
| Example 131 | | 16.3 | | | | | |
| Example 132 | | 21.8 | | | | | |
| Example 133 | MCM-41 | 1.1 | None | 1000 | | | |
| Example 134 | | | | 500 | | | |
| Example 135 | | | | 200 | | | |
| Example 136 | | | | 100 | | | |
| Example 137 | | 1.6 | | | | | |
| Example 138 | | 2.0 | | | | | |
| Example 139 | | 2.2 | | | | | |
| Example 140 | | 2.7 | | | | | |
| Example 141 | | 5.4 | | | | | |
| Example 142 | SBA-1 | 10.9 | | | | | |
| Example 143 | | 16.3 | | | | | |
| Example 144 | | 21.8 | | | | | |

TABLE 3-continued

Structured Catalyst for Oxidation for Exhaust Gas Purification

| | Support Zeolite-Type Compound | | Oxidation Catalyst Metal Oxide Nanoparticles | | | Performance Evaluation | |
|---|---|---|---|---|---|---|---|
| No. | Framework | Average Inner Diameter of Channels $D_F$ (nm) | Type | Average Particle Size $D_C$ (nm) | $D_C/D_F$ | Catalytic Activity | Durability |
| Example 97 | FAU | 0.74 | NiO$_x$ | 0.13 | 0.2 | C | C |
| Example 98 | | | | 0.40 | 0.5 | C | C |
| Example 99 | | | | 0.66 | 0.9 | B | C |
| Example 100 | | | | 1.32 | 1.8 | A | B |
| Example 101 | | | | 1.98 | 2.7 | A | B |
| Example 102 | | | | 2.38 | 3.2 | A | A |
| Example 103 | | | | 2.64 | 3.6 | A | A |
| Example 104 | | | | 3.30 | 4.5 | A | A |
| Example 105 | | | | 6.61 | 8.9 | B | A |
| Example 106 | | | | 13.21 | 17.9 | B | A |
| Example 107 | | | | 19.82 | 26.8 | C | A |
| Example 108 | | | | 26.43 | 35.7 | C | A |
| Example 109 | | | | 0.13 | 0.2 | C | C |
| Example 110 | | | | 0.40 | 0.5 | C | C |
| Example 111 | | | | 0.66 | 0.9 | B | C |
| Example 112 | | | | 1.32 | 1.8 | A | B |
| Example 113 | | | | 1.98 | 2.7 | A | B |
| Example 114 | | | | 2.38 | 3.2 | B | A |
| Example 115 | | | | 2.64 | 3.6 | B | A |
| Example 116 | | | | 3.30 | 4.5 | B | A |
| Example 117 | | | | 6.61 | 8.9 | C | A |
| Example 118 | | | | 13.21 | 17.9 | C | A |
| Example 119 | | | | 19.82 | 26.8 | C | A |
| Example 120 | | | | 26.43 | 35.7 | C | A |
| Example 121 | MTW | 0.61 | | 0.11 | 0.2 | C | C |
| Example 122 | | | | 0.33 | 0.5 | C | C |
| Example 123 | | | | 0.54 | 0.9 | B | C |
| Example 124 | | | | 1.09 | 1.8 | A | B |
| Example 125 | | | | 1.63 | 2.7 | A | B |
| Example 126 | | | | 1.96 | 3.2 | A | B |
| Example 127 | | | | 2.18 | 3.6 | A | A |
| Example 128 | | | | 2.72 | 4.5 | A | A |
| Example 129 | | | | 5.45 | 8.9 | B | A |
| Example 130 | | | | 10.89 | 17.9 | B | A |
| Example 131 | | | | 16.34 | 26.8 | C | A |
| Example 132 | | | | 21.79 | 35.7 | C | A |
| Example 133 | | | | 0.11 | 0.2 | C | C |
| Example 134 | | | | 0.33 | 0.5 | C | C |
| Example 135 | | | | 0.54 | 0.9 | B | C |
| Example 136 | | | | 1.09 | 1.8 | A | B |
| Example 137 | | | | 1.63 | 2.7 | A | B |
| Example 138 | | | | 1.96 | 3.2 | A | B |
| Example 139 | | | | 2.18 | 3.6 | B | A |
| Example 140 | | | | 2.72 | 4.5 | B | A |
| Example 141 | | | | 5.45 | 8.9 | C | A |
| Example 142 | | | | 10.89 | 17.9 | C | A |
| Example 143 | | | | 16.34 | 26.8 | C | A |
| Example 144 | | | | 21.79 | 35.7 | C | A |

TABLE 4

Production Conditions for Structured Catalyst for Oxidation for Exhaust Gas Purification

| No. | Precursor Material (A) Type | Precursor Material (A) Pore Diameter (nm) | Addition to Precursor Material (A) Presence or Absence of Additives | Addition to Precursor Material (A) Conversion Ratio of Added Amount of Metal-containing Solution (ratio of number of atoms) Si/M | Hydrothermal Treatment Conditions using Precursor Material (C) Type of Structural Directing Agent | pH | Time (h) |
|---|---|---|---|---|---|---|---|
| Example 145 | MCM-41 | 1.0 | Yes | 1000 | TEABr | 12 | 72 |
| Example 146 | | | | 500 | | | |
| Example 147 | | | | 200 | | | |
| Example 148 | | | | 100 | | | |
| Example 149 | | 1.5 | | | | | |
| Example 150 | | 1.8 | | | | | |
| Example 151 | | 2.0 | | | | | |
| Example 152 | | 2.5 | | | | | |
| Example 153 | | 5.0 | | | | | |
| Example 154 | SBA-1 | 10.0 | | | | | |
| Example 155 | | 15.0 | | | | | |
| Example 156 | | 20.0 | | | | | |
| Example 157 | MCM-41 | 1.0 | None | 1000 | | | |
| Example 158 | | | | 500 | | | |
| Example 159 | | | | 200 | | | |
| Example 160 | | | | 100 | | | |
| Example 161 | | 1.5 | | | | | |
| Example 162 | | 1.8 | | | | | |
| Example 163 | | 2.0 | | | | | |
| Example 164 | | 2.5 | | | | | |
| Example 165 | | 5.0 | | | | | |
| Example 166 | SBA-1 | 10.0 | | | | | |
| Example 167 | | 15.0 | | | | | |
| Example 168 | | 20.0 | | | | | |
| Example 169 | MCM-41 | 1.0 | Yes | 1000 | TMABr | 12 | 120 |
| Example 170 | | | | 500 | | | |
| Example 171 | | | | 200 | | | |
| Example 172 | | | | 100 | | | |
| Example 173 | | 1.5 | | | | | |
| Example 174 | | 1.8 | | | | | |
| Example 175 | | 2.0 | | | | | |
| Example 176 | | 2.5 | | | | | |
| Example 177 | | 5.1 | | | | | |
| Example 178 | SBA-1 | 10.2 | | | | | |
| Example 179 | | 15.3 | | | | | |
| Example 180 | | 20.4 | | | | | |
| Example 181 | MCM-41 | 1.0 | None | 1000 | | | |
| Example 182 | | | | 500 | | | |
| Example 183 | | | | 200 | | | |
| Example 184 | | | | 100 | | | |
| Example 185 | | 1.5 | | | | | |
| Example 186 | | 1.8 | | | | | |
| Example 187 | | 2.0 | | | | | |
| Example 188 | | 2.5 | | | | | |
| Example 189 | | 5.1 | | | | | |
| Example 190 | SBA-1 | 10.2 | | | | | |
| Example 191 | | 15.3 | | | | | |
| Example 192 | | 20.4 | | | | | |

TABLE 4-continued

| | Structured Catalyst for Oxidation for Exhaust Gas Purification | | | | | |
|---|---|---|---|---|---|---|
| | Support Zeolite-Type Compound | | Oxidation Catalyst Metal Oxide Nanoparticles | | Performance Evaluation | |
| No. | Framework | Average Inner Diameter of Channels $D_F$ (nm) | Type | Average Particle Size $D_C$ (nm) | $D_C/D_F$ | Catalytic Activity | Durability |
| Example 145 | MFI | 0.56 | $NiO_x$ | 0.10 | 0.2 | C | C |
| Example 146 | | | | 0.30 | 0.5 | C | C |
| Example 147 | | | | 0.50 | 0.9 | B | C |
| Example 148 | | | | 1.00 | 1.8 | A | B |
| Example 149 | | | | 1.5 | 2.7 | A | B |
| Example 150 | | | | 1.8 | 3.2 | A | A |
| Example 151 | | | | 2.0 | 3.6 | A | A |
| Example 152 | | | | 2.5 | 4.5 | A | A |
| Example 153 | | | | 5.0 | 8.9 | B | A |
| Example 154 | | | | 10.0 | 17.9 | B | A |
| Example 155 | | | | 15.0 | 26.8 | C | A |
| Example 156 | | | | 20.0 | 35.7 | C | A |
| Example 157 | | | | 0.10 | 0.2 | C | C |
| Example 158 | | | | 0.30 | 0.5 | C | C |
| Example 159 | | | | 0.50 | 0.9 | B | C |
| Example 160 | | | | 1.0 | 1.8 | A | B |
| Example 161 | | | | 1.5 | 2.7 | A | B |
| Example 162 | | | | 1.8 | 3.2 | B | A |
| Example 163 | | | | 2.0 | 3.6 | B | A |
| Example 164 | | | | 2.5 | 4.5 | B | A |
| Example 165 | | | | 5.0 | 8.9 | C | A |
| Example 166 | | | | 10.0 | 17.9 | C | A |
| Example 167 | | | | 15.0 | 26.8 | C | A |
| Example 168 | | | | 20.0 | 35.7 | C | A |
| Example 169 | FER | 0.57 | | 0.10 | 0.2 | C | C |
| Example 170 | | | | 0.31 | 0.5 | C | C |
| Example 171 | | | | 0.51 | 0.9 | B | C |
| Example 172 | | | | 1.02 | 1.8 | A | B |
| Example 173 | | | | 1.5 | 2.7 | A | B |
| Example 174 | | | | 1.8 | 3.2 | A | B |
| Example 175 | | | | 2.0 | 3.6 | A | A |
| Example 176 | | | | 2.5 | 4.5 | A | A |
| Example 177 | | | | 5.1 | 8.9 | B | A |
| Example 178 | | | | 10.2 | 17.9 | B | A |
| Example 179 | | | | 15.3 | 26.8 | C | A |
| Example 180 | | | | 20.4 | 35.7 | C | A |
| Example 181 | | | | 0.10 | 0.2 | C | C |
| Example 182 | | | | 0.31 | 0.5 | C | C |
| Example 183 | | | | 0.51 | 0.9 | B | C |
| Example 184 | | | | 1.0 | 1.8 | A | B |
| Example 185 | | | | 1.5 | 2.7 | A | B |
| Example 186 | | | | 1.8 | 3.2 | A | B |
| Example 187 | | | | 2.0 | 3.6 | B | A |
| Example 188 | | | | 2.5 | 4.5 | B | A |
| Example 189 | | | | 5.1 | 8.9 | C | A |
| Example 190 | | | | 10.2 | 17.9 | C | A |
| Example 191 | | | | 15.3 | 26.8 | C | A |
| Example 192 | | | | 20.4 | 35.7 | C | A |

TABLE 5

Production Conditions for Structured Catalyst for Oxidation for Exhaust Gas Purification

| | Precursor Material (A) | | Addition to Precursor Material (A) | | Hydrothermal Treatment Conditions using Precursor Material (C) | | |
|---|---|---|---|---|---|---|---|
| No. | Type | Pore Diameter (nm) | Presence or Absence of Additives | Conversion Ratio of Added Amount of Metal-containing Solution (ratio of number of atoms) Si/M | Type of Structural Directing Agent | pH | Time (h) |
| Example 193 | MCM-41 | 1.3 | Yes | 1000 | TEABr | 12 | 120 |
| Example 194 | | | | 500 | | | |
| Example 195 | | | | 200 | | | |
| Example 196 | | | | 100 | | | |
| Example 197 | | 2.0 | | | | | |
| Example 198 | | 2.4 | | | | | |
| Example 199 | | 2.6 | | | | | |
| Example 200 | | 3.3 | | | | | |
| Example 201 | | 6.6 | | | | | |
| Example 202 | SBA-1 | 13.2 | | | | | |
| Example 203 | | 19.8 | | | | | |
| Example 204 | | 26.4 | | | | | |
| Example 205 | MCM-41 | 1.3 | None | 1000 | | | |
| Example 206 | | | | 500 | | | |
| Example 207 | | | | 200 | | | |
| Example 208 | | | | 100 | | | |
| Example 209 | | 2.0 | | | | | |
| Example 210 | | 2.4 | | | | | |
| Example 211 | | 2.6 | | | | | |
| Example 212 | | 3.3 | | | | | |
| Example 213 | | 6.6 | | | | | |
| Example 214 | SBA-1 | 13.2 | | | | | |
| Example 215 | | 19.8 | | | | | |
| Example 216 | | 26.4 | | | | | |
| Example 217 | MCM-41 | 1.1 | Yes | 1000 | | 11 | 72 |
| Example 218 | | | | 500 | | | |
| Example 219 | | | | 200 | | | |
| Example 220 | | | | 100 | | | |
| Example 221 | | 1.6 | | | | | |
| Example 222 | | 2.0 | | | | | |
| Example 223 | | 2.2 | | | | | |
| Example 224 | | 2.7 | | | | | |
| Example 225 | | 5.4 | | | | | |
| Example 226 | SBA-1 | 10.9 | | | | | |
| Example 227 | | 16.3 | | | | | |
| Example 228 | | 21.8 | | | | | |
| Example 229 | MCM-41 | 1.1 | None | 1000 | | | |
| Example 230 | | | | 500 | | | |
| Example 231 | | | | 200 | | | |
| Example 232 | | | | 100 | | | |
| Example 233 | | 1.6 | | | | | |
| Example 234 | | 2.0 | | | | | |
| Example 235 | | 2.2 | | | | | |
| Example 236 | | 2.7 | | | | | |
| Example 237 | | 5.4 | | | | | |
| Example 238 | SBA-1 | 10.9 | | | | | |
| Example 239 | | 16.3 | | | | | |
| Example 240 | | 21.8 | | | | | |

| | Structured Catalyst for Oxidation for Exhaust Gas Purification | | | | | | |
|---|---|---|---|---|---|---|---|
| | Support Zeolite-Type Compound | | Oxidation Catalyst Metal Oxide Nanoparticles | | | Performance Evaluation | |
| No. | Framework | Average Inner Diameter of Channels $D_F$ (nm) | Type | Average Particle Size $D_C$ (nm) | $D_C/D_F$ | Catalytic Activity | Durability |
| Example 193 | FAU | 0.74 | $FeO_x$ | 0.13 | 0.2 | C | C |
| Example 194 | | | | 0.40 | 0.5 | C | C |
| Example 195 | | | | 0.66 | 0.9 | B | C |
| Example 196 | | | | 1.32 | 1.8 | A | B |
| Example 197 | | | | 1.98 | 2.7 | A | B |

TABLE 5-continued

| No. | Type | Pore Diameter | | | | |
|---|---|---|---|---|---|---|
| Example 198 | | | 2.38 | 3.2 | A | A |
| Example 199 | | | 2.64 | 3.6 | A | A |
| Example 200 | | | 3.30 | 4.5 | A | A |
| Example 201 | | | 6.61 | 8.9 | B | A |
| Example 202 | | | 13.21 | 17.9 | B | A |
| Example 203 | | | 19.82 | 26.8 | C | A |
| Example 204 | | | 26.43 | 35.7 | C | A |
| Example 205 | | | 0.13 | 0.2 | C | C |
| Example 206 | | | 0.40 | 0.5 | C | C |
| Example 207 | | | 0.66 | 0.9 | B | C |
| Example 208 | | | 1.32 | 1.8 | A | B |
| Example 209 | | | 1.98 | 2.7 | A | B |
| Example 210 | | | 2.38 | 3.2 | B | A |
| Example 211 | | | 2.64 | 3.6 | B | A |
| Example 212 | | | 3.30 | 4.5 | B | A |
| Example 213 | | | 6.61 | 8.9 | C | A |
| Example 214 | | | 13.21 | 17.9 | C | A |
| Example 215 | | | 19.82 | 26.8 | C | A |
| Example 216 | | | 26.43 | 35.7 | C | A |
| Example 217 | MTW | 0.61 | 0.11 | 0.2 | C | C |
| Example 218 | | | 0.33 | 0.5 | C | C |
| Example 219 | | | 0.54 | 0.9 | B | C |
| Example 220 | | | 1.09 | 1.8 | A | B |
| Example 221 | | | 1.63 | 2.7 | A | B |
| Example 222 | | | 1.96 | 3.2 | A | B |
| Example 223 | | | 2.18 | 3.6 | A | A |
| Example 224 | | | 2.72 | 4.5 | A | A |
| Example 225 | | | 5.45 | 8.9 | B | A |
| Example 226 | | | 10.89 | 17.9 | B | A |
| Example 227 | | | 16.34 | 26.8 | C | A |
| Example 228 | | | 21.79 | 35.7 | C | A |
| Example 229 | | | 0.11 | 0.2 | C | C |
| Example 230 | | | 0.33 | 0.5 | C | C |
| Example 231 | | | 0.54 | 0.9 | B | C |
| Example 232 | | | 1.09 | 1.8 | A | B |
| Example 233 | | | 1.63 | 2.7 | A | B |
| Example 234 | | | 1.96 | 3.2 | A | B |
| Example 235 | | | 2.18 | 3.6 | B | A |
| Example 236 | | | 2.72 | 4.5 | B | A |
| Example 237 | | | 5.45 | 8.9 | C | A |
| Example 238 | | | 10.89 | 17.9 | C | A |
| Example 239 | | | 16.34 | 26.8 | C | A |
| Example 240 | | | 21.79 | 35.7 | C | A |

TABLE 6

Production Conditions for Structured Catalyst for Oxidation for Exhaust Gas Purification

| No. | Precursor Material (A) Type | Pore Diameter (nm) | Presence or Absence of Additives | Conversion Ratio of Added Amount of Metal-containing Solution (ratio of number of atoms) Si/M | Type of Structural Directing Agent | pH | Time (h) |
|---|---|---|---|---|---|---|---|
| Example 241 | MCM-41 | 1.0 | Yes | 1000 | TPABr | 12 | 72 |
| Example 242 | | | | 500 | | | |
| Example 243 | | | | 200 | | | |
| Example 244 | | | | 100 | | | |
| Example 245 | | 1.5 | | | | | |
| Example 246 | | 1.8 | | | | | |
| Example 247 | | 2.0 | | | | | |
| Example 248 | | 2.5 | | | | | |
| Example 249 | | 5.0 | | | | | |
| Example 250 | SBA-1 | 10.0 | | | | | |
| Example 251 | | 15.0 | | | | | |
| Example 252 | | 20.0 | | | | | |
| Example 253 | MCM-41 | 1.0 | None | 1000 | | | |
| Example 254 | | | | 500 | | | |
| Example 255 | | | | 200 | | | |
| Example 256 | | | | 100 | | | |
| Example 257 | | 1.5 | | | | | |
| Example 258 | | 1.8 | | | | | |
| Example 259 | | 2.0 | | | | | |

TABLE 6-continued

| | | | | | | | | |
|---|---|---|---|---|---|---|---|---|
| Example 260 | | 2.5 | | | | | | |
| Example 261 | | 5.0 | | | | | | |
| Example 262 | SBA-1 | 10.0 | | | | | | |
| Example 263 | | 15.0 | | | | | | |
| Example 264 | | 20.0 | | | | | | |
| Example 265 | MCM-41 | 1.0 | Yes | 1000 | TMABr | 12 | 120 | |
| Example 266 | | | | 500 | | | | |
| Example 267 | | | | 200 | | | | |
| Example 268 | | | | 100 | | | | |
| Example 269 | | 1.5 | | | | | | |
| Example 270 | | 1.8 | | | | | | |
| Example 271 | | 2.0 | | | | | | |
| Example 272 | | 2.5 | | | | | | |
| Example 273 | | 5.1 | | | | | | |
| Example 274 | SBA-1 | 10.2 | | | | | | |
| Example 275 | | 15.3 | | | | | | |
| Example 276 | | 20.4 | | | | | | |
| Example 277 | MCM-41 | 1.0 | None | 1000 | | | | |
| Example 278 | | | | 500 | | | | |
| Example 279 | | | | 200 | | | | |
| Example 280 | | | | 100 | | | | |
| Example 281 | | 1.5 | | | | | | |
| Example 282 | | 1.8 | | | | | | |
| Example 283 | | 2.0 | | | | | | |
| Example 284 | | 2.5 | | | | | | |
| Example 285 | | 5.1 | | | | | | |
| Example 286 | SBA-1 | 10.2 | | | | | | |
| Example 287 | | 15.3 | | | | | | |
| Example 288 | | 20.4 | | | | | | |

| | Structured Catalyst for Oxidation for Exhaust Gas Purification | | | | | | |
|---|---|---|---|---|---|---|---|
| | Support Zeolite-Type Compound | | Oxidation Catalyst Metal Oxide Nanoparticles | | | Performance Evaluation | |
| No. | Framework | Average Inner Diameter of Channels $D_F$ (nm) | Type | Average Particle Size $D_C$ (nm) | $D_C/D_F$ | Catalytic Activity | Durability |
| Example 241 | MFI | 0.56 | $FeO_x$ | 0.10 | 0.2 | C | C |
| Example 242 | | | | 0.30 | 0.5 | C | C |
| Example 243 | | | | 0.50 | 0.9 | B | C |
| Example 244 | | | | 1.00 | 1.8 | A | B |
| Example 245 | | | | 1.50 | 2.7 | A | B |
| Example 246 | | | | 1.80 | 3.2 | A | A |
| Example 247 | | | | 2.00 | 3.6 | A | A |
| Example 248 | | | | 2.50 | 4.5 | A | A |
| Example 249 | | | | 5.00 | 8.9 | B | A |
| Example 250 | | | | 10.00 | 17.9 | B | A |
| Example 251 | | | | 15.00 | 26.8 | C | A |
| Example 252 | | | | 20.00 | 35.7 | C | A |
| Example 253 | | | | 0.10 | 0.2 | C | C |
| Example 254 | | | | 0.30 | 0.5 | C | C |
| Example 255 | | | | 0.50 | 0.9 | B | C |
| Example 256 | | | | 1.00 | 1.8 | A | B |
| Example 257 | | | | 1.50 | 2.7 | A | B |
| Example 258 | | | | 1.80 | 3.2 | B | A |
| Example 259 | | | | 2.00 | 3.6 | B | A |
| Example 260 | | | | 2.50 | 4.5 | B | A |
| Example 261 | | | | 5.00 | 8.9 | C | A |
| Example 262 | | | | 10.00 | 17.9 | C | A |
| Example 263 | | | | 15.00 | 26.8 | C | A |
| Example 264 | | | | 20.00 | 35.7 | C | A |
| Example 265 | MTW | 0.57 | | 0.10 | 0.2 | C | C |
| Example 266 | | | | 0.31 | 0.5 | C | C |
| Example 267 | | | | 0.51 | 0.9 | B | C |
| Example 268 | | | | 1.02 | 1.8 | A | B |
| Example 269 | | | | 1.53 | 2.7 | A | B |
| Example 270 | | | | 1.83 | 3.2 | A | B |
| Example 271 | | | | 2.04 | 3.6 | A | A |
| Example 272 | | | | 2.54 | 4.5 | A | A |
| Example 273 | | | | 5.09 | 8.9 | B | A |
| Example 274 | | | | 10.18 | 17.9 | B | A |
| Example 275 | | | | 15.27 | 26.8 | C | A |
| Example 276 | | | | 20.36 | 35.7 | C | A |

TABLE 6-continued

| | | | | | |
|---|---|---|---|---|---|
| Example 277 | | 0.10 | 0.2 | C | C |
| Example 278 | | 0.31 | 0.5 | C | C |
| Example 279 | | 0.51 | 0.9 | B | C |
| Example 280 | | 1.02 | 1.8 | A | B |
| Example 281 | | 1.53 | 2.7 | A | B |
| Example 282 | | 1.83 | 3.2 | A | B |
| Example 283 | | 2.04 | 3.6 | B | A |
| Example 284 | | 2.54 | 4.5 | B | A |
| Example 285 | | 5.09 | 8.9 | C | A |
| Example 286 | | 10.18 | 17.9 | C | A |
| Example 287 | | 15.27 | 26.8 | C | A |
| Example 288 | | 20.36 | 35.7 | C | A |

TABLE 7

Production Conditions for Structured Catalyst for Oxidation for Exhaust Gas Purification

| | Precursor Material (A) | | Addition to Precursor Material (A) | | Hydrothermal Treatment Conditions using Precursor Material (C) | | |
|---|---|---|---|---|---|---|---|
| No. | Type | Pore Diameter (nm) | Presence or Absence of Additives | Conversion Ratio of Added Amount of Metal-containing Solution (ratio of number of atoms) Si/M | Type of Structural Directing Agent | pH | Time (h) |
| Example 289 | MCM-41 | 1.3 | Yes | 1000 | TEABr | 12 | 120 |
| Example 290 | | | | 500 | | | |
| Example 291 | | | | 200 | | | |
| Example 292 | | | | 100 | | | |
| Example 293 | | 2.0 | | | | | |
| Example 294 | | 2.4 | | | | | |
| Example 295 | | 2.6 | | | | | |
| Example 296 | | 3.3 | | | | | |
| Example 297 | | 6.6 | | | | | |
| Example 298 | SBA-1 | 13.2 | | | | | |
| Example 299 | | 19.8 | | | | | |
| Example 300 | | 26.4 | | | | | |
| Example 301 | MCM-41 | 1.3 | None | 1000 | | | |
| Example 302 | | | | 500 | | | |
| Example 303 | | | | 200 | | | |
| Example 304 | | | | 100 | | | |
| Example 305 | | 2.0 | | | | | |
| Example 306 | | 2.4 | | | | | |
| Example 307 | | 2.6 | | | | | |
| Example 308 | | 3.3 | | | | | |
| Example 309 | | 6.6 | | | | | |
| Example 310 | SBA-1 | 13.2 | | | | | |
| Example 311 | | 19.8 | | | | | |
| Example 312 | | 26.4 | | | | | |
| Example 313 | MCM-41 | 1.1 | Yes | 1000 | | 11 | 72 |
| Example 314 | | | | 500 | | | |
| Example 315 | | | | 200 | | | |
| Example 316 | | | | 100 | | | |
| Example 317 | | 1.6 | | | | | |
| Example 318 | | 2.0 | | | | | |
| Example 319 | | 2.2 | | | | | |
| Example 320 | | 2.7 | | | | | |
| Example 321 | | 5.4 | | | | | |
| Example 322 | SBA-1 | 10.9 | | | | | |
| Example 323 | | 16.3 | | | | | |
| Example 324 | | 21.8 | | | | | |
| Example 325 | MCM-41 | 1.1 | None | 1000 | | | |
| Example 326 | | | | 500 | | | |
| Example 327 | | | | 200 | | | |
| Example 328 | | | | 100 | | | |
| Example 329 | | 1.6 | | | | | |
| Example 330 | | 2.0 | | | | | |
| Example 331 | | 2.2 | | | | | |
| Example 332 | | 2.7 | | | | | |
| Example 333 | | 5.4 | | | | | |
| Example 334 | SBA-1 | 10.9 | | | | | |
| Example 335 | | 16.3 | | | | | |
| Example 336 | | 21.8 | | | | | |

TABLE 7-continued

Structured Catalyst for Oxidation for Exhaust Gas Purification

| No. | Support Zeolite-Type Compound Framework | Average Inner Diameter of Channels $D_F$ (nm) | Oxidation Catalyst Metal Oxide Nanoparticles Type | Average Particle Size $D_C$ (nm) | $D_C/D_F$ | Performance Evaluation Catalytic Activity | Durability |
|---|---|---|---|---|---|---|---|
| Example 289 | FAU | 0.74 | CuO$_x$ | 0.13 | 0.2 | C | C |
| Example 290 | | | | 0.40 | 0.5 | C | C |
| Example 291 | | | | 0.66 | 0.9 | B | C |
| Example 292 | | | | 1.32 | 1.8 | A | B |
| Example 293 | | | | 1.98 | 2.7 | A | B |
| Example 294 | | | | 2.38 | 3.2 | A | A |
| Example 295 | | | | 2.64 | 3.6 | A | A |
| Example 296 | | | | 3.30 | 4.5 | A | A |
| Example 297 | | | | 6.61 | 8.9 | B | A |
| Example 298 | | | | 13.21 | 17.9 | B | A |
| Example 299 | | | | 19.82 | 26.8 | C | A |
| Example 300 | | | | 26.43 | 35.7 | C | A |
| Example 301 | | | | 0.13 | 0.2 | C | C |
| Example 302 | | | | 0.40 | 0.5 | C | C |
| Example 303 | | | | 0.66 | 0.9 | B | C |
| Example 304 | | | | 1.32 | 1.8 | A | B |
| Example 305 | | | | 1.98 | 2.7 | A | B |
| Example 306 | | | | 2.38 | 3.2 | B | A |
| Example 307 | | | | 2.64 | 3.6 | B | A |
| Example 308 | | | | 3.30 | 4.5 | B | A |
| Example 309 | | | | 6.61 | 8.9 | C | A |
| Example 310 | | | | 13.21 | 17.9 | C | A |
| Example 311 | | | | 19.82 | 26.8 | C | A |
| Example 312 | | | | 26.43 | 35.7 | C | A |
| Example 313 | MTW | 0.61 | | 0.11 | 0.2 | C | C |
| Example 314 | | | | 0.33 | 0.5 | C | C |
| Example 315 | | | | 0.54 | 0.9 | B | C |
| Example 316 | | | | 1.09 | 1.8 | A | B |
| Example 317 | | | | 1.63 | 2.7 | A | B |
| Example 318 | | | | 1.96 | 3.2 | A | B |
| Example 319 | | | | 2.18 | 3.6 | A | A |
| Example 320 | | | | 2.72 | 4.5 | A | A |
| Example 321 | | | | 5.45 | 8.9 | B | A |
| Example 322 | | | | 10.89 | 17.9 | B | A |
| Example 323 | | | | 16.34 | 26.8 | C | A |
| Example 324 | | | | 21.79 | 35.7 | C | A |
| Example 325 | | | | 0.11 | 0.2 | C | C |
| Example 326 | | | | 0.33 | 0.5 | C | C |
| Example 327 | | | | 0.54 | 0.9 | B | C |
| Example 328 | | | | 1.09 | 1.8 | A | B |
| Example 329 | | | | 1.63 | 2.7 | A | B |
| Example 330 | | | | 1.96 | 3.2 | A | B |
| Example 331 | | | | 2.18 | 3.6 | B | A |
| Example 332 | | | | 2.72 | 4.5 | B | A |
| Example 333 | | | | 5.45 | 8.9 | C | A |
| Example 334 | | | | 10.89 | 17.9 | C | A |
| Example 335 | | | | 16.34 | 26.8 | C | A |
| Example 336 | | | | 21.79 | 35.7 | C | A |

TABLE 8

Production Conditions for Structured Catalyst for Oxidation for Exhaust Gas Purification

| No. | Precursor Material (A) Type | Precursor Material (A) Pore Diameter (nm) | Addition to Precursor Material (A) Presence or Absence of Additives | Addition to Precursor Material (A) Conversion Ratio of Added Amount of Metal-containing Solution (ratio of number of atoms) Si/M | Hydrothermal Treatment Conditions using Precursor Material (C) Type of Structural Directing Agent | pH | Time (h) |
|---|---|---|---|---|---|---|---|
| Example 337 | MCM-41 | 1.0 | Yes | 1000 | TPABr | 12 | 72 |
| Example 338 | | | | 500 | | | |
| Example 339 | | | | 200 | | | |
| Example 340 | | | | 100 | | | |
| Example 341 | | 1.5 | | | | | |
| Example 342 | | 1.8 | | | | | |
| Example 343 | | 2.0 | | | | | |
| Example 344 | | 2.5 | | | | | |
| Example 345 | | 5.0 | | | | | |
| Example 346 | SBA-1 | 10.0 | | | | | |
| Example 347 | | 15.0 | | | | | |
| Example 348 | | 20.0 | | | | | |
| Example 349 | MCM-41 | 1.0 | None | 1000 | | | |
| Example 350 | | | | 500 | | | |
| Example 351 | | | | 200 | | | |
| Example 352 | | | | 100 | | | |
| Example 353 | | 1.5 | | | | | |
| Example 354 | | 1.8 | | | | | |
| Example 355 | | 2.0 | | | | | |
| Example 356 | | 2.5 | | | | | |
| Example 357 | | 5.0 | | | | | |
| Example 358 | SBA-1 | 10.0 | | | | | |
| Example 359 | | 15.0 | | | | | |
| Example 360 | | 20.0 | | | | | |
| Example 361 | MCM-41 | 1.0 | Yes | 1000 | TMABr | 12 | 120 |
| Example 362 | | | | 500 | | | |
| Example 363 | | | | 200 | | | |
| Example 364 | | | | 100 | | | |
| Example 365 | | 1.5 | | | | | |
| Example 366 | | 1.8 | | | | | |
| Example 367 | | 2.0 | | | | | |
| Example 368 | | 2.5 | | | | | |
| Example 369 | | 5.1 | | | | | |
| Example 370 | SBA-1 | 10.2 | | | | | |
| Example 371 | | 15.3 | | | | | |
| Example 372 | | 20.4 | | | | | |
| Example 373 | MCM-41 | 1.0 | None | 1000 | | | |
| Example 374 | | | | 500 | | | |
| Example 375 | | | | 200 | | | |
| Example 376 | | | | 100 | | | |
| Example 377 | | 1.5 | | | | | |
| Example 378 | | 1.8 | | | | | |
| Example 379 | | 2.0 | | | | | |
| Example 380 | | 2.5 | | | | | |
| Example 381 | | 5.1 | | | | | |
| Example 382 | SBA-1 | 10.2 | | | | | |
| Example 383 | | 15.3 | | | | | |
| Example 384 | | 20.4 | | | | | |
| Comparative Example 1 | | | | — | | | |
| Comparative Example 2 | | | | — | | | |

TABLE 8-continued

Structured Catalyst for Oxidation for Exhaust Gas Purification

| No. | Support Zeolite-Type Compound Framework | Average Inner Diameter of Channels $D_F$ (nm) | Oxidation Catalyst Metal Oxide Nanoparticles Type | Average Particle Size $D_C$ (nm) | $D_C/D_F$ | Performance Evaluation Catalytic Activity | Durability |
|---|---|---|---|---|---|---|---|
| Example 337 | MFI | 0.56 | $CuO_x$ | 0.10 | 0.2 | C | C |
| Example 338 | | | | 0.30 | 0.5 | C | C |
| Example 339 | | | | 0.50 | 0.9 | B | C |
| Example 340 | | | | 1.00 | 1.8 | A | B |
| Example 341 | | | | 1.50 | 2.7 | A | B |
| Example 342 | | | | 1.80 | 3.2 | A | A |
| Example 343 | | | | 2.00 | 3.6 | A | A |
| Example 344 | | | | 2.50 | 4.5 | A | A |
| Example 345 | | | | 5.00 | 8.9 | B | A |
| Example 346 | | | | 10.00 | 17.9 | B | A |
| Example 347 | | | | 15.00 | 26.8 | C | A |
| Example 348 | | | | 20.00 | 35.7 | C | A |
| Example 349 | | | | 0.10 | 0.2 | C | C |
| Example 350 | | | | 0.30 | 0.5 | C | C |
| Example 351 | | | | 0.50 | 0.9 | B | C |
| Example 352 | | | | 1.00 | 1.8 | A | B |
| Example 353 | | | | 1.50 | 2.7 | A | B |
| Example 354 | | | | 1.80 | 3.2 | B | A |
| Example 355 | | | | 2.00 | 3.6 | B | A |
| Example 356 | | | | 2.50 | 4.5 | B | A |
| Example 357 | | | | 5.00 | 8.9 | C | A |
| Example 358 | | | | 10.00 | 17.9 | C | A |
| Example 359 | | | | 15.00 | 26.8 | C | A |
| Example 360 | | | | 20.00 | 35.7 | C | A |
| Example 361 | MTW | 0.57 | | 0.10 | 0.2 | C | C |
| Example 362 | | | | 0.31 | 0.5 | C | C |
| Example 363 | | | | 0.51 | 0.9 | B | C |
| Example 364 | | | | 1.02 | 1.8 | A | B |
| Example 365 | | | | 1.53 | 2.7 | A | B |
| Example 366 | | | | 1.83 | 3.2 | A | B |
| Example 367 | | | | 2.04 | 3.6 | A | A |
| Example 368 | | | | 2.54 | 4.5 | A | A |
| Example 369 | | | | 5.09 | 8.9 | B | A |
| Example 370 | | | | 10.18 | 17.9 | B | A |
| Example 371 | | | | 15.27 | 26.8 | C | A |
| Example 372 | | | | 20.36 | 35.7 | C | A |
| Example 373 | | | | 0.10 | 0.2 | C | C |
| Example 374 | | | | 0.31 | 0.5 | C | C |
| Example 375 | | | | 0.51 | 0.9 | B | C |
| Example 376 | | | | 1.02 | 1.8 | A | B |
| Example 377 | | | | 1.53 | 2.7 | A | B |
| Example 378 | | | | 1.83 | 3.2 | A | B |
| Example 379 | | | | 2.04 | 3.6 | B | A |
| Example 380 | | | | 2.54 | 4.5 | B | A |
| Example 381 | | | | 5.09 | 8.9 | C | A |
| Example 382 | | | | 10.18 | 17.9 | C | A |
| Example 383 | | | | 15.27 | 26.8 | C | A |
| Example 384 | | | | 20.36 | 35.7 | C | A |
| Comparative Example 1 | MFI Type Silicalite | 0.56 | $CoO_x$ | ≤50 | ≤67.6 | C | D |
| Comparative Example 2 | MFI Type Silicalite | 0.56 | — | — | — | D | D |

TABLE 9

| No. | Precursor Material (A) Type | Precursor Material (A) Pore Diameter (nm) | Presence or Absence of Additives | Added Amount of Metal-containing Solution (ratio of number of atoms) Si/M | Type of Structural Directing Agent | pH | Time (h) | Framework | Support Zeolite-Type Compound Average Inner Diameter of Channels $D_F$ (nm) | Type | Average Particle Size $D_C$ (nm) | $D_C/D_F$ | Catalytic Activity | Durability |
|---|---|---|---|---|---|---|---|---|---|---|---|---|---|---|
| Example 385 | MCM-41 | 1.3 | Yes | 1000 | TEABr | 12 | 120 | FAU | 0.74 | LaMnO₃ | 0.13 | 0.2 | C | C |
| Example 386 | | | | 500 | | | | | | | 0.40 | 0.5 | C | C |
| Example 387 | | | | 200 | | | | | | | 0.66 | 0.9 | B | C |
| Example 388 | | | | 100 | | | | | | | 1.32 | 1.8 | A | B |
| Example 389 | | 2.0 | | | | | | | | | 1.98 | 2.7 | A | B |
| Example 390 | | 2.4 | | | | | | | | | 2.38 | 3.2 | A | A |
| Example 391 | | 2.6 | | | | | | | | | 2.64 | 3.6 | A | A |
| Example 392 | | 3.3 | | | | | | | | | 3.30 | 4.5 | B | A |
| Example 393 | | 6.6 | | | | | | | | | 6.61 | 8.9 | B | A |
| Example 394 | SBA-1 | 13.2 | | | | | | | | | 13.21 | 17.9 | B | A |
| Example 395 | | 19.8 | | | | | | | | | 19.82 | 26.8 | C | A |
| Example 396 | | 26.4 | | | | | | | | | 26.43 | 35.7 | C | A |
| Example 397 | MCM-41 | 1.3 | None | 1000 | | | | | | | 0.13 | 0.2 | C | C |
| Example 398 | | | | 500 | | | | | | | 0.40 | 0.5 | C | C |
| Example 399 | | | | 200 | | | | | | | 0.66 | 0.9 | B | B |
| Example 400 | | | | 100 | | | | | | | 1.32 | 1.8 | A | A |
| Example 401 | | 2.0 | | | | | | | | | 1.98 | 2.7 | A | B |
| Example 402 | | 2.4 | | | | | | | | | 2.38 | 3.2 | B | A |
| Example 403 | | 2.6 | | | | | | | | | 2.64 | 3.6 | B | A |
| Example 404 | | 3.3 | | | | | | | | | 3.30 | 4.5 | B | A |
| Example 405 | | 6.6 | | | | | | | | | 6.61 | 8.9 | C | A |
| Example 406 | SBA-1 | 13.2 | | | | | | | | | 13.21 | 17.9 | C | A |
| Example 407 | | 19.8 | | | | | | | | | 19.82 | 26.8 | C | A |
| Example 408 | | 26.4 | | | | | | | | | 26.43 | 35.7 | C | A |
| Example 409 | MCM-41 | 1.1 | Yes | 1000 | | 11 | 72 | MTW | 0.61 | | 0.11 | 0.2 | C | C |
| Example 410 | | | | 500 | | | | | | | 0.33 | 0.5 | C | C |
| Example 411 | | | | 200 | | | | | | | 0.54 | 0.9 | B | B |
| Example 412 | | | | 100 | | | | | | | 1.09 | 1.8 | A | B |
| Example 413 | | 1.6 | | | | | | | | | 1.63 | 2.7 | A | B |
| Example 414 | | 2.0 | | | | | | | | | 1.96 | 3.2 | A | A |
| Example 415 | | 2.2 | | | | | | | | | 2.18 | 3.6 | A | A |
| Example 416 | | 2.7 | | | | | | | | | 2.72 | 4.5 | A | A |
| Example 417 | | 5.4 | | | | | | | | | 5.45 | 8.9 | B | A |
| Example 418 | SBA-1 | 10.9 | | | | | | | | | 10.89 | 17.9 | B | A |

TABLE 9-continued

| | Production Conditions for Structured Catalyst for Oxidation for Exhaust Gas Purification | | | | | | | | Structured Catalyst for Oxidation for exhaust gas purification | | | | |
|---|---|---|---|---|---|---|---|---|---|---|---|---|---|
| | Precursor Material (A) | | Addition to Precursor Material (A) | | Hydrothermal Treatment Conditions using Precursor Material (C) | | | | Support Zeolite-Type Compound | | Catalytic Substance Metal Oxide Nanoparticles | Performance Evaluation | |
| | | Presence or Absence of | Conversion Ratio of Added Amount of Metal-containing | | Type of Structural Directing | | | | Average Inner Diameter of Channels $D_F$ | | Average Particle Size $D_C$ | | |
| No. | Type | Pore Diameter (nm) | Additives | Solution (ratio of number of atoms) Si/M | Agent | pH | Time (h) | Framework | Type | (nm) | Type | (nm) | $D_C/D_F$ | Catalytic Activity | Durability |
| Example 419 | | 16.3 | | | | | | | | | | 16.34 | 26.8 | C | A |
| Example 420 | | 21.8 | | | | | | | | | | 21.79 | 35.7 | C | A |
| Example 421 | MCM-41 | 1.1 | None | 1000 | | | | | | | | 0.11 | 0.2 | C | C |
| Example 422 | | | | 500 | | | | | | | | 0.33 | 0.5 | C | C |
| Example 423 | | | | 200 | | | | | | | | 0.54 | 0.9 | B | B |
| Example 424 | | | | 100 | | | | | | | | 1.09 | 1.8 | A | B |
| Example 425 | | 1.6 | | | | | | | | | | 1.63 | 2.7 | A | B |
| Example 426 | | 2.0 | | | | | | | | | | 1.96 | 3.2 | A | B |
| Example 427 | | 2.2 | | | | | | | | | | 2.18 | 3.6 | B | A |
| Example 428 | | 2.7 | | | | | | | | | | 2.72 | 4.5 | B | A |
| Example 429 | | 5.4 | | | | | | | | | | 5.45 | 8.9 | C | A |
| Example 430 | SBA-1 | 10.9 | | | | | | | | | | 10.89 | 17.9 | C | A |
| Example 431 | | 16.3 | | | | | | | | | | 16.34 | 26.8 | C | A |
| Example 432 | | 21.8 | | | | | | | | | | 21.79 | 35.7 | C | A |

TABLE 10

| No. | Precursor Material (A) Type | Pore Diameter (nm) | Presence or Absence of Additives | Added Amount of Metal-containing Solution (ratio of number of atoms) Si/M | Type of Structural Directing Agent | pH | Time (h) | Framework | Average Inner Diameter of Channels $D_F$ (nm) | Type | Average Particle Size $D_C$ (nm) | $D_C/D_F$ | Catalytic Activity | Durability |
|---|---|---|---|---|---|---|---|---|---|---|---|---|---|---|
| Example 433 | MCM-41 | 1.0 | Yes | 1000 | TPABr | 12 | 72 | MFI | 0.56 | LaMnO$_3$ | 0.10 | 0.2 | C | C |
| Example 434 | | | | 500 | | | | | | | 0.30 | 0.5 | C | C |
| Example 435 | | | | 200 | | | | | | | 0.50 | 0.9 | B | C |
| Example 436 | | | | 100 | | | | | | | 1.00 | 1.8 | A | B |
| Example 437 | | 1.5 | | | | | | | | | 1.50 | 2.7 | A | B |
| Example 438 | | 1.8 | | | | | | | | | 1.80 | 3.2 | A | A |
| Example 439 | | 2.0 | | | | | | | | | 2.00 | 3.6 | A | A |
| Example 440 | | 2.5 | | | | | | | | | 2.50 | 4.5 | A | A |
| Example 441 | | 5.0 | | | | | | | | | 5.00 | 8.9 | B | A |
| Example 442 | SBA-1 | 10.0 | | | | | | | | | 10.00 | 17.9 | B | A |
| Example 443 | | 15.0 | | | | | | | | | 15.00 | 26.8 | B | A |
| Example 444 | | 20.0 | | | | | | | | | 20.00 | 35.7 | C | A |
| Example 445 | MCM-41 | 1.0 | None | 1000 | | | | | | | 0.10 | 0.2 | C | C |
| Example 446 | | | | 500 | | | | | | | 0.30 | 0.5 | C | C |
| Example 447 | | | | 200 | | | | | | | 0.50 | 0.9 | C | C |
| Example 448 | | | | 100 | | | | | | | 1.00 | 1.8 | B | B |
| Example 449 | | 1.5 | | | | | | | | | 1.50 | 2.7 | A | A |
| Example 450 | | 1.8 | | | | | | | | | 1.80 | 3.2 | B | A |
| Example 451 | | 2.0 | | | | | | | | | 2.00 | 3.6 | B | A |
| Example 452 | | 2.5 | | | | | | | | | 2.50 | 4.5 | B | A |
| Example 453 | | 5.0 | | | | | | | | | 5.00 | 8.9 | C | A |
| Example 454 | SBA-1 | 10.0 | | | | | | | | | 10.00 | 17.9 | C | A |
| Example 455 | | 15.0 | | | | | | | | | 15.00 | 26.8 | C | A |
| Example 456 | | 20.0 | | | | | | | | | 20.00 | 35.7 | C | A |
| Example 457 | MCM-41 | 1.0 | Yes | 1000 | TMABr | | 120 | FER | 0.57 | | 0.10 | 0.2 | C | C |
| Example 458 | | | | 500 | | | | | | | 0.31 | 0.5 | C | C |
| Example 459 | | | | 200 | | | | | | | 0.51 | 0.9 | B | C |
| Example 460 | | | | 100 | | | | | | | 1.02 | 1.8 | A | B |
| Example 461 | | 1.5 | | | | | | | | | 1.53 | 2.7 | A | B |
| Example 462 | | 1.8 | | | | | | | | | 1.83 | 3.2 | A | B |
| Example 463 | | 2.0 | | | | | | | | | 2.04 | 3.6 | A | A |
| Example 464 | | 2.5 | | | | | | | | | 2.54 | 4.5 | A | A |
| Example 465 | | 5.1 | | | | | | | | | 5.09 | 8.9 | B | A |
| Example 466 | SBA-1 | 10.2 | | | | | | | | | 10.18 | 17.9 | B | A |

TABLE 10-continued

| | Precursor Material (A) | | | Production Conditions for Structured Catalyst for Oxidation for Exhaust Gas Purification | | | Hydrothermal Treatment Conditions using Precursor Material (C) | | | Structured Catalyst for Oxidation for Exhaust Gas Purification | | | | Performance Evaluation | |
|---|---|---|---|---|---|---|---|---|---|---|---|---|---|---|---|
| | | | | Addition to Precursor Material (A) | | | | | | Support Zeolite-Type Compound | | Oxidation catalytic substance Metal Oxide Nanoparticles | | | |
| | | | | | Added Amount of Metal-containing Solution (ratio of number of atoms) Si/M | Conversion Ratio of | Type of Structural Directing Agent | pH | Time (h) | Framework | Average Inner Diameter of Channels $D_F$ (nm) | Type | Average Particle Size $D_C$ (nm) | $D_C/D_F$ | Catalytic Activity | Durability |
| No. | Type | Pore Diameter (nm) | Presence or Absence of Additives | | | | | | | | | | | | | |
| Example 467 | | 15.3 | | | | | | | | | | | 15.27 | 26.8 | C | A |
| Example 468 | | 20.4 | | | | | | | | | | | 20.36 | 35.7 | C | A |
| Example 469 | MCM-41 | 1.0 | None | 1000 | | | | | | | | | 0.10 | 0.2 | C | C |
| Example 470 | | | | 500 | | | | | | | | | 0.31 | 0.5 | C | C |
| Example 471 | | | | 200 | | | | | | | | | 0.51 | 0.9 | B | C |
| Example 472 | | | | 100 | | | | | | | | | 1.02 | 1.8 | A | B |
| Example 473 | | 1.5 | | | | | | | | | | | 1.53 | 2.7 | A | B |
| Example 474 | | 1.8 | | | | | | | | | | | 1.83 | 3.2 | A | B |
| Example 475 | | 2.0 | | | | | | | | | | | 2.04 | 3.6 | B | A |
| Example 476 | | 2.5 | | | | | | | | | | | 2.54 | 4.5 | B | A |
| Example 477 | | 5.1 | | | | | | | | | | | 5.09 | 8.9 | C | A |
| Example 478 | SBA-1 | 10.2 | | | | | | | | | | | 10.18 | 17.9 | C | A |
| Example 479 | | 15.3 | | | | | | | | | | | 15.27 | 26.8 | C | A |
| Example 480 | | 20.4 | | | | | | | | | | | 20.36 | 35.7 | C | A |

TABLE 11

| | Production Conditions for Structured Catalyst for Oxidation for Exhaust Gas Purification | | | | | | | | | Structured Catalyst for Oxidation for exhaust gas purification | | | | | | |
|---|---|---|---|---|---|---|---|---|---|---|---|---|---|---|---|---|
| | Precursor Material (A) | | | Addition to Precursor Material (A) | | Hydrothermal Treatment Conditions using Precursor Material (C) | | | | | Support Zeolite-Type Compound | | Oxidation catalytic substance Metal Oxide Nanoparticles | | Performance Evaluation | |
| No. | Type | Pore Diameter (nm) | Presence or Absence of Additives | Conversion Ratio of Added Amount of Metal containing Solution (ratio of number of atoms) Si/M | Type of Structural Directing Agent | pH | Time (h) | Framework | | | Average Inner Diameter of Channels $D_F$ (nm) | Type | Average Particle Size $D_C$ (nm) | $D_C/D_F$ | Catalytic Activity | Durability |
| Example 481 | MCM-41 | 1.3 | Yes | 1000 | TEABr | 12 | 120 | FAU | | | 0.74 | BaMnO$_3$ | 0.13 | 0.2 | C | C |
| Example 482 | | | | 500 | | | | | | | | | 0.40 | 0.5 | C | C |
| Example 483 | | | | 200 | | | | | | | | | 0.66 | 0.9 | B | C |
| Example 484 | | | | 100 | | | | | | | | | 1.32 | 1.8 | A | B |
| Example 485 | | 2.0 | | | | | | | | | | | 1.98 | 2.7 | A | B |
| Example 486 | | 2.4 | | | | | | | | | | | 2.38 | 3.2 | A | A |
| Example 487 | | 2.6 | | | | | | | | | | | 2.64 | 3.6 | A | A |
| Example 488 | | 3.3 | | | | | | | | | | | 3.30 | 4.5 | A | A |
| Example 489 | | 6.6 | | | | | | | | | | | 6.61 | 8.9 | B | A |
| Example 490 | SBA-1 | 13.2 | | | | | | | | | | | 13.21 | 17.9 | B | A |
| Example 491 | | 19.8 | | | | | | | | | | | 19.82 | 26.8 | C | A |
| Example 492 | | 26.4 | | | | | | | | | | | 26.43 | 35.7 | C | A |
| Example 493 | MCM-41 | 1.3 | None | 1000 | | | | | | | | | 0.13 | 0.2 | C | C |
| Example 494 | | | | 500 | | | | | | | | | 0.40 | 0.5 | C | C |
| Example 495 | | | | 200 | | | | | | | | | 0.66 | 0.9 | B | C |
| Example 496 | | | | 100 | | | | | | | | | 1.32 | 1.8 | A | B |
| Example 497 | | 2.0 | | | | | | | | | | | 1.98 | 2.7 | A | B |
| Example 498 | | 2.4 | | | | | | | | | | | 2.38 | 3.2 | B | A |
| Example 499 | | 2.6 | | | | | | | | | | | 2.64 | 3.6 | B | A |
| Example 500 | | 3.3 | | | | | | | | | | | 3.30 | 4.5 | B | A |
| Example 501 | | 6.6 | | | | | | | | | | | 6.61 | 8.9 | C | A |
| Example 502 | SBA-1 | 13.2 | | | | | | | | | | | 13.21 | 17.9 | C | A |
| Example 503 | | 19.8 | | | | | | | | | | | 19.82 | 26.8 | C | A |
| Example 504 | | 26.4 | | | | | | | | | | | 26.43 | 35.7 | C | A |
| Example 505 | MCM-41 | 1.1 | Yes | 1000 | | 11 | 72 | MTW | | | 0.61 | | 0.11 | 0.2 | C | C |
| Example 506 | | | | 500 | | | | | | | | | 0.33 | 0.5 | C | C |
| Example 507 | | | | 200 | | | | | | | | | 0.54 | 0.9 | B | C |
| Example 508 | | | | 100 | | | | | | | | | 1.09 | 1.8 | A | B |
| Example 509 | | 1.6 | | | | | | | | | | | 1.63 | 2.7 | A | B |
| Example 510 | | 2.0 | | | | | | | | | | | 1.96 | 3.2 | A | B |
| Example 511 | | 2.2 | | | | | | | | | | | 2.18 | 3.6 | A | A |
| Example 512 | | 2.7 | | | | | | | | | | | 2.72 | 4.5 | A | A |
| Example 513 | | 5.4 | | | | | | | | | | | 5.45 | 8.9 | B | A |
| Example 514 | SBA-1 | 10.9 | | | | | | | | | | | 10.89 | 17.9 | B | A |

TABLE 11-continued

| | Production Conditions for Structured Catalyst for Oxidation for Exhaust Gas Purification | | | | | | | | Structured Catalyst for Oxidation for exhaust gas purification | | | | Performance Evaluation | |
|---|---|---|---|---|---|---|---|---|---|---|---|---|---|---|
| | Precursor Material (A) | | Addition to Precursor Material (A) | | Hydrothermal Treatment Conditions using Precursor Material (C) | | | | Support Zeolite-Type Compound | | Oxidation catalytic substance Metal Oxide Nanoparticles | | | |
| | | Pore Diameter | Presence or Absence of | Conversion Ratio of Added Amount of Metal containing Solution (ratio of | Type of Structural Directing | | | | Average Inner Diameter of Channels $D_F$ | | Average Particle Size $D_C$ | | | |
| No. | Type | (nm) | Additives | number of atoms) Si/M | Agent | pH | Time (h) | Framework | (nm) | Type | (nm) | $D_C/D_F$ | Catalytic Activity | Durability |
| Example 515 | | 16.3 | | | | | | | | | 16.34 | 26.8 | C | A |
| Example 516 | | 21.8 | | | | | | | | | 21.79 | 35.7 | C | A |
| Example 517 | MCM-41 | 1.1 | None | 1000 | | | | | | | 0.11 | 0.2 | C | C |
| Example 518 | | | | 500 | | | | | | | 0.33 | 0.5 | C | C |
| Example 519 | | | | 200 | | | | | | | 0.54 | 0.9 | B | C |
| Example 520 | | | | 100 | | | | | | | 1.09 | 1.8 | A | B |
| Example 521 | | 1.6 | | | | | | | | | 1.63 | 2.7 | A | B |
| Example 522 | | 2.0 | | | | | | | | | 1.96 | 3.2 | A | B |
| Example 523 | | 2.2 | | | | | | | | | 2.18 | 3.6 | B | A |
| Example 524 | | 2.7 | | | | | | | | | 2.72 | 4.5 | B | A |
| Example 525 | | 5.4 | | | | | | | | | 5.45 | 8.9 | A | A |
| Example 526 | SBA-1 | 10.9 | | | | | | | | | 10.89 | 17.9 | A | A |
| Example 527 | | 16.3 | | | | | | | | | 16.34 | 26.8 | C | A |
| Example 528 | | 21.8 | | | | | | | | | 21.79 | 35.7 | C | A |

TABLE 12

| No. | Precursor Material (A) Type | Pore Diameter (nm) | Presence or Absence of Additives | Added Amount of Metal-containing Solution (ratio of number of atoms) Si/M | Type of Structural Directing Agent | pH | Time (h) | Framework | Average Inner Diameter of Channels $D_F$ (nm) | Type | Average Particle Size $D_C$ (nm) | $D_C/D_F$ | Catalytic Activity | Durability |
|---|---|---|---|---|---|---|---|---|---|---|---|---|---|---|
| Example 529 | MCM-41 | 1.0 | Yes | 1000 | TPABr | 12 | 72 | MFI | 0.56 | BaMnO$_3$ | 0.10 | 0.2 | C | C |
| Example 530 | | | | 500 | | | | | | | 0.30 | 0.5 | C | C |
| Example 531 | | | | 200 | | | | | | | 0.50 | 0.9 | B | C |
| Example 532 | | | | 100 | | | | | | | 1.00 | 1.8 | A | B |
| Example 533 | | 1.5 | | | | | | | | | 1.50 | 2.7 | A | B |
| Example 534 | | 1.8 | | | | | | | | | 1.80 | 3.2 | A | A |
| Example 535 | | 2.0 | | | | | | | | | 2.00 | 3.6 | A | A |
| Example 536 | | 2.5 | | | | | | | | | 2.50 | 4.5 | A | A |
| Example 537 | | 5.0 | | | | | | | | | 5.00 | 8.9 | B | A |
| Example 538 | SBA-1 | 10.0 | | | | | | | | | 10.00 | 17.9 | B | A |
| Example 539 | | 15.0 | | | | | | | | | 15.00 | 26.8 | A | A |
| Example 540 | | 20.0 | | | | | | | | | 20.00 | 35.7 | A | A |
| Example 541 | MCM-41 | 1.0 | None | 1000 | | | | | | | 0.10 | 0.2 | C | C |
| Example 542 | | | | 500 | | | | | | | 0.30 | 0.5 | C | C |
| Example 543 | | | | 200 | | | | | | | 0.50 | 0.9 | C | C |
| Example 544 | | | | 100 | | | | | | | 1.00 | 1.8 | B | B |
| Example 545 | | 1.5 | | | | | | | | | 1.50 | 2.7 | A | B |
| Example 546 | | 1.8 | | | | | | | | | 1.80 | 3.2 | B | A |
| Example 547 | | 2.0 | | | | | | | | | 2.00 | 3.6 | B | A |
| Example 548 | | 2.5 | | | | | | | | | 2.50 | 4.5 | B | A |
| Example 549 | | 5.0 | | | | | | | | | 5.00 | 8.9 | C | A |
| Example 550 | SBA-1 | 10.0 | | | | | | | | | 10.00 | 17.9 | C | A |
| Example 551 | | 15.0 | | | | | | | | | 15.00 | 26.8 | C | A |
| Example 552 | | 20.0 | | | | | | | | | 20.00 | 35.7 | C | A |
| Example 553 | MCM-41 | 1.0 | Yes | 1000 | TMABr | 12 | 120 | FER | 0.57 | | 0.10 | 0.2 | C | C |
| Example 554 | | | | 500 | | | | | | | 0.31 | 0.5 | C | C |
| Example 555 | | | | 200 | | | | | | | 0.51 | 0.9 | B | C |
| Example 556 | | | | 100 | | | | | | | 1.02 | 1.8 | A | B |
| Example 557 | | 1.5 | | | | | | | | | 1.53 | 2.7 | A | B |
| Example 558 | | 1.8 | | | | | | | | | 1.83 | 3.2 | A | A |
| Example 559 | | 2.0 | | | | | | | | | 2.04 | 3.6 | A | A |
| Example 560 | | 2.5 | | | | | | | | | 2.54 | 4.5 | A | A |
| Example 561 | | 5.1 | | | | | | | | | 5.09 | 8.9 | B | A |
| Example 562 | SBA-1 | 10.2 | | | | | | | | | 10.18 | 17.9 | B | A |

TABLE 12-continued

| | | Production Conditions for Structured Catalyst for Oxidation for Exhaust Gas Purification | | | | | | | | Structured Catalyst for Oxidation for exhaust gas purification | | | | |
|---|---|---|---|---|---|---|---|---|---|---|---|---|---|---|
| | | | Addition to Precursor Material (A) | | Hydrothermal Treatment Conditions using Precursor Material (C) | | | | Support Zeolite-Type Compound | | Oxidation catalytic substance Metal Oxide Nanoparticles | | Performance Evaluation | |
| | Precursor Material (A) | Presence or Absence of | Added Amount of Metal-containing | Conversion Ratio of | Type of Structural | | | | | Average Inner Diameter of | | Average Particle | | |
| | | | | Solution (ratio of | Directing | | Time | | | Channels $D_F$ | | Size $D_C$ | | |
| No. | Type | Pore Diameter (nm) | Additives | number of atoms) Si/M | Agent | pH | (h) | Framework | Type | (nm) | Type | (nm) | $D_C/D_F$ | Catalytic Activity | Durability |
| Example 563 | | 15.3 | | | | | | | | | | 15.27 | 26.8 | C | A |
| Example 564 | | 20.4 | | | | | | | | | | 20.36 | 35.7 | C | A |
| Example 565 | MCM-41 | 1.0 | None | 1000 | | | | | | 0.56 | | 0.10 | 0.2 | C | C |
| Example 566 | | | | 500 | | | | | | | | 0.31 | 0.5 | C | C |
| Example 567 | | | | 200 | | | | | | | | 0.51 | 0.9 | B | C |
| Example 568 | | | | 100 | | | | | | | | 1.02 | 1.8 | A | B |
| Example 569 | | 1.5 | | | | | | | | | | 1.53 | 2.7 | A | B |
| Example 570 | | 1.8 | | | | | | | | | | 1.83 | 3.2 | A | B |
| Example 571 | | 2.0 | | | | | | | | | | 2.04 | 3.6 | B | A |
| Example 572 | | 2.5 | | | | | | | | | | 2.54 | 4.5 | B | A |
| Example 573 | | 5.1 | | | | | | | | | | 5.09 | 8.9 | C | A |
| Example 574 | SBA-1 | 10.2 | | | | | | | | | | 10.18 | 17.9 | C | A |
| Example 575 | | 15.0 | | | | | | | | | | 15.00 | 26.8 | C | A |
| Example 576 | | 20.0 | | | | | | | | | | 20.00 | 35.7 | C | A |

TABLE 13

| No. | Precursor Material (A) Type | Pore Diameter (nm) | Presence or Absence of Additives | Conversion Ratio of Added Amount of Metal-containing Solution (ratio of number of atoms) Si/M | Type of Structural Directing Agent | pH | Time (h) | Framework | Average Inner Diameter of Channels $D_F$ (nm) | Type | Average Particle Size $D_C$ (nm) | $D_C/D_F$ | Catalytic Activity | Durability |
|---|---|---|---|---|---|---|---|---|---|---|---|---|---|---|
| Example 577 | MCM-41 | 1.3 | Yes | 1000 | TEABr | 12 | 120 | FAU | 0.74 | LaAlO$_3$ | 0.13 | 0.2 | C | C |
| Example 578 | | | | 500 | | | | | | | 0.40 | 0.5 | C | C |
| Example 579 | | | | 200 | | | | | | | 0.66 | 0.9 | B | C |
| Example 580 | | | | 100 | | | | | | | 1.32 | 1.8 | A | B |
| Example 581 | | 2.0 | | | | | | | | | 1.98 | 2.7 | A | B |
| Example 582 | | 2.4 | | | | | | | | | 2.38 | 3.2 | A | A |
| Example 583 | | 2.6 | | | | | | | | | 2.64 | 3.6 | A | A |
| Example 584 | | 3.3 | | | | | | | | | 3.30 | 4.5 | A | A |
| Example 585 | | 6.6 | | | | | | | | | 6.61 | 8.9 | B | A |
| Example 586 | SBA-1 | 13.2 | | | | | | | | | 13.21 | 17.9 | B | A |
| Example 587 | | 19.8 | | | | | | | | | 19.82 | 26.8 | B | A |
| Example 588 | | 26.4 | | | | | | | | | 26.43 | 35.7 | C | A |
| Example 589 | MCM-41 | 1.3 | None | 1000 | | | | | | | 0.13 | 0.2 | C | C |
| Example 590 | | | | 500 | | | | | | | 0.40 | 0.5 | C | C |
| Example 591 | | | | 200 | | | | | | | 0.66 | 0.9 | B | B |
| Example 592 | | | | 100 | | | | | | | 1.32 | 1.8 | A | B |
| Example 593 | | 2.0 | | | | | | | | | 1.98 | 2.7 | A | A |
| Example 594 | | 2.4 | | | | | | | | | 2.38 | 3.2 | B | A |
| Example 595 | | 2.6 | | | | | | | | | 2.64 | 3.6 | B | A |
| Example 596 | | 3.3 | | | | | | | | | 3.30 | 4.5 | B | A |
| Example 597 | | 6.6 | | | | | | | | | 6.61 | 8.9 | C | A |
| Example 598 | SBA-1 | 13.2 | | | | | | | | | 13.21 | 17.9 | C | A |
| Example 599 | | 19.8 | | | | | | | | | 19.82 | 26.8 | C | C |
| Example 600 | | 26.4 | | | | | | | | | 26.43 | 35.7 | C | C |
| Example 601 | MCM-41 | 1.1 | Yes | 1000 | | 11 | 72 | MTW | 0.61 | | 0.11 | 0.2 | C | C |
| Example 602 | | | | 500 | | | | | | | 0.33 | 0.5 | C | C |
| Example 603 | | | | 200 | | | | | | | 0.54 | 0.9 | B | B |
| Example 604 | | | | 100 | | | | | | | 1.09 | 1.8 | A | B |
| Example 605 | | 1.6 | | | | | | | | | 1.63 | 2.7 | A | A |
| Example 606 | | 2.0 | | | | | | | | | 1.96 | 3.2 | A | A |
| Example 607 | | 2.2 | | | | | | | | | 2.18 | 3.6 | A | A |
| Example 608 | | 2.7 | | | | | | | | | 2.72 | 4.5 | B | A |
| Example 609 | | 5.4 | | | | | | | | | 5.45 | 8.9 | B | A |
| Example 610 | SBA-1 | 10.9 | | | | | | | | | 10.89 | 17.9 | B | A |

TABLE 13-continued

| | Production Conditions for Structured Catalyst for Oxidation for Exhaust Gas Purification | | | | | | | | Structured Catalyst for Oxidation for exhaust gas purification | | | | | |
|---|---|---|---|---|---|---|---|---|---|---|---|---|---|---|
| | Precursor Material (A) | | Addition to Precursor Material (A) | | Hydrothermal Treatment Conditions using Precursor Material (C) | | | | Support Zeolite-Type Compound | | Oxidation catalytic substance Metal Oxide Nanoparticles | | Performance Evaluation | |
| No. | Type | Pore Diameter (nm) | Presence or Absence of Additives | Added Amount of Metal-containing Solution (ratio of number of atoms) Si/M | Type of Structural Directing Agent | pH | Time (h) | Framework | | Average Inner Diameter of Channels $D_F$ (nm) | Type | Average Particle Size $D_C$ (nm) | $D_C/D_F$ | Catalytic Activity | Durability |
| Example 611 | MCM-41 | 16.3 | None | | | | | | | | | 16.34 | 26.8 | C | A |
| Example 612 | | 21.8 | | | | | | | | | | 21.79 | 35.7 | C | A |
| Example 613 | | 1.1 | | 1000 | | | | | | | | 0.11 | 0.2 | C | C |
| Example 614 | | | | 500 | | | | | | | | 0.33 | 0.5 | C | C |
| Example 615 | | | | 200 | | | | | | | | 0.54 | 0.9 | B | B |
| Example 616 | | | | 100 | | | | | | | | 1.09 | 1.8 | A | B |
| Example 617 | | 1.6 | | | | | | | | | | 1.63 | 2.7 | A | B |
| Example 618 | | 2.0 | | | | | | | | | | 1.96 | 3.2 | A | A |
| Example 619 | | 2.2 | | | | | | | | | | 2.18 | 3.6 | B | A |
| Example 620 | | 2.7 | | | | | | | | | | 2.72 | 4.5 | B | A |
| Example 621 | | 5.4 | | | | | | | | | | 5.45 | 8.9 | C | A |
| Example 622 | SBA-1 | 10.9 | | | | | | | | | | 10.89 | 17.9 | C | A |
| Example 623 | | 16.3 | | | | | | | | | | 16.34 | 26.8 | C | A |
| Example 624 | | 21.8 | | | | | | | | | | 21.79 | 35.7 | C | A |

TABLE 14

| No. | Precursor Material (A) Type | Pore Diameter (nm) | Presence or Absence of Additives | Added Amount of Metal-containing Solution (ratio of number of atoms) Si/M | Precursor Material (C) Type of Structural Directing Agent | pH | Time (h) | Framework | Average Inner Diameter of Channels $D_F$ (nm) | Type | Average Particle Size $D_C$ (nm) | $D_C/D_F$ | Catalytic Activity | Durability |
|---|---|---|---|---|---|---|---|---|---|---|---|---|---|---|
| Example 625 | MCM-41 | 1.0 | Yes | 1000 | TPABr | 12 | 72 | MFI | 0.56 | LaAlO$_3$ | 0.10 | 0.2 | C | C |
| Example 626 | | | | 500 | | | | | | | 0.30 | 0.5 | C | C |
| Example 627 | | | | 200 | | | | | | | 0.50 | 0.9 | B | C |
| Example 628 | | | | 100 | | | | | | | 1.00 | 1.8 | A | B |
| Example 629 | | 1.5 | | | | | | | | | 1.50 | 2.7 | A | B |
| Example 630 | | 1.8 | | | | | | | | | 1.80 | 3.2 | A | A |
| Example 631 | | 2.0 | | | | | | | | | 2.00 | 3.6 | A | A |
| Example 632 | | 2.5 | | | | | | | | | 2.50 | 4.5 | B | A |
| Example 633 | | 5.0 | | | | | | | | | 5.00 | 8.9 | B | A |
| Example 634 | SBA-1 | 10.0 | | | | | | | | | 10.00 | 17.9 | B | A |
| Example 635 | | 15.0 | | | | | | | | | 15.00 | 26.8 | C | A |
| Example 636 | | 20.0 | | | | | | | | | 25.00 | 44.6 | C | A |
| Example 637 | MCM-41 | 1.0 | None | 1000 | | | | | | | 0.10 | 0.2 | C | C |
| Example 638 | | | | 500 | | | | | | | 0.30 | 0.5 | C | C |
| Example 639 | | | | 200 | | | | | | | 0.50 | 0.9 | B | B |
| Example 640 | | | | 100 | | | | | | | 1.00 | 1.8 | A | B |
| Example 641 | | 1.5 | | | | | | | | | 1.50 | 2.7 | A | A |
| Example 642 | | 2.0 | | | | | | | | | 2.00 | 3.6 | B | A |
| Example 643 | | 2.5 | | | | | | | | | 2.50 | 4.5 | B | A |
| Example 644 | | 5.0 | | | | | | | | | 5.00 | 8.9 | B | A |
| Example 645 | | 6.0 | | | | | | | | | 6.00 | 10.7 | C | A |
| Example 646 | SBA-1 | 10.0 | | | | | | | | | 10.00 | 17.9 | C | A |
| Example 647 | | 15.0 | | | | | | | | | 15.00 | 26.8 | C | A |
| Example 648 | | 20.0 | | | | | | | | | 20.00 | 35.7 | C | A |
| Example 649 | MCM-41 | 1.0 | Yes | 1000 | TMABr | 12 | 120 | FER | 0.57 | | 0.10 | 0.2 | C | C |
| Example 650 | | | | 500 | | | | | | | 0.31 | 0.5 | C | C |
| Example 651 | | | | 200 | | | | | | | 0.51 | 0.9 | B | C |
| Example 652 | | | | 100 | | | | | | | 1.02 | 1.8 | A | B |
| Example 653 | | 1.5 | | | | | | | | | 1.53 | 2.7 | A | B |
| Example 654 | | 1.8 | | | | | | | | | 1.83 | 3.2 | A | A |
| Example 655 | | 2.0 | | | | | | | | | 2.04 | 3.6 | A | A |
| Example 656 | | 2.5 | | | | | | | | | 2.54 | 4.5 | B | A |
| Example 657 | | 5.1 | | | | | | | | | 5.09 | 8.9 | B | A |
| Example 658 | SBA-1 | 10.2 | | | | | | | | | 10.18 | 17.9 | B | A |

TABLE 14-continued

| | Production Conditions for Structured Catalyst for Oxidation for Exhaust Gas Purification | | | | | | | | | Structured Catalyst for Oxidation for exhaust gas purification | | | | | |
|---|---|---|---|---|---|---|---|---|---|---|---|---|---|---|---|
| | Precursor Material (A) | | Presence or Absence of Additives | Addition to Precursor Material (A) | | Hydrothermal Treatment Conditions using Precursor Material (C) | | | | Support Zeolite-Type Compound | | Oxidation catalytic substance Metal Oxide Nanoparticles | | Performance Evaluation | |
| | | | | Conversion Ratio of Added Amount of Metal-containing Solution (ratio of | | Type of Structural Directing | | | | Average Inner Diameter of Channels $D_F$ | | Average Particle Size $D_C$ | | | |
| No. | Type | Pore Diameter (nm) | Additives | number of atoms) Si/M | | Agent | pH | Time (h) | Framework | Type | (nm) | Type | (nm) | $D_C/D_F$ | Catalytic Activity | Durability |
| Example 659 | | 15.3 | | | | | | | | | | | 15.27 | 26.8 | C | A |
| Example 660 | | 20.4 | | | | | | | | | | | 20.36 | 35.7 | C | A |
| Example 661 | MCM-41 | 1.0 | None | 1000 | | | | | | | | | 0.10 | 0.2 | C | C |
| Example 662 | | | | 500 | | | | | | | | | 0.31 | 0.5 | C | C |
| Example 663 | | | | 200 | | | | | | | | | 0.51 | 0.9 | B | C |
| Example 664 | | | | 100 | | | | | | | | | 1.02 | 1.8 | A | B |
| Example 665 | | 1.5 | | | | | | | | | | | 1.53 | 2.7 | A | B |
| Example 666 | | 1.8 | | | | | | | | | | | 1.83 | 3.2 | A | B |
| Example 667 | | 2.0 | | | | | | | | | | | 2.04 | 3.6 | B | A |
| Example 668 | | 2.5 | | | | | | | | | | | 2.54 | 4.5 | B | A |
| Example 669 | | 5.1 | | | | | | | | | | | 5.09 | 8.9 | C | A |
| Example 670 | SBA-1 | 10.2 | | | | | | | | | | | 10.18 | 17.9 | C | A |
| Example 671 | | 15.3 | | | | | | | | | | | 15.27 | 26.8 | C | A |
| Example 672 | | 20.4 | | | | | | | | | | | 20.36 | 35.7 | C | A |

TABLE 15

| No. | Precursor Material (A) Type | Precursor Material (A) Pore Diameter (nm) | Presence or Absence of Additives | Addition to Precursor Material (A) Conversion Ratio of Added Amount of Metal-containing Solution (ratio of number of atoms) Si/M | Hydrothermal Treatment Conditions using Precursor Material (C) Type of Structural Directing Agent | pH | Time (h) | Framework | Support Zeolite-Type Compound Average Inner Diameter of Channels $D_F$ (nm) | Oxidation catalytic substance Metal Oxide Nanoparticles Type | Average Particle Size $D_C$ (nm) | $D_C/D_F$ | Catalytic Activity | Durability |
|---|---|---|---|---|---|---|---|---|---|---|---|---|---|---|
| Example 673 | MCM-41 | 1.3 | Yes | 1000 | TEABr | 12 | 120 | FAU | 0.74 | LaCoO$_3$ | 0.13 | 0.2 | C | C |
| Example 674 | | | | 500 | | | | | | | 0.40 | 0.5 | C | C |
| Example 675 | | | | 200 | | | | | | | 0.66 | 0.9 | B | C |
| Example 676 | | | | 100 | | | | | | | 1.32 | 1.8 | A | B |
| Example 677 | | 2.0 | | | | | | | | | 1.98 | 2.7 | A | B |
| Example 678 | | 2.4 | | | | | | | | | 2.38 | 3.2 | A | A |
| Example 679 | | 2.6 | | | | | | | | | 2.64 | 3.6 | A | A |
| Example 680 | | 3.3 | | | | | | | | | 3.30 | 4.5 | A | A |
| Example 681 | | 6.6 | | | | | | | | | 6.61 | 8.9 | B | A |
| Example 682 | SBA-1 | 13.2 | | | | | | | | | 13.21 | 17.9 | B | A |
| Example 683 | | 19.8 | | | | | | | | | 19.82 | 26.8 | B | A |
| Example 684 | | 26.4 | | | | | | | | | 26.43 | 35.7 | C | A |
| Example 685 | MCM-41 | 1.3 | None | 1000 | | | | | | | 0.13 | 0.2 | C | C |
| Example 686 | | | | 500 | | | | | | | 0.40 | 0.5 | C | C |
| Example 687 | | | | 200 | | | | | | | 0.66 | 0.9 | C | C |
| Example 688 | | | | 100 | | | | | | | 1.32 | 1.8 | B | B |
| Example 689 | | 2.0 | | | | | | | | | 1.98 | 2.7 | A | A |
| Example 690 | | 2.4 | | | | | | | | | 2.38 | 3.2 | B | B |
| Example 691 | | 2.6 | | | | | | | | | 2.64 | 3.6 | B | A |
| Example 692 | | 3.3 | | | | | | | | | 3.30 | 4.5 | B | A |
| Example 693 | | 6.6 | | | | | | | | | 6.61 | 8.9 | C | A |
| Example 694 | SBA-1 | 13.2 | | | | | | | | | 13.21 | 17.9 | C | A |
| Example 695 | | 19.8 | | | | | | | | | 19.82 | 26.8 | C | A |
| Example 696 | | 26.4 | | | | | | | | | 26.43 | 35.7 | C | A |
| Example 697 | MCM-41 | 1.1 | Yes | 1000 | | 11 | 72 | MTW | 0.61 | | 0.11 | 0.2 | C | C |
| Example 698 | | | | 500 | | | | | | | 0.33 | 0.5 | C | C |
| Example 699 | | | | 200 | | | | | | | 0.54 | 0.9 | C | C |
| Example 700 | | | | 100 | | | | | | | 1.09 | 1.8 | B | B |
| Example 701 | | 1.6 | | | | | | | | | 1.63 | 2.7 | A | B |
| Example 702 | | 2.0 | | | | | | | | | 1.96 | 3.2 | A | B |
| Example 703 | | 2.2 | | | | | | | | | 2.18 | 3.6 | A | A |
| Example 704 | | 2.7 | | | | | | | | | 2.72 | 4.5 | A | A |
| Example 705 | | 5.4 | | | | | | | | | 5.45 | 8.9 | B | A |
| Example 706 | SBA-1 | 10.9 | | | | | | | | | 10.89 | 17.9 | B | A |

TABLE 15-continued

Production Conditions for Structured Catalyst for Oxidation for Exhaust Gas Purification / Structured Catalyst for Oxidation for exhaust gas purification

| No. | Precursor Material (A) Type | Precursor Material (A) Pore Diameter (nm) | Addition to Precursor Material (A) Presence or Absence of Additives | Addition to Precursor Material (A) Added Amount of Metal-containing Solution (ratio of number of atoms) Si/M | Hydrothermal Treatment Conditions using Precursor Material (C) Type of Structural Directing Agent | pH | Time (h) | Framework | Support Zeolite-Type Compound Average Inner Diameter of Channels $D_F$ (nm) | Oxidation catalytic substance Metal Oxide Nanoparticles Type | Average Particle Size $D_C$ (nm) | $D_C/D_F$ | Performance Evaluation Catalytic Activity | Durability |
|---|---|---|---|---|---|---|---|---|---|---|---|---|---|---|
| Example 707 | | 16.3 | | | | | | | | | 16.34 | 26.8 | C | A |
| Example 708 | | 21.8 | | | | | | | | | 21.79 | 35.7 | C | A |
| Example 709 | MCM-41 | 1.1 | None | 1000 | | | | | | | 0.11 | 0.2 | C | C |
| Example 710 | | | | 500 | | | | | | | 0.33 | 0.5 | C | C |
| Example 711 | | | | 200 | | | | | | | 0.54 | 0.9 | B | B |
| Example 712 | | | | 100 | | | | | | | 1.09 | 1.8 | A | B |
| Example 713 | | 1.6 | | | | | | | | | 1.63 | 2.7 | A | B |
| Example 714 | | 2.0 | | | | | | | | | 1.96 | 3.2 | A | B |
| Example 715 | | 2.2 | | | | | | | | | 2.18 | 3.6 | B | A |
| Example 716 | | 2.7 | | | | | | | | | 2.72 | 4.5 | B | A |
| Example 717 | | 5.4 | | | | | | | | | 5.45 | 8.9 | C | A |
| Example 718 | SBA-1 | 10.9 | | | | | | | | | 10.89 | 17.9 | C | A |
| Example 719 | | 16.3 | | | | | | | | | 16.34 | 26.8 | C | A |
| Example 720 | | 21.8 | | | | | | | | | 21.79 | 35.7 | C | A |

TABLE 16

| No. | Precursor Material (A) Type | Pore Diameter (nm) | Presence or Absence of Additives | Added Amount of Metal-containing Solution (ratio of number of atoms) Si/M | Type of Structural Directing Agent | pH | Time (h) | Framework | Average Inner Diameter of Channels $D_F$ (nm) | Type | Average Particle Size $D_C$ (nm) | $D_C/D_F$ | Catalytic Activity | Durability |
|---|---|---|---|---|---|---|---|---|---|---|---|---|---|---|
| Example 721 | MCM-41 | 1.0 | Yes | 1000 | TPABr | 12 | 72 | MFI | 0.56 | LaCoO$_3$ | 0.10 | 0.2 | C | C |
| Example 722 | | | | 500 | | | | | | | 0.30 | 0.5 | C | C |
| Example 723 | | | | 200 | | | | | | | 0.50 | 0.9 | B | C |
| Example 724 | | | | 100 | | | | | | | 1.00 | 1.8 | A | B |
| Example 725 | | 1.5 | | | | | | | | | 1.50 | 2.7 | A | B |
| Example 726 | | 1.8 | | | | | | | | | 1.80 | 3.2 | A | A |
| Example 727 | | 2.0 | | | | | | | | | 2.00 | 3.6 | A | A |
| Example 728 | | 2.5 | | | | | | | | | 2.50 | 4.5 | A | A |
| Example 729 | | 5.0 | | | | | | | | | 5.00 | 8.9 | B | A |
| Example 730 | SBA-1 | 10.0 | | | | | | | | | 10.00 | 17.9 | B | A |
| Example 731 | | 15.0 | | | | | | | | | 15.00 | 26.8 | B | A |
| Example 732 | | 20.0 | | | | | | | | | 20.00 | 35.7 | C | A |
| Example 733 | MCM-41 | 1.0 | None | 1000 | | | | | | | 0.10 | 0.2 | C | C |
| Example 734 | | | | 500 | | | | | | | 0.30 | 0.5 | C | C |
| Example 735 | | | | 200 | | | | | | | 0.50 | 0.9 | C | C |
| Example 736 | | | | 100 | | | | | | | 1.00 | 1.8 | B | B |
| Example 737 | | 1.5 | | | | | | | | | 1.50 | 2.7 | A | A |
| Example 738 | | 1.8 | | | | | | | | | 1.80 | 3.2 | B | A |
| Example 739 | | 2.0 | | | | | | | | | 2.00 | 3.6 | B | A |
| Example 740 | | 2.5 | | | | | | | | | 2.50 | 4.5 | B | A |
| Example 741 | | 5.0 | | | | | | | | | 5.00 | 8.9 | C | A |
| Example 742 | SBA-1 | 10.0 | | | | | | | | | 10.00 | 17.9 | C | A |
| Example 743 | | 15.0 | | | | | | | | | 15.00 | 26.8 | C | A |
| Example 744 | | 20.0 | | | | | | | | | 20.00 | 35.7 | C | A |
| Example 745 | MCM-41 | 1.0 | Yes | 1000 | TMABr | 12 | 120 | FER | 0.57 | | 0.10 | 0.2 | C | C |
| Example 746 | | | | 500 | | | | | | | 0.31 | 0.5 | C | C |
| Example 747 | | | | 200 | | | | | | | 0.51 | 0.9 | B | C |
| Example 748 | | | | 100 | | | | | | | 1.02 | 1.8 | A | B |
| Example 749 | | 1.5 | | | | | | | | | 1.53 | 2.7 | A | B |
| Example 750 | | 1.8 | | | | | | | | | 1.83 | 3.2 | A | A |
| Example 751 | | 2.0 | | | | | | | | | 2.04 | 3.6 | A | A |
| Example 752 | | 2.5 | | | | | | | | | 2.54 | 4.5 | A | A |
| Example 753 | | 5.1 | | | | | | | | | 5.09 | 8.9 | B | A |
| Example 754 | SBA-1 | 10.2 | | | | | | | | | 10.18 | 17.9 | B | A |

TABLE 16-continued

Production Conditions for Structured Catalyst for Oxidation for Exhaust Gas Purification / Structured Catalyst for Oxidation for exhaust gas purification

| No. | Precursor Material (A) Type | Precursor Material (A) Pore Diameter (nm) | Presence or Absence of Additives | Addition to Precursor Material (A) Conversion Ratio of Added Amount of Metal-containing Solution (ratio of number of atoms) Si/M | Hydrothermal Treatment Conditions using Precursor Material (C) Type of Structural Directing Agent | pH | Time (h) | Support Zeolite-Type Compound Framework | Average Inner Diameter of Channels $D_F$ (nm) | Catalytic Substance Metal Oxide Nanoparticles Type | Average Particle Size $D_C$ (nm) | $D_C/D_F$ | Performance Evaluation Catalytic Activity | Durability |
|---|---|---|---|---|---|---|---|---|---|---|---|---|---|---|
| Example 755 | | 15.3 | | | | | | | | | 15.27 | 26.8 | C | A |
| Example 756 | | 20.4 | | | | | | | | | 20.36 | 35.7 | C | A |
| Example 757 | MCM-41 | 1.0 | None | 1000 | | | | | | | 0.10 | 0.2 | C | C |
| Example 758 | | | | 500 | | | | | | | 0.31 | 0.5 | C | C |
| Example 759 | | | | 200 | | | | | | | 0.51 | 0.9 | B | C |
| Example 760 | | | | 100 | | | | | | | 1.02 | 1.8 | A | B |
| Example 761 | | 1.5 | | | | | | | | | 1.53 | 2.7 | A | B |
| Example 762 | | 1.8 | | | | | | | | | 1.83 | 3.2 | A | B |
| Example 763 | | 2.0 | | | | | | | | | 2.04 | 3.6 | B | A |
| Example 764 | | 2.5 | | | | | | | | | 2.54 | 4.5 | B | A |
| Example 765 | | 5.1 | | | | | | | | | 5.09 | 8.9 | C | A |
| Example 766 | SBA-1 | 10.2 | | | | | | | | | 10.18 | 17.9 | C | A |
| Example 767 | | 15.3 | | | | | | | | | 15.27 | 26.8 | C | A |
| Example 768 | | 20.4 | | | | | | | | | 20.36 | 35.7 | C | A |

TABLE 17

| No. | Precursor Material (A) Type | Pore Diameter (nm) | Presence or Absence of Additives | Added Amount of Metal-containing Solution (ratio of number of atoms) Si/M | Type of Structural Directing Agent | pH | Time (h) | Framework | Average Inner Diameter of Channels $D_F$ (nm) | Type | Average Particle Size $D_C$ (nm) | $D_C/D_F$ | Catalytic Activity | Durability |
|---|---|---|---|---|---|---|---|---|---|---|---|---|---|---|
| Example 769 | MCM-41 | 1.3 | Yes | 1000 | TEABr | 12 | 120 | FAU | 0.74 | Co | 0.11 | 0.1 | C | C |
| Example 770 | | | | 500 | | | | | | | 0.32 | 0.4 | C | C |
| Example 771 | | | | 200 | | | | | | | 0.53 | 0.7 | B | C |
| Example 772 | | | | 100 | | | | | | | 1.06 | 1.4 | A | B |
| Example 773 | | 2.0 | | | | | | | | | 1.59 | 2.1 | A | B |
| Example 774 | | 2.4 | | | | | | | | | 1.90 | 2.6 | A | A |
| Example 775 | | 2.6 | | | | | | | | | 2.11 | 2.9 | A | A |
| Example 776 | | 3.3 | | | | | | | | | 2.64 | 3.6 | A | A |
| Example 777 | | 6.6 | | | | | | | | | 5.29 | 7.1 | A | A |
| Example 778 | SBA-1 | 13.2 | | | | | | | | | 10.57 | 14.3 | B | A |
| Example 779 | | 19.8 | | | | | | | | | 15.86 | 21.4 | C | A |
| Example 780 | | 26.4 | | | | | | | | | 21.14 | 28.6 | C | A |
| Example 781 | MCM-41 | 1.3 | None | 1000 | | | | | | | 0.11 | 0.1 | C | C |
| Example 782 | | | | 500 | | | | | | | 0.32 | 0.4 | C | C |
| Example 783 | | | | 200 | | | | | | | 0.53 | 0.7 | B | B |
| Example 784 | | | | 100 | | | | | | | 1.06 | 1.4 | A | B |
| Example 785 | | 2.0 | | | | | | | | | 1.59 | 2.1 | A | A |
| Example 786 | | 2.4 | | | | | | | | | 1.90 | 2.6 | B | A |
| Example 787 | | 2.6 | | | | | | | | | 2.11 | 2.9 | B | A |
| Example 788 | | 3.3 | | | | | | | | | 2.64 | 3.6 | B | A |
| Example 789 | | 6.6 | | | | | | | | | 5.29 | 7.1 | C | A |
| Example 790 | SBA-1 | 13.2 | | | | | | | | | 10.57 | 14.3 | C | A |
| Example 791 | | 19.8 | | | | | | | | | 15.86 | 21.4 | C | A |
| Example 792 | | 26.4 | | | | | | | | | 21.14 | 28.6 | C | C |
| Example 793 | MCM-41 | 1.1 | Yes | 1000 | | 11 | 72 | MTW | 0.61 | | 0.09 | 0.1 | C | C |
| Example 794 | | | | 500 | | | | | | | 0.26 | 0.4 | C | B |
| Example 795 | | | | 200 | | | | | | | 0.44 | 0.7 | B | B |
| Example 796 | | | | 100 | | | | | | | 0.87 | 1.4 | A | B |
| Example 797 | | 1.6 | | | | | | | | | 1.31 | 2.1 | A | A |
| Example 798 | | 2.0 | | | | | | | | | 1.57 | 2.6 | A | A |
| Example 799 | | 2.2 | | | | | | | | | 1.74 | 2.9 | A | A |
| Example 800 | | 2.7 | | | | | | | | | 2.18 | 3.6 | A | A |
| Example 801 | | 5.4 | | | | | | | | | 4.36 | 7.1 | B | A |
| Example 802 | SBA-1 | 10.9 | | | | | | | | | 8.71 | 14.3 | B | A |
| Example 803 | | 16.3 | | | | | | | | | 13.07 | 21.4 | C | A |
| Example 804 | | 21.8 | | | | | | | | | 17.43 | 28.6 | C | A |

TABLE 17-continued

| | | Production Conditions for Structured Catalyst for Oxidation for Exhaust Gas Purification | | | | | | | Structured Catalyst for Oxidation for exhaust gas purification | | | | | |
|---|---|---|---|---|---|---|---|---|---|---|---|---|---|---|
| | Precursor Material (A) | | Addition to Precursor Material (A) | | Hydrothermal Treatment Conditions using Precursor Material (C) | | | | Support Zeolite-Type Compound | | Oxidation Catalyst Metal Oxide Nanoparticles | | Performance Evaluation | |
| No. | Type | Pore Diameter (nm) | Presence or Absence of Additives | Conversion Ratio of Added Amount of Metal-containing Solution (ratio of number of atoms) Si/M | Type of Structural Directing Agent | pH | Time (h) | Framework | Type | Average Inner Diameter of Channels $D_F$ (nm) | Type | Average Particle Size $D_C$ (nm) | $D_C/D_F$ | Catalytic Activity | Durability |
| Example 805 | MCM-41 | 1.1 | None | 1000 | | | | | | | | 0.09 | 0.1 | C | C |
| Example 806 | | | | 500 | | | | | | | | 0.26 | 0.4 | C | C |
| Example 807 | | | | 200 | | | | | | | | 0.44 | 0.7 | B | C |
| Example 808 | | | | 100 | | | | | | | | 0.87 | 1.4 | A | B |
| Example 809 | | 1.6 | | | | | | | | | | 1.31 | 2.1 | A | B |
| Example 810 | | 2.0 | | | | | | | | | | 1.57 | 2.6 | A | B |
| Example 811 | | 2.2 | | | | | | | | | | 1.74 | 2.9 | B | A |
| Example 812 | | 2.7 | | | | | | | | | | 2.18 | 3.6 | B | A |
| Example 813 | | 5.4 | | | | | | | | | | 4.36 | 7.1 | C | A |
| Example 814 | SBA-1 | 10.9 | | | | | | | | | | 8.71 | 14.3 | C | A |
| Example 815 | | 16.3 | | | | | | | | | | 13.07 | 21.4 | C | A |
| Example 816 | | 21.8 | | | | | | | | | | 17.43 | 28.6 | C | A |

TABLE 18

| No. | Precursor Material (A) Type | Pore Diameter (nm) | Presence or Absence of Additives | Added Amount of Metal-containing Solution (ratio of number of atoms) Si/M | Type of Structural Directing Agent | pH | Time (h) | Framework | Average Inner Diameter of Channels $D_F$ (nm) | Type | Average Particle Size $D_C$ (nm) | $D_C/D_F$ | Catalytic Activity | Durability |
|---|---|---|---|---|---|---|---|---|---|---|---|---|---|---|
| Example 817 | MCM-41 | 1.0 | Yes | 1000 | TPABr | 12 | 72 | MFI | 0.56 | Co | 0.08 | 0.1 | C | C |
| Example 818 | | | | 500 | | | | | | | 0.24 | 0.4 | C | C |
| Example 819 | | | | 200 | | | | | | | 0.40 | 0.7 | B | C |
| Example 820 | | | | 100 | | | | | | | 0.80 | 1.4 | A | B |
| Example 821 | | 1.5 | | | | | | | | | 1.20 | 2.1 | A | B |
| Example 822 | | 1.8 | | | | | | | | | 1.44 | 2.6 | A | A |
| Example 823 | | 2.0 | | | | | | | | | 1.60 | 2.9 | A | A |
| Example 824 | | 2.5 | | | | | | | | | 2.00 | 3.6 | A | A |
| Example 825 | | 5.0 | | | | | | | | | 4.00 | 7.1 | A | A |
| Example 826 | SBA-1 | 10.0 | | | | | | | | | 8.00 | 14.3 | B | A |
| Example 827 | | 15.0 | | | | | | | | | 12.00 | 21.4 | C | A |
| Example 828 | | 20.0 | | | | | | | | | 16.00 | 28.6 | C | A |
| Example 829 | MCM-41 | 1.0 | None | 1000 | | | | | | | 0.08 | 0.1 | C | C |
| Example 830 | | | | 500 | | | | | | | 0.24 | 0.4 | C | C |
| Example 831 | | | | 200 | | | | | | | 0.40 | 0.7 | B | B |
| Example 832 | | | | 100 | | | | | | | 0.80 | 1.4 | A | A |
| Example 833 | | 1.5 | | | | | | | | | 1.20 | 2.1 | A | B |
| Example 834 | | 1.8 | | | | | | | | | 1.44 | 2.6 | A | B |
| Example 835 | | 2.0 | | | | | | | | | 1.60 | 2.9 | B | A |
| Example 836 | | 2.5 | | | | | | | | | 2.00 | 3.6 | B | A |
| Example 837 | | 5.0 | | | | | | | | | 4.00 | 7.1 | C | A |
| Example 838 | SBA-1 | 10.0 | | | | | | | | | 8.00 | 14.3 | C | A |
| Example 839 | | 15.0 | | | | | | | | | 12.00 | 21.4 | C | A |
| Example 840 | | 20.0 | | | | | | | | | 16.00 | 28.6 | C | A |
| Example 841 | MCM-41 | 1.0 | Yes | 1000 | TMABr | 12 | 120 | EER | 0.57 | | 0.08 | 0.1 | C | C |
| Example 842 | | | | 500 | | | | | | | 0.24 | 0.4 | C | C |
| Example 843 | | | | 200 | | | | | | | 0.41 | 0.7 | B | B |
| Example 844 | | | | 100 | | | | | | | 0.81 | 1.4 | A | B |
| Example 845 | | 1.5 | | | | | | | | | 1.22 | 2.1 | A | A |
| Example 846 | | 1.8 | | | | | | | | | 1.47 | 2.6 | A | B |
| Example 847 | | 2.0 | | | | | | | | | 1.63 | 2.9 | A | B |
| Example 848 | | 2.5 | | | | | | | | | 2.04 | 3.6 | A | A |
| Example 849 | | 5.1 | | | | | | | | | 4.07 | 7.1 | A | A |
| Example 850 | SBA-1 | 10.2 | | | | | | | | | 8.14 | 14.3 | B | A |
| Example 851 | | 15.3 | | | | | | | | | 12.21 | 21.4 | C | A |
| Example 852 | | 20.4 | | | | | | | | | 16.29 | 28.6 | C | A |
| Example 853 | MCM-41 | 1.0 | None | 1000 | | | | | | | 0.08 | 0.1 | C | C |

TABLE 18-continued

Structured Catalyst for Oxidation for Exhaust Gas Purification

| | | Production Conditions for Structured Catalyst for Oxidation for Exhaust Gas Purification | | | | | | | Structured Catalyst for Oxidation for Exhaust Gas Purification | | | | Performance Evaluation | |
|---|---|---|---|---|---|---|---|---|---|---|---|---|---|---|
| | Precursor Material (A) | | Addition to Precursor Material (A) | | Hydrothermal Treatment Conditions using Precursor Material (C) | | | | Support Zeolite-Type Compound | | Oxidation Catalyst Metal Oxide Nanoparticles | | | |
| No. | Type | Pore Diameter (nm) | Presence or Absence of Additives | Conversion Ratio of Added Amount of Metal-containing Solution (ratio of number of atoms) Si/M | Type of Structural Directing Agent | pH | Time (h) | Framework | Average Inner Diameter of Channels $D_F$ (nm) | Type | Average Particle Size $D_C$ (nm) | $D_C/D_F$ | Catalytic Activity | Durability |
| Example 854 | | | | 500 | | | | | | | 0.24 | 0.4 | C | C |
| Example 855 | | | | 200 | | | | | | | 0.41 | 0.7 | B | C |
| Example 856 | | | | 100 | | | | | | | 0.81 | 1.4 | A | B |
| Example 857 | | 1.5 | | | | | | | | | 1.22 | 2.1 | A | B |
| Example 858 | | 1.8 | | | | | | | | | 1.47 | 2.6 | A | B |
| Example 859 | | 2.0 | | | | | | | | | 1.63 | 2.9 | B | A |
| Example 860 | | 2.5 | | | | | | | | | 2.04 | 3.6 | A | A |
| Example 861 | | 5.1 | | | | | | | | | 4.07 | 7.1 | C | A |
| Example 862 | SBA-1 | 10.2 | | | | | | | | | 8.14 | 14.3 | C | A |
| Example 863 | | 15.3 | | | | | | | | | 12.21 | 21.4 | C | A |
| Example 864 | | 20.4 | | | | | | | | | 16.29 | 28.6 | C | A |

TABLE 19

| | Production Conditions for Structured Catalyst for Oxidation for Exhaust Gas Purification | | | | | | | | Structured Catalyst for Oxidation for Exhaust Gas Purification | | | | | | |
|---|---|---|---|---|---|---|---|---|---|---|---|---|---|---|---|
| | Precursor Material (A) | | | Addition to Precursor Material (A) | | Hydrothermal Treatment Conditions using Precursor Material (C) | | | | Support | | Oxidation Catalyst Metal Oxide Nanoparticles | | Performance Evaluation | |
| | | Pore Diameter | Presence or Absence of | Conversion Ratio of Added Amount of Metal-containing Solution (ratio of | Type of Structural | | | | | Zeolite-Type Compound | Average Inner Diameter of Channels $D_F$ | | Average Particle Size $D_C$ | Catalytic | |
| No. | Type | (nm) | Additives | number of atoms) Si/M | Directing Agent | pH | Time (h) | Framework | | | (nm) | Type | (nm) | $D_C/D_F$ | Activity | Durability |
| Example 865 | MCM-41 | 1.3 | Yes | 1000 | TEABr | 12 | 120 | FAU | | | 0.74 | Ni | 0.11 | 0.1 | C | C |
| Example 866 | | | | 500 | | | | | | | | | 0.32 | 0.4 | C | C |
| Example 867 | | | | 200 | | | | | | | | | 0.53 | 0.7 | B | C |
| Example 868 | | | | 100 | | | | | | | | | 1.06 | 1.4 | A | B |
| Example 869 | | 2.0 | | | | | | | | | | | 1.59 | 2.1 | A | B |
| Example 870 | | 2.4 | | | | | | | | | | | 1.90 | 2.6 | A | A |
| Example 871 | | 2.6 | | | | | | | | | | | 2.11 | 2.9 | A | A |
| Example 872 | | 3.3 | | | | | | | | | | | 2.64 | 3.6 | A | A |
| Example 873 | | 6.6 | | | | | | | | | | | 5.29 | 7.1 | B | A |
| Example 874 | SBA-1 | 13.2 | | | | | | | | | | | 10.57 | 14.3 | B | A |
| Example 875 | | 19.8 | | | | | | | | | | | 15.86 | 21.4 | C | A |
| Example 876 | | 26.4 | | | | | | | | | | | 21.14 | 28.6 | C | A |
| Example 877 | MCM-41 | 1.3 | None | 1000 | | | | | | | | | 0.11 | 0.1 | C | C |
| Example 878 | | | | 500 | | | | | | | | | 0.32 | 0.4 | C | C |
| Example 879 | | | | 200 | | | | | | | | | 0.53 | 0.7 | B | B |
| Example 880 | | | | 100 | | | | | | | | | 1.06 | 1.4 | A | B |
| Example 881 | | 2.0 | | | | | | | | | | | 1.59 | 2.1 | A | B |
| Example 882 | | 2.4 | | | | | | | | | | | 1.90 | 2.6 | A | A |
| Example 883 | | 2.6 | | | | | | | | | | | 2.11 | 2.9 | B | A |
| Example 884 | | 3.3 | | | | | | | | | | | 2.64 | 3.6 | B | A |
| Example 885 | | 6.6 | | | | | | | | | | | 5.29 | 7.1 | C | A |
| Example 886 | SBA-1 | 13.2 | | | | | | | | | | | 10.57 | 14.3 | C | A |
| Example 887 | | 19.8 | | | | | | | | | | | 15.86 | 21.4 | C | A |
| Example 888 | | 26.4 | | | | | | | | | | | 21.14 | 28.6 | C | A |
| Example 889 | MCM-41 | 1.1 | Yes | 1000 | | 11 | 72 | MTW | | | 0.61 | | 0.09 | 0.1 | C | C |
| Example 890 | | | | 500 | | | | | | | | | 0.26 | 0.4 | C | C |
| Example 891 | | | | 200 | | | | | | | | | 0.44 | 0.7 | B | B |
| Example 892 | | | | 100 | | | | | | | | | 0.87 | 1.4 | A | B |
| Example 893 | | 1.6 | | | | | | | | | | | 1.31 | 2.1 | A | B |
| Example 894 | | 2.0 | | | | | | | | | | | 1.57 | 2.6 | A | A |
| Example 895 | | 2.2 | | | | | | | | | | | 1.74 | 2.9 | A | A |
| Example 896 | | 2.7 | | | | | | | | | | | 2.18 | 3.6 | A | A |
| Example 897 | | 5.4 | | | | | | | | | | | 4.36 | 7.1 | B | A |
| Example 898 | SBA-1 | 10.9 | | | | | | | | | | | 8.71 | 14.3 | B | A |
| Example 899 | | 16.3 | | | | | | | | | | | 13.07 | 21.4 | C | A |
| Example 900 | | 21.8 | | | | | | | | | | | 17.43 | 28.6 | C | A |
| Example 901 | MCM-41 | 1.1 | None | 1000 | | | | | | | | | 0.09 | 0.1 | C | C |

TABLE 19-continued

Structured Catalyst for Oxidation for Exhaust Gas Purification

| | | Production Conditions for Structured Catalyst for Oxidation for Exhaust Gas Purification | | | | | | | Structured Catalyst for Oxidation for Exhaust Gas Purification | | | | | | |
|---|---|---|---|---|---|---|---|---|---|---|---|---|---|---|---|
| | Precursor Material (A) | | Addition to Precursor Material (A) | | Hydrothermal Treatment Conditions using Precursor Material (C) | | | | Support Zeolite-Type Compound | | Oxidation Catalyst Metal Oxide Nanoparticles | | Performance Evaluation | | |
| No. | Type | Pore Diameter (nm) | Presence or Absence of Additives | Conversion Ratio of Added Amount of Metal-containing Solution (ratio of number of atoms) Si/M | Type of Structural Directing Agent | pH | Time (h) | Framework | Average Inner Diameter of Channels $D_F$ (nm) | Type | Average Particle Size $D_C$ (nm) | $D_C/D_F$ | Catalytic Activity | Durability |
| Example 902 | | | | 500 | | | | | | | | 0.26 | 0.4 | C | C |
| Example 903 | | | | 200 | | | | | | | | 0.44 | 0.7 | B | C |
| Example 904 | | | | 100 | | | | | | | | 0.87 | 1.4 | A | B |
| Example 905 | | 1.6 | | | | | | | | | | 1.31 | 2.1 | A | B |
| Example 906 | | 2.0 | | | | | | | | | | 1.57 | 2.6 | A | B |
| Example 907 | | 2.2 | | | | | | | | | | 1.74 | 2.9 | B | A |
| Example 908 | | 2.7 | | | | | | | | | | 2.18 | 3.6 | B | A |
| Example 909 | | 5.4 | | | | | | | | | | 4.36 | 7.1 | C | A |
| Example 910 | SBA-1 | 10.9 | | | | | | | | | | 8.71 | 14.3 | C | A |
| Example 911 | | 16.3 | | | | | | | | | | 13.07 | 21.4 | C | A |
| Example 912 | | 21.8 | | | | | | | | | | 17.43 | 28.6 | C | A |

TABLE 20

| | Precursor Material (A) | | Production Conditions for Structured Catalyst for Oxidation for Exhaust Gas Purification | | | | Hydrothermal Treatment Conditions using Precursor Material (C) | | | Structured Catalyst for Oxidation for Exhaust Gas Purification | | | | Performance Evaluation | | |
|---|---|---|---|---|---|---|---|---|---|---|---|---|---|---|---|---|
| | | | Addition to Precursor Material (A) | | | | | | | Support Zeolite-Type Compound | | Oxidation Catalyst Metal Oxide Nanoparticles | | | | |
| No. | Type | Pore Diameter (nm) | Presence or Absence of Additives | Type of Structural Directing Agent | Conversion Ratio of Metal-containing Solution (ratio of number of atoms) Si/M | Added Amount of | pH | Time (h) | Framework | Average Inner Diameter of Channels $D_F$ (nm) | Type | Average Particle Size $D_C$ (nm) | $D_C/D_F$ | Catalytic Activity | Durability |
| Example 913 | MCM-41 | 1.0 | Yes | TPABr | 1000 | | 12 | 72 | MFI | 0.56 | Ni | 0.08 | 0.1 | C | C |
| Example 914 | | | | | 500 | | | | | | | 0.24 | 0.4 | C | C |
| Example 915 | | | | | 200 | | | | | | | 0.40 | 0.7 | B | C |
| Example 916 | | | | | 100 | | | | | | | 0.80 | 1.4 | A | B |
| Example 917 | | 1.5 | | | | | | | | | | 1.20 | 2.1 | A | B |
| Example 918 | | 1.8 | | | | | | | | | | 1.44 | 2.6 | A | A |
| Example 919 | | 2.0 | | | | | | | | | | 1.60 | 2.9 | A | A |
| Example 920 | | 2.5 | | | | | | | | | | 2.00 | 3.6 | A | A |
| Example 921 | | 5.0 | | | | | | | | | | 4.00 | 7.1 | A | A |
| Example 922 | SBA-1 | 10.0 | | | | | | | | | | 8.00 | 14.3 | B | A |
| Example 923 | | 15.0 | | | | | | | | | | 12.00 | 21.4 | B | A |
| Example 924 | | 20.0 | | | | | | | | | | 16.00 | 28.6 | C | A |
| Example 925 | MCM-41 | 1.0 | None | | 1000 | | | | | | | 0.08 | 0.1 | C | C |
| Example 926 | | | | | 500 | | | | | | | 0.24 | 0.4 | C | C |
| Example 927 | | | | | 200 | | | | | | | 0.40 | 0.7 | B | C |
| Example 928 | | | | | 100 | | | | | | | 0.80 | 1.4 | A | B |
| Example 929 | | 1.5 | | | | | | | | | | 1.20 | 2.1 | A | B |
| Example 930 | | 1.8 | | | | | | | | | | 1.44 | 2.6 | B | A |
| Example 931 | | 2.0 | | | | | | | | | | 1.60 | 2.9 | B | A |
| Example 932 | | 2.5 | | | | | | | | | | 2.00 | 3.6 | B | A |
| Example 933 | | 5.0 | | | | | | | | | | 4.00 | 7.1 | C | A |
| Example 934 | SBA-1 | 10.0 | | | | | | | | | | 8.00 | 14.3 | C | A |
| Example 935 | | 15.0 | | | | | | | | | | 12.00 | 21.4 | C | A |
| Example 936 | | 20.0 | | | | | | | | | | 16.00 | 28.6 | C | A |
| Example 937 | MCM-41 | 1.0 | Yes | TMABr | 1000 | | 12 | 120 | FER | 0.57 | | 0.08 | 0.1 | C | C |
| Example 938 | | | | | 500 | | | | | | | 0.24 | 0.4 | C | C |
| Example 939 | | | | | 200 | | | | | | | 0.41 | 0.7 | B | B |
| Example 940 | | | | | 100 | | | | | | | 0.81 | 1.4 | A | B |
| Example 941 | | 1.5 | | | | | | | | | | 1.22 | 2.1 | A | B |
| Example 942 | | 1.8 | | | | | | | | | | 1.47 | 2.6 | A | A |
| Example 943 | | 2.0 | | | | | | | | | | 1.63 | 2.9 | A | A |
| Example 944 | | 2.5 | | | | | | | | | | 2.04 | 3.6 | A | A |
| Example 945 | | 5.1 | | | | | | | | | | 4.07 | 7.1 | A | A |
| Example 946 | SBA-1 | 10.2 | | | | | | | | | | 8.14 | 14.3 | B | A |
| Example 947 | | 15.3 | | | | | | | | | | 12.21 | 21.4 | C | A |
| Example 948 | | 20.4 | | | | | | | | | | 16.29 | 28.6 | C | A |

TABLE 20-continued

| | Production Conditions for Structured Catalyst for Oxidation for Exhaust Gas Purification | | | | | | | Structured Catalyst for Oxidation for Exhaust Gas Purification | | | | | |
|---|---|---|---|---|---|---|---|---|---|---|---|---|---|
| | Precursor Material (A) | | Addition to Precursor Material (A) | | Hydrothermal Treatment Conditions using Precursor Material (C) | | | Support Zeolite-Type Compound | | Oxidation Catalyst Metal Oxide Nanoparticles | | Performance Evaluation | |
| No. | Type | Pore Diameter (nm) | Presence or Absence of Additives | Conversion Ratio of Added Amount of Metal-containing Solution (ratio of number of atoms) Si/M | Type of Structural Directing Agent | pH | Time (h) | Framework | Average Inner Diameter of Channels $D_F$ (nm) | Type | Average Particle Size $D_C$ (nm) | $D_C/D_F$ | Catalytic Activity | Durability |
| Example 949 | MCM-41 | 1.0 | None | 1000 | | | | | | | 0.08 | 0.1 | C | C |
| Example 950 | | | | 500 | | | | | | | 0.24 | 0.4 | C | C |
| Example 951 | | | | 200 | | | | | | | 0.41 | 0.7 | B | C |
| Example 952 | | | | 100 | | | | | | | 0.81 | 1.4 | A | B |
| Example 953 | | 1.5 | | | | | | | | | 1.22 | 2.1 | A | B |
| Example 954 | | 1.8 | | | | | | | | | 1.47 | 2.6 | A | B |
| Example 955 | | 2.0 | | | | | | | | | 1.63 | 2.9 | B | A |
| Example 956 | | 2.5 | | | | | | | | | 2.04 | 3.6 | B | A |
| Example 957 | | 5.1 | | | | | | | | | 4.07 | 7.1 | C | A |
| Example 958 | SBA-1 | 10.2 | | | | | | | | | 8.14 | 14.3 | C | A |
| Example 959 | | 15.3 | | | | | | | | | 12.21 | 21.4 | C | A |
| Example 960 | | 20.4 | | | | | | | | | 16.29 | 28.6 | C | A |

TABLE 21

| No. | Precursor Material (A) Type | Precursor Material (A) Pore Diameter (nm) | Addition to Precursor Material (A) Presence or Absence of Additives | Conversion Ratio of Metal-containing Solution (ratio of atoms) Si/M | Hydrothermal Treatment Conditions using Precursor Material (C) Type of Structural Directing Agent | pH | Time (h) | Support Zeolite-Type Compound Framework | Support Average Inner Diameter of Channels $D_F$ (nm) | Catalyst Metal Oxide Nanoparticles Type | Catalyst Metal Oxide Nanoparticles Average Particle Size $D_C$ (nm) | $D_C/D_F$ | Performance Evaluation Catalytic Activity | Performance Evaluation Durability |
|---|---|---|---|---|---|---|---|---|---|---|---|---|---|---|
| Example 961 | MCM-41 | 1.3 | Yes | 1000 | TEABr | 12 | 120 | FAU | 0.74 | Fe | 0.11 | 0.1 | C | C |
| Example 962 | MCM-41 | 1.3 | Yes | 500 | TEABr | 12 | 120 | FAU | 0.74 | Fe | 0.32 | 0.4 | C | C |
| Example 963 | MCM-41 | 1.3 | Yes | 200 | TEABr | 12 | 120 | FAU | 0.74 | Fe | 0.53 | 0.7 | B | C |
| Example 964 | MCM-41 | 1.3 | Yes | 100 | TEABr | 12 | 120 | FAU | 0.74 | Fe | 1.06 | 1.4 | A | B |
| Example 965 | MCM-41 | 2.0 | Yes | 100 | TEABr | 12 | 120 | FAU | 0.74 | Fe | 1.59 | 2.1 | A | B |
| Example 966 | MCM-41 | 2.4 | Yes | 100 | TEABr | 12 | 120 | FAU | 0.74 | Fe | 1.90 | 2.6 | A | A |
| Example 967 | MCM-41 | 2.6 | Yes | 100 | TEABr | 12 | 120 | FAU | 0.74 | Fe | 2.11 | 2.9 | A | A |
| Example 968 | MCM-41 | 3.3 | Yes | 100 | TEABr | 12 | 120 | FAU | 0.74 | Fe | 2.64 | 3.6 | A | A |
| Example 969 | MCM-41 | 6.6 | Yes | 100 | TEABr | 12 | 120 | FAU | 0.74 | Fe | 5.29 | 7.1 | B | A |
| Example 970 | SBA-1 | 13.2 | Yes | 100 | TEABr | 12 | 120 | FAU | 0.74 | Fe | 10.57 | 14.3 | C | A |
| Example 971 | SBA-1 | 19.8 | Yes | 100 | TEABr | 12 | 120 | FAU | 0.74 | Fe | 15.86 | 21.4 | C | A |
| Example 972 | SBA-1 | 26.4 | Yes | 100 | TEABr | 12 | 120 | FAU | 0.74 | Fe | 21.14 | 28.6 | C | A |
| Example 973 | MCM-41 | 1.3 | None | 1000 | TEABr | 12 | 120 | FAU | 0.74 | Fe | 0.11 | 0.1 | C | C |
| Example 974 | MCM-41 | 1.3 | None | 500 | TEABr | 12 | 120 | FAU | 0.74 | Fe | 0.32 | 0.4 | C | C |
| Example 975 | MCM-41 | 1.3 | None | 200 | TEABr | 12 | 120 | FAU | 0.74 | Fe | 0.53 | 0.7 | B | C |
| Example 976 | MCM-41 | 1.3 | None | 100 | TEABr | 12 | 120 | FAU | 0.74 | Fe | 1.06 | 1.4 | A | B |
| Example 977 | MCM-41 | 2.0 | None | 100 | TEABr | 12 | 120 | FAU | 0.74 | Fe | 1.59 | 2.1 | A | B |
| Example 978 | MCM-41 | 2.4 | None | 100 | TEABr | 12 | 120 | FAU | 0.74 | Fe | 1.90 | 2.6 | A | A |
| Example 979 | MCM-41 | 2.6 | None | 100 | TEABr | 12 | 120 | FAU | 0.74 | Fe | 2.11 | 2.9 | B | A |
| Example 980 | MCM-41 | 3.3 | None | 100 | TEABr | 12 | 120 | FAU | 0.74 | Fe | 2.64 | 3.6 | B | A |
| Example 981 | MCM-41 | 6.6 | None | 100 | TEABr | 12 | 120 | FAU | 0.74 | Fe | 5.29 | 7.1 | C | A |
| Example 982 | SBA-1 | 13.2 | None | 100 | TEABr | 12 | 120 | FAU | 0.74 | Fe | 10.57 | 14.3 | C | A |
| Example 983 | SBA-1 | 19.8 | None | 100 | TEABr | 12 | 120 | FAU | 0.74 | Fe | 15.86 | 21.4 | C | A |
| Example 984 | SBA-1 | 26.4 | None | 100 | TEABr | 12 | 120 | FAU | 0.74 | Fe | 21.14 | 28.6 | C | A |
| Example 985 | MCM-41 | 1.1 | Yes | 1000 | TEABr | 11 | 72 | MTW | 0.61 | Fe | 0.09 | 0.1 | C | C |
| Example 986 | MCM-41 | 1.1 | Yes | 500 | TEABr | 11 | 72 | MTW | 0.61 | Fe | 0.26 | 0.4 | C | C |
| Example 987 | MCM-41 | 1.1 | Yes | 200 | TEABr | 11 | 72 | MTW | 0.61 | Fe | 0.44 | 0.7 | B | B |
| Example 988 | MCM-41 | 1.1 | Yes | 100 | TEABr | 11 | 72 | MTW | 0.61 | Fe | 0.87 | 1.4 | A | B |
| Example 989 | MCM-41 | 1.6 | Yes | 100 | TEABr | 11 | 72 | MTW | 0.61 | Fe | 1.31 | 2.1 | A | B |
| Example 990 | MCM-41 | 2.0 | Yes | 100 | TEABr | 11 | 72 | MTW | 0.61 | Fe | 1.57 | 2.6 | A | A |
| Example 991 | MCM-41 | 2.2 | Yes | 100 | TEABr | 11 | 72 | MTW | 0.61 | Fe | 1.74 | 2.9 | A | A |
| Example 992 | MCM-41 | 2.7 | Yes | 100 | TEABr | 11 | 72 | MTW | 0.61 | Fe | 2.18 | 3.6 | A | A |
| Example 993 | MCM-41 | 5.4 | Yes | 100 | TEABr | 11 | 72 | MTW | 0.61 | Fe | 4.36 | 7.1 | B | A |
| Example 994 | SBA-1 | 10.9 | Yes | 100 | TEABr | 11 | 72 | MTW | 0.61 | Fe | 8.71 | 14.3 | B | A |
| Example 995 | SBA-1 | 16.3 | Yes | 100 | TEABr | 11 | 72 | MTW | 0.61 | Fe | 13.07 | 21.4 | C | A |

TABLE 21-continued

Structured Catalyst for Oxidation for Exhaust Gas Purification

| | Production Conditions for Structured Catalyst for Oxidation for Exhaust Gas Purification | | | | | | | | | | Structured Catalyst for Oxidation for Exhaust Gas Purification | | | | | |
|---|---|---|---|---|---|---|---|---|---|---|---|---|---|---|---|---|
| | Precursor Material (A) | | Addition to Precursor Material (A) | | Hydrothermal Treatment Conditions using Precursor Material (C) | | | | | | Support Zeolite-Type Compound | | Oxidation Catalyst Metal Oxide Nanoparticles | | Performance Evaluation | |
| No. | Type | Pore Diameter (nm) | Presence or Absence of Additives | Added Amount of Metal-containing Solution (ratio of number of atoms) Si/M | Type of Structural Directing Agent | | pH | Time (h) | | | Framework | Average Inner Diameter of Channels $D_F$ (nm) | Type | Average Particle Size $D_C$ (nm) | $D_C/D_F$ | Catalytic Activity | Durability |
| Example 996 | MCM-41 | 21.8 | None | | | | | | | | | | | 17.43 | 28.6 | C | A |
| Example 997 | | 1.1 | | 1000 | | | | | | | | | | 0.09 | 0.1 | C | C |
| Example 998 | | | | 500 | | | | | | | | | | 0.26 | 0.4 | C | C |
| Example 999 | | | | 200 | | | | | | | | | | 0.44 | 0.7 | B | C |
| Example 1000 | | | | 100 | | | | | | | | | | 0.87 | 1.4 | A | B |
| Example 1001 | | 1.6 | | | | | | | | | | | | 1.31 | 2.1 | A | B |
| Example 1002 | | 2.0 | | | | | | | | | | | | 1.57 | 2.6 | A | B |
| Example 1003 | | 2.2 | | | | | | | | | | | | 1.74 | 2.9 | B | A |
| Example 1004 | | 2.7 | | | | | | | | | | | | 2.18 | 3.6 | B | A |
| Example 1005 | | 5.4 | | | | | | | | | | | | 4.36 | 7.1 | C | A |
| Example 1006 | SBA-1 | 10.9 | | | | | | | | | | | | 8.71 | 14.3 | C | A |
| Example 1007 | | 16.3 | | | | | | | | | | | | 13.07 | 21.4 | C | A |
| Example 1008 | | 21.8 | | | | | | | | | | | | 17.43 | 28.6 | C | A |

TABLE 22

| No. | Production Conditions for Structured Catalyst for Oxidation for Exhaust Gas Purification | | | | | | | Structured Catalyst for Oxidation for Exhaust Gas Purification | | | | | Performance Evaluation | |
|---|---|---|---|---|---|---|---|---|---|---|---|---|---|---|
| | Precursor Material (A) | | Addition to Precursor Material (A) | | Hydrothermal Treatment Conditions using Precursor Material (C) | | | Support | | Oxidation Catalyst Metal Oxide Nanoparticles | | | | |
| | | | Conversion Ratio of Added Amount of Metal-containing Solution (ratio of number of atoms) Si/M | | | | | Zeolite-Type Compound | | | | | | |
| | type | Pore Diameter (nm) | Presence or Absence of Additives | | Type of Structural Directing Agent | pH | Time (h) | Framework | Average Inner Diameter of Channels $D_F$ (nm) | Type | Average Particle Size $D_C$ (nm) | $D_C/D_F$ | Catalytic Activity | durability |
| Example 1009 | MCM-41 | 1.0 | Yes | 1000 | TPABr | 12 | 72 | MFI | 0.56 | Fe | 0.08 | 0.1 | C | C |
| Example 1010 | | | | 500 | | | | | | | 0.24 | 0.4 | C | C |
| Example 1011 | | | | 200 | | | | | | | 0.40 | 0.7 | B | C |
| Example 1012 | | | | 100 | | | | | | | 0.80 | 1.4 | A | B |
| Example 1013 | | 1.5 | | | | | | | | | 1.20 | 2.1 | A | B |
| Example 1014 | | 1.8 | | | | | | | | | 1.44 | 2.6 | A | A |
| Example 1015 | | 2.0 | | | | | | | | | 1.60 | 2.9 | A | A |
| Example 1016 | | 2.5 | | | | | | | | | 2.00 | 3.6 | A | A |
| Example 1017 | | 5.0 | | | | | | | | | 4.00 | 7.1 | B | A |
| Example 1018 | SBA-1 | 10.0 | | | | | | | | | 8.00 | 14.3 | B | A |
| Example 1019 | | 15.0 | | | | | | | | | 12.00 | 21.4 | C | A |
| Example 1020 | | 20.0 | | | | | | | | | 16.00 | 28.6 | C | C |
| Example 1021 | MCM-41 | 1.0 | None | 1000 | | | | | | | 0.08 | 0.1 | C | C |
| Example 1022 | | | | 500 | | | | | | | 0.24 | 0.4 | C | C |
| Example 1023 | | | | 200 | | | | | | | 0.40 | 0.7 | B | C |
| Example 1024 | | | | 100 | | | | | | | 0.80 | 1.4 | A | B |
| Example 1025 | | 1.5 | | | | | | | | | 1.20 | 2.1 | A | B |
| Example 1026 | | 1.8 | | | | | | | | | 1.44 | 2.6 | A | A |
| Example 1027 | | 2.0 | | | | | | | | | 1.60 | 2.9 | B | A |
| Example 1028 | | 2.5 | | | | | | | | | 2.00 | 3.6 | B | A |
| Example 1029 | | 5.0 | | | | | | | | | 4.00 | 7.1 | C | A |
| Example 1030 | SBA-1 | 10.0 | | | | | | | | | 8.00 | 14.3 | C | A |
| Example 1031 | | 15.0 | | | | | | | | | 12.00 | 21.4 | C | A |
| Example 1032 | | 20.0 | | | | | | | | | 16.00 | 28.6 | C | C |
| Example 1033 | MCM-41 | 1.0 | Yes | 1000 | TMABr | 12 | 120 | FER | 0.57 | | 0.08 | 0.1 | C | C |
| Example 1034 | | | | 500 | | | | | | | 0.24 | 0.4 | C | C |
| Example 1035 | | | | 200 | | | | | | | 0.41 | 0.7 | B | C |
| Example 1036 | | | | 100 | | | | | | | 0.81 | 1.4 | A | B |
| Example 1037 | | 1.5 | | | | | | | | | 1.22 | 2.1 | A | B |
| Example 1038 | | 1.8 | | | | | | | | | 1.47 | 2.6 | A | A |
| Example 1039 | | 2.0 | | | | | | | | | 1.63 | 2.9 | A | A |
| Example 1040 | | 2.5 | | | | | | | | | 2.04 | 3.6 | A | A |
| Example 1041 | | 5.1 | | | | | | | | | 4.07 | 7.1 | B | A |
| Example 1042 | SBA-1 | 10.2 | | | | | | | | | 8.14 | 14.3 | B | A |
| Example 1043 | | 15.3 | | | | | | | | | 12.21 | 21.4 | C | A |
| Example 1044 | | 20.4 | | | | | | | | | 16.29 | 28.6 | C | A |
| Example 1045 | MCM-41 | 1.0 | None | 1000 | | | | | | | 0.08 | 0.1 | C | C |

TABLE 22-continued

| | | Production Conditions for Structured Catalyst for Oxidation for Exhaust Gas Purification | | | | | | Structured Catalyst for Oxidation for Exhaust Gas Purification | | | | | |
|---|---|---|---|---|---|---|---|---|---|---|---|---|---|
| | | Precursor Material (A) | | Addition to Precursor Material (A) | Hydrothermal Treatment Conditions using Precursor Material (C) | | | Support Zeolite-Type Compound | | Oxidation Catalyst Metal Oxide Nanoparticles | | Performance Evaluation | |
| No. | type | Pore Diameter (nm) | Presence or Absence of Additives | Conversion Ratio of Added Amount of Metal-containing Solution (ratio of number of atoms) Si/M | Type of Structural Directing Agent | pH | Time (h) | Framework | Average Inner Diameter of Channels $D_F$ (nm) | Type | Average Particle Size $D_C$ (nm) | $D_C/D_F$ | Catalytic Activity | durability |
| Example 1046 | | | | 500 | | | | | | | 0.24 | 0.4 | C | C |
| Example 1047 | | | | 200 | | | | | | | 0.41 | 0.7 | B | C |
| Example 1048 | | | | 100 | | | | | | | 0.81 | 1.4 | A | B |
| Example 1049 | | 1.5 | | | | | | | | | 1.22 | 2.1 | A | B |
| Example 1050 | | 1.8 | | | | | | | | | 1.47 | 2.6 | A | B |
| Example 1051 | | 2.0 | | | | | | | | | 1.63 | 2.9 | B | A |
| Example 1052 | | 2.5 | | | | | | | | | 2.04 | 3.6 | B | A |
| Example 1053 | | 5.1 | | | | | | | | | 4.07 | 7.1 | C | A |
| Example 1054 | SBA-1 | 10.2 | | | | | | | | | 8.14 | 14.3 | A | A |
| Example 1055 | | 15.3 | | | | | | | | | 12.21 | 21.4 | C | A |
| Example 1056 | | 20.4 | | | | | | | | | 16.29 | 28.6 | C | A |

TABLE 23

| No. | Precursor Material (A) Type | Precursor Material (A) Pore Diameter (nm) | Addition to Precursor Material (A) Presence or Absence of Additives | Conversion Ratio of Added Amount of Metal-containing Solution (ratio of number of atoms) Si/M | Hydrothermal Treatment Conditions using Precursor Material (C) Type of Structural Directing Agent | pH | Time (h) | Support Zeolite-Type Compound Framework | Average Inner Diameter of Channels $D_F$ (nm) | Metal Oxide Nanoparticles Type | Average Particle Size $D_C$ (nm) | $D_C/D_F$ | Catalytic Activity | Durability |
|---|---|---|---|---|---|---|---|---|---|---|---|---|---|---|
| Example 1057 | MCM-41 | 1.3 | Yes | 1000 | TEABr | 12 | 120 | FAU | 0.74 | Cu | 0.11 | 0.1 | C | C |
| Example 1058 | | | | 500 | | | | | | | 0.32 | 0.4 | C | C |
| Example 1059 | | | | 200 | | | | | | | 0.53 | 0.7 | B | C |
| Example 1060 | | | | 100 | | | | | | | 1.06 | 1.4 | A | B |
| Example 1061 | | 2.0 | | | | | | | | | 1.59 | 2.1 | A | B |
| Example 1062 | | 2.4 | | | | | | | | | 1.90 | 2.6 | A | A |
| Example 1063 | | 2.6 | | | | | | | | | 2.11 | 2.9 | A | A |
| Example 1064 | | 3.3 | | | | | | | | | 2.64 | 3.6 | A | A |
| Example 1065 | | 6.6 | | | | | | | | | 5.29 | 7.1 | B | A |
| Example 1066 | SBA-1 | 13.2 | | | | | | | | | 10.57 | 14.3 | B | A |
| Example 1067 | | 19.8 | | | | | | | | | 15.86 | 21.4 | C | A |
| Example 1068 | | 26.4 | | | | | | | | | 21.14 | 28.6 | C | A |
| Example 1069 | MCM-41 | 1.3 | None | 1000 | | | | | | | 0.11 | 0.1 | C | C |
| Example 1070 | | | | 500 | | | | | | | 0.32 | 0.4 | C | C |
| Example 1071 | | | | 200 | | | | | | | 0.53 | 0.7 | B | C |
| Example 1072 | | | | 100 | | | | | | | 1.06 | 1.4 | A | B |
| Example 1073 | | 2.0 | | | | | | | | | 1.59 | 2.1 | A | B |
| Example 1074 | | 2.4 | | | | | | | | | 1.90 | 2.6 | A | A |
| Example 1075 | | 2.6 | | | | | | | | | 2.11 | 2.9 | B | A |
| Example 1076 | | 3.3 | | | | | | | | | 2.64 | 3.6 | B | A |
| Example 1077 | | 6.6 | | | | | | | | | 5.29 | 7.1 | C | A |
| Example 1078 | SBA-1 | 13.2 | | | | | | | | | 10.57 | 14.3 | C | A |
| Example 1079 | | 19.8 | | | | | | | | | 15.86 | 21.4 | C | A |
| Example 1080 | | 26.4 | | | | | | | | | 21.14 | 28.6 | C | A |
| Example 1081 | MCM-41 | 1.1 | Yes | 1000 | | 11 | 72 | MTW | 0.61 | | 0.09 | 0.1 | C | C |
| Example 1082 | | | | 500 | | | | | | | 0.26 | 0.4 | C | C |
| Example 1083 | | | | 200 | | | | | | | 0.44 | 0.7 | B | B |
| Example 1084 | | | | 100 | | | | | | | 0.87 | 1.4 | A | B |
| Example 1085 | | 1.6 | | | | | | | | | 1.31 | 2.1 | A | B |
| Example 1086 | | 2.0 | | | | | | | | | 1.57 | 2.6 | A | B |
| Example 1087 | | 2.2 | | | | | | | | | 1.74 | 2.9 | A | A |
| Example 1088 | | 2.7 | | | | | | | | | 2.18 | 3.6 | A | A |
| Example 1089 | | 5.4 | | | | | | | | | 4.36 | 7.1 | B | A |
| Example 1090 | SBA-1 | 10.9 | | | | | | | | | 8.71 | 14.3 | B | A |
| Example 1091 | | 16.3 | | | | | | | | | 13.07 | 21.4 | C | A |
| Example 1092 | | 21.8 | | | | | | | | | 17.43 | 28.6 | C | A |

TABLE 23-continued

Structured Catalyst for Oxidation for Exhaust Gas Purification

| | Production Conditions for Structured Catalyst for Oxidation for Exhaust Gas Purification | | | | | | | | Structured Catalyst for Oxidation for Exhaust Gas Purification | | | | | |
|---|---|---|---|---|---|---|---|---|---|---|---|---|---|---|
| | Precursor Material (A) | | Addition to Precursor Material (A) | | Hydrothermal Treatment Conditions using Precursor Material (C) | | | | Support Zeolite-Type Compound | | Oxidation Catalyst Metal Oxide Nanoparticles | | Performance Evaluation | |
| | | | Conversion Ratio of | | | | | | | Average Inner | | Average | | |
| | | Pore | Presence or | Metal-containing | Type of | | | | | Diameter of | | Particle Size | | |
| | | Diameter | Absence of | Solution (ratio of | Structural | | | Time | | Channels $D_F$ | | $D_C$ | | Catalytic |
| No. | Type | (nm) | Additives | number of atoms) Si/M | Directing Agent | pH | | (h) | Framework | (nm) | Type | (nm) | $D_C/D_F$ | Activity | Durability |
| Example 1093 | MCM-41 | 1.1 | None | 1000 | | | | | | | | 0.09 | 0.1 | C | C |
| Example 1094 | | | | 500 | | | | | | | | 0.26 | 0.4 | C | C |
| Example 1095 | | | | 200 | | | | | | | | 0.44 | 0.7 | B | C |
| Example 1096 | | | | 100 | | | | | | | | 0.87 | 1.4 | A | B |
| Example 1097 | | 1.6 | | | | | | | | | | 1.31 | 2.1 | A | B |
| Example 1098 | | 2.0 | | | | | | | | | | 1.57 | 2.6 | A | B |
| Example 1099 | | 2.2 | | | | | | | | | | 1.74 | 2.9 | B | A |
| Example 1100 | | 2.7 | | | | | | | | | | 2.18 | 3.6 | B | A |
| Example 1101 | | 5.4 | | | | | | | | | | 4.36 | 7.1 | C | A |
| Example 1102 | SBA-1 | 10.9 | | | | | | | | | | 8.71 | 14.3 | C | A |
| Example 1103 | | 16.3 | | | | | | | | | | 13.07 | 21.4 | C | A |
| Example 1104 | | 21.8 | | | | | | | | | | 17.43 | 28.6 | C | A |

TABLE 24

| No. | Precursor Material (A) Type | Precursor Material (A) Pore Diameter (nm) | Addition to Precursor Material (A): Presence or Absence of Additives | Conversion Ratio of Added Amount of Metal-containing Solution (ratio of number of atoms) Si/M | Hydrothermal Treatment Conditions using Precursor Material (C): Type of Structural Directing Agent | pH | Time (h) | Zeolite-Type Compound Framework | Support Average Inner Diameter of Channels $D_F$ (nm) | Oxidation Catalyst Metal Oxide Nanoparticles Type | Average Particle Size $D_C$ (nm) | $D_C/D_F$ | Catalytic Activity | Durability |
|---|---|---|---|---|---|---|---|---|---|---|---|---|---|---|
| Example 1105 | MCM-41 | 1.0 | Yes | 1000 | TPABr | 12 | 72 | MFI | 0.56 | Cu | 0.08 | 0.1 | C | C |
| Example 1106 | | | | 500 | | | | | | | 0.24 | 0.4 | C | C |
| Example 1107 | | | | 200 | | | | | | | 0.40 | 0.7 | B | C |
| Example 1108 | | | | 100 | | | | | | | 0.80 | 1.4 | A | B |
| Example 1109 | | 1.5 | | | | | | | | | 1.20 | 2.1 | A | B |
| Example 1110 | | 1.8 | | | | | | | | | 1.44 | 2.6 | A | A |
| Example 1111 | | 2.0 | | | | | | | | | 1.60 | 2.9 | A | A |
| Example 1112 | | 2.5 | | | | | | | | | 2.00 | 3.6 | A | A |
| Example 1113 | | 5.0 | | | | | | | | | 4.00 | 7.1 | B | A |
| Example 1114 | SBA-1 | 10.0 | | | | | | | | | 8.00 | 14.3 | B | A |
| Example 1115 | | 15.0 | | | | | | | | | 12.00 | 21.4 | C | A |
| Example 1116 | | 20.0 | | | | | | | | | 16.00 | 28.6 | C | A |
| Example 1117 | MCM-41 | 1.0 | None | | | | | | | | 0.08 | 0.1 | C | C |
| Example 1118 | | | | 1000 | | | | | | | 0.24 | 0.4 | C | C |
| Example 1119 | | | | 500 | | | | | | | 0.40 | 0.7 | B | C |
| Example 1120 | | | | 200 | | | | | | | 0.80 | 1.4 | A | B |
| Example 1121 | | 1.5 | | 100 | | | | | | | 1.20 | 2.1 | A | B |
| Example 1122 | | 1.8 | | | | | | | | | 1.44 | 2.6 | A | A |
| Example 1123 | | 2.0 | | | | | | | | | 1.60 | 2.9 | B | A |
| Example 1124 | | 2.5 | | | | | | | | | 2.00 | 3.6 | B | A |
| Example 1125 | | 5.0 | | | | | | | | | 4.00 | 7.1 | B | A |
| Example 1126 | SBA-1 | 10.0 | | | | | | | | | 8.00 | 14.3 | C | A |
| Example 1127 | | 15.0 | | | | | | | | | 12.00 | 21.4 | C | A |
| Example 1128 | | 20.0 | | | | | | | | | 16.00 | 28.6 | C | C |
| Example 1129 | MCM-41 | 1.0 | Yes | 1000 | TMABr | 12 | 120 | FER | 0.57 | | 0.08 | 0.1 | C | C |
| Example 1130 | | | | 500 | | | | | | | 0.24 | 0.4 | C | C |
| Example 1131 | | | | 200 | | | | | | | 0.41 | 0.7 | B | C |
| Example 1132 | | | | 100 | | | | | | | 0.81 | 1.4 | A | B |
| Example 1133 | | 1.5 | | | | | | | | | 1.22 | 2.1 | A | B |
| Example 1134 | | 1.8 | | | | | | | | | 1.47 | 2.6 | A | A |
| Example 1135 | | 2.0 | | | | | | | | | 1.63 | 2.9 | A | A |
| Example 1136 | | 2.5 | | | | | | | | | 2.04 | 3.6 | A | A |
| Example 1137 | | 5.1 | | | | | | | | | 4.07 | 7.1 | B | A |
| Example 1138 | SBA-1 | 10.2 | | | | | | | | | 8.14 | 14.3 | B | A |
| Example 1139 | | 15.3 | | | | | | | | | 12.21 | 21.4 | C | A |
| Example 1140 | | 20.4 | | | | | | | | | 16.29 | 28.6 | C | A |
| Example 1141 | MCM-41 | 1.0 | None | 1000 | | | | | | | 0.08 | 0.1 | C | C |

TABLE 24-continued

Structured Catalyst for Oxidation for Exhaust Gas Purification

| No. | Precursor Material (A) Type | Precursor Material (A) Pore Diameter (nm) | Presence or Absence of Additives | Conversion Ratio of Added Amount of Metal-containing Solution (ratio of number of atoms) Si/M | Type of Structural Directing Agent | pH | Time (h) | Framework | Average Inner Diameter of Channels $D_F$ (nm) | Type | Average Particle Size $D_C$ (nm) | $D_C/D_F$ | Catalytic Activity | Durability |
|---|---|---|---|---|---|---|---|---|---|---|---|---|---|---|
| Example 1142 | SBA-1 | | | 500 | | | | | | | 0.24 | 0.4 | C | C |
| Example 1143 | | | | 200 | | | | | | | 0.41 | 0.7 | B | C |
| Example 1144 | | | | 100 | | | | | | | 0.81 | 1.4 | A | B |
| Example 1145 | | 1.5 | | | | | | | | | 1.22 | 2.1 | A | B |
| Example 1146 | | 1.8 | | | | | | | | | 1.47 | 2.6 | A | B |
| Example 1147 | | 2.0 | | | | | | | | | 1.63 | 2.9 | B | A |
| Example 1148 | | 2.5 | | | | | | | | | 2.04 | 3.6 | B | A |
| Example 1149 | | 5.1 | | | | | | | | | 4.07 | 7.1 | C | A |
| Example 1150 | | 10.2 | | | | | | | | | 8.14 | 14.3 | C | A |
| Example 1151 | | 15.3 | | | | | | | | | 12.21 | 21.4 | C | A |
| Example 1152 | | 20.4 | | | | | | | | | 16.29 | 28.6 | C | A |
| Comparative Example 3 | | | | — | | | | MFI type silicalite | 0.56 | Co | ≤50 | ≤67.6 | C | D |

TABLE 25

| | Production Conditions for Structured Catalyst for Oxidation for Exhaust Gas Purification | | | | | | | Structured Catalyst for Oxidation for Exhaust Gas Purification | | | | | |
|---|---|---|---|---|---|---|---|---|---|---|---|---|---|
| | Precursor Material (A) | | Addition to Precursor Material (A) | | Hydrothermal Treatment Conditions using Precursor Material (C) | | | Support | | Oxidation Catalyst Metal Oxide Nanoparticles | | Performance Evaluation | |
| | | | Conversion Ratio of Metal-containing | Added Amount of Structural | | | | Zeolite-Type Compound | Average Inner | | Average | | |
| No. | Type | Pore Diameter (nm) | Presence or Absence of Additives | Solution (ratio of number of atoms) Si/M | Type of Directing Agent | pH | Time (h) | Framework | Diameter of Channels $D_F$ (nm) | Type | Particle Size $D_C$ (nm) | $D_C/D_F$ | Catalytic Activity | Durability |
| Example 1153 | MCM-41 | 1.3 | Yes | 1000 | TEABr | 12 | 120 | FAU | 0.74 | Pt | 0.11 | 0.1 | C | C |
| Example 1154 | | | | 500 | | | | | | | 0.32 | 0.4 | C | C |
| Example 1155 | | | | 200 | | | | | | | 0.53 | 0.7 | B | C |
| Example 1156 | | | | 100 | | | | | | | 1.06 | 1.4 | A | B |
| Example 1157 | | 2.0 | | | | | | | | | 1.59 | 2.1 | A | B |
| Example 1158 | | 2.4 | | | | | | | | | 1.90 | 2.6 | A | A |
| Example 1159 | | 2.6 | | | | | | | | | 2.11 | 2.9 | A | A |
| Example 1160 | | 3.3 | | | | | | | | | 2.64 | 3.6 | A | A |
| Example 1161 | | 6.6 | | | | | | | | | 5.29 | 7.1 | B | A |
| Example 1162 | SBA-1 | 13.2 | | | | | | | | | 10.57 | 14.3 | B | A |
| Example 1163 | | 19.8 | | | | | | | | | 15.86 | 21.4 | C | A |
| Example 1164 | | 26.4 | | | | | | | | | 21.14 | 28.6 | C | C |
| Example 1165 | MCM-41 | 1.3 | None | 1000 | | | | | | | 0.11 | 0.1 | C | C |
| Example 1166 | | | | 500 | | | | | | | 0.32 | 0.4 | C | C |
| Example 1167 | | | | 200 | | | | | | | 0.53 | 0.7 | B | B |
| Example 1168 | | | | 100 | | | | | | | 1.06 | 1.4 | A | B |
| Example 1169 | | 2.0 | | | | | | | | | 1.59 | 2.1 | A | A |
| Example 1170 | | 2.4 | | | | | | | | | 1.90 | 2.6 | A | B |
| Example 1171 | | 2.6 | | | | | | | | | 2.11 | 2.9 | B | A |
| Example 1172 | | 3.3 | | | | | | | | | 2.64 | 3.6 | B | A |
| Example 1173 | | 6.6 | | | | | | | | | 5.29 | 7.1 | C | A |
| Example 1174 | SBA-1 | 13.2 | | | | | | | | | 10.57 | 14.3 | A | A |
| Example 1175 | | 19.8 | | | | | | | | | 15.86 | 21.4 | A | A |
| Example 1176 | | 26.4 | | | | | | | | | 21.14 | 28.6 | C | C |
| Example 1177 | MCM-41 | 1.1 | Yes | 1000 | | 11 | 72 | MTW | 0.61 | | 0.09 | 0.1 | C | C |
| Example 1178 | | | | 500 | | | | | | | 0.26 | 0.4 | C | C |
| Example 1179 | | | | 200 | | | | | | | 0.44 | 0.7 | B | B |
| Example 1180 | | | | 100 | | | | | | | 0.87 | 1.4 | A | B |
| Example 1181 | | 1.6 | | | | | | | | | 1.31 | 2.1 | A | A |
| Example 1182 | | 2.0 | | | | | | | | | 1.57 | 2.6 | A | B |
| Example 1183 | | 2.2 | | | | | | | | | 1.74 | 2.9 | A | A |
| Example 1184 | | 2.7 | | | | | | | | | 2.18 | 3.6 | A | A |
| Example 1185 | | 5.4 | | | | | | | | | 4.36 | 7.1 | B | A |
| Example 1186 | SBA-1 | 10.9 | | | | | | | | | 8.71 | 14.3 | B | A |
| Example 1187 | | 16.3 | | | | | | | | | 13.07 | 21.4 | C | A |
| Example 1188 | | 21.8 | | | | | | | | | 17.43 | 28.6 | C | A |
| Example 1189 | MCM-41 | 1.1 | None | 1000 | | | | | | | 0.09 | 0.1 | C | C |

TABLE 25-continued

| | Production Conditions for Structured Catalyst for Oxidation for Exhaust Gas Purification | | | | | | | Structured Catalyst for Oxidation for Exhaust Gas Purification | | | | | | |
|---|---|---|---|---|---|---|---|---|---|---|---|---|---|---|
| | Precursor Material (A) | | Addition to Precursor Material (A) | | Hydrothermal Treatment Conditions using Precursor Material (C) | | | Support | | | Oxidation Catalyst Metal Oxide Nanoparticles | | Performance Evaluation | |
| | | | Conversion Ratio of Added Amount of Metal-containing | | | | | Zeolite-Type Compound | Average Inner Diameter of | | Average Particle Size | | | |
| No. | Type | Pore Diameter (nm) | Presence or Absence of Additives | Solution (ratio of number of atoms) Si/M | Type of Structural Directing Agent | pH | Time (h) | Framework | Channels $D_F$ (nm) | Type | $D_C$ (nm) | $D_C/D_F$ | Catalytic Activity | Durability |
| Example 1190 | | | | 500 | | | | | | | 0.26 | 0.4 | C | C |
| Example 1191 | | | | 200 | | | | | | | 0.44 | 0.7 | B | C |
| Example 1192 | | | | 100 | | | | | | | 0.87 | 1.4 | A | B |
| Example 1193 | | 1.6 | | | | | | | | | 1.31 | 2.1 | A | B |
| Example 1194 | | 2.0 | | | | | | | | | 1.57 | 2.6 | A | B |
| Example 1195 | | 2.2 | | | | | | | | | 1.74 | 2.9 | B | A |
| Example 1196 | | 2.7 | | | | | | | | | 2.18 | 3.6 | B | A |
| Example 1197 | | 5.4 | | | | | | | | | 4.36 | 7.1 | C | A |
| Example 1198 | SBA-1 | 10.9 | | | | | | | | | 8.71 | 14.3 | C | A |
| Example 1199 | | 16.3 | | | | | | | | | 13.07 | 21.4 | C | A |
| Example 1200 | | 21.8 | | | | | | | | | 17.43 | 28.6 | C | A |

TABLE 26

| No. | Precursor Material (A) Type | Precursor Material (A) Pore Diameter (nm) | Addition to Precursor Material (A) Presence or Absence of Additives | Conversion Ratio of Metal-containing Solution (ratio of number of atoms) Si/M | Hydrothermal Treatment Conditions using Precursor Material (C) Type of Structural Directing Agent | pH | Time (h) | Support Zeolite-Type Framework | Support Average Inner Diameter of Channels $D_F$ (nm) | Metal Oxide Nanoparticles type | Metal Oxide Nanoparticles Average Particle Size $D_C$ (nm) | $D_C/D_F$ | Performance Evaluation Catalytic Activity | Performance Evaluation Durability |
|---|---|---|---|---|---|---|---|---|---|---|---|---|---|---|
| Example 1201 | MCM-41 | 1.0 | Yes | 1000 | TPABr | 12 | 72 | MFI | 0.56 | Pt | 0.08 | 0.1 | C | C |
| Example 1202 | | | | 500 | | | | | | | 0.24 | 0.4 | C | C |
| Example 1203 | | | | 200 | | | | | | | 0.40 | 0.7 | B | C |
| Example 1204 | | | | 100 | | | | | | | 0.80 | 1.4 | A | B |
| Example 1205 | | 1.5 | | | | | | | | | 1.20 | 2.1 | A | B |
| Example 1206 | | 1.8 | | | | | | | | | 1.44 | 2.6 | A | A |
| Example 1207 | | 2.0 | | | | | | | | | 1.60 | 2.9 | A | A |
| Example 1208 | | 2.5 | | | | | | | | | 2.00 | 3.6 | A | A |
| Example 1209 | | 5.0 | | | | | | | | | 4.00 | 7.1 | B | A |
| Example 1210 | SBA-1 | 10.0 | | | | | | | | | 8.00 | 14.3 | B | A |
| Example 1211 | | 15.0 | | | | | | | | | 12.00 | 21.4 | C | A |
| Example 1212 | | 20.0 | | | | | | | | | 16.00 | 28.6 | C | A |
| Example 1213 | MCM-41 | 1.0 | None | 1000 | | | | | | | 0.08 | 0.1 | C | C |
| Example 1214 | | | | 500 | | | | | | | 0.24 | 0.4 | C | C |
| Example 1215 | | | | 200 | | | | | | | 0.40 | 0.7 | B | B |
| Example 1216 | | | | 100 | | | | | | | 0.80 | 1.4 | A | B |
| Example 1217 | | 1.5 | | | | | | | | | 1.20 | 2.1 | A | A |
| Example 1218 | | 1.8 | | | | | | | | | 1.44 | 2.6 | B | A |
| Example 1219 | | 2.0 | | | | | | | | | 1.60 | 2.9 | B | A |
| Example 1220 | | 2.5 | | | | | | | | | 2.00 | 3.6 | B | A |
| Example 1221 | | 5.0 | | | | | | | | | 4.00 | 7.1 | C | A |
| Example 1222 | SBA-1 | 10.0 | | | | | | | | | 8.00 | 14.3 | C | A |
| Example 1223 | | 15.0 | | | | | | | | | 12.00 | 21.4 | C | A |
| Example 1224 | | 20.0 | | | | | | | | | 16.00 | 28.6 | C | A |
| Example 1225 | MCM-41 | 1.0 | Yes | 1000 | TMABr | 12 | 120 | FER | 0.57 | | 0.08 | 0.1 | C | C |
| Example 1226 | | | | 500 | | | | | | | 0.24 | 0.4 | C | C |
| Example 1227 | | | | 200 | | | | | | | 0.41 | 0.7 | B | B |
| Example 1228 | | | | 100 | | | | | | | 0.81 | 1.4 | A | B |
| Example 1229 | | 1.5 | | | | | | | | | 1.22 | 2.1 | A | B |
| Example 1230 | | 1.8 | | | | | | | | | 1.47 | 2.6 | A | A |
| Example 1231 | | 2.0 | | | | | | | | | 1.63 | 2.9 | A | A |
| Example 1232 | | 2.5 | | | | | | | | | 2.04 | 3.6 | A | A |
| Example 1233 | | 5.1 | | | | | | | | | 4.07 | 7.1 | B | A |
| Example 1234 | SBA-1 | 10.2 | | | | | | | | | 8.14 | 14.3 | B | A |
| Example 1235 | | 15.3 | | | | | | | | | 12.21 | 21.4 | C | A |
| Example 1236 | | 20.4 | | | | | | | | | 16.29 | 28.6 | C | A |

TABLE 26-continued

Structured Catalyst for Oxidation for Exhaust Gas Purification

| | Production Conditions for Structured Catalyst for Oxidation for Exhaust Gas Purification | | | | | | | | | | | | | |
|---|---|---|---|---|---|---|---|---|---|---|---|---|---|---|
| | Precursor Material (A) | | Addition to Precursor Material (A) | | Hydrothermal Treatment Conditions using Precursor Material (C) | | | | Support Zeolite-Type Compound | | Oxidation Catalyst Metal Oxide Nanoparticles | | Performance Evaluation | |
| No. | Type | Pore Diameter (nm) | Presence or Absence of Additives | Conversion Ratio of Added Amount of Metal-containing Solution (ratio of number of atoms) Si/M | Type of Structural Directing Agent | pH | Time (h) | Framework | Average Inner Diameter of Channels $D_F$ (nm) | type | Average Particle Size $D_C$ (nm) | $D_C/D_F$ | Catalytic Activity | Durability |
| Example 1237 | MCM-41 | 1.0 | None | 1000 | | | | | | | 0.08 | 0.1 | C | C |
| Example 1238 | | | | 500 | | | | | | | 0.24 | 0.4 | C | C |
| Example 1239 | | | | 200 | | | | | | | 0.41 | 0.7 | B | C |
| Example 1240 | | | | 100 | | | | | | | 0.81 | 1.4 | A | B |
| Example 1241 | | 1.5 | | | | | | | | | 1.22 | 2.1 | A | B |
| Example 1242 | | 1.8 | | | | | | | | | 1.47 | 2.6 | A | B |
| Example 1243 | | 2.0 | | | | | | | | | 1.63 | 2.9 | B | A |
| Example 1244 | | 2.5 | | | | | | | | | 2.04 | 3.6 | B | A |
| Example 1245 | | 5.1 | | | | | | | | | 4.07 | 7.1 | C | A |
| Example 1246 | SBA-1 | 10.2 | | | | | | | | | 8.14 | 14.3 | C | A |
| Example 1247 | | 15.3 | | | | | | | | | 12.21 | 21.4 | C | A |
| Example 1248 | | 20.4 | | | | | | | | | 16.29 | 28.6 | C | A |

As can be seen from Tables 1 to 26, the oxidation catalytic structural bodies for exhaust gas purification (Examples 1 to 1248), in which the presence of the oxidation catalyst held in the support was confirmed by cross-sectional observation, exhibited excellent catalytic activity in both the CO oxidation reaction and propane oxidation reaction, and had excellent durability of catalysts in comparison with the oxidation catalytic structural bodies for exhaust gas purification (Comparative Examples 1 and 3), in which the oxidation catalyst was only adhered to the outer surface of the support.

In addition, the support itself of Comparative Example 2 supporting no oxidation catalyst exhibited little catalytic activity in the CO oxidation reaction and propane oxidation reaction, and both the catalytic activity and the durability were inferior in comparison with the oxidation catalytic structural bodies for exhaust gas purification of Examples 1 to 1248.

On the other hand, the oxidation catalytic structural bodies for exhaust gas purification of Comparative Examples 1 and 3, in which the oxidation catalyst was attached only to the outer surface of the support, exhibited improved catalytic activity in both of the CO oxidation reaction and propane oxidation reaction in comparison with the support of Comparative Example 2 having no oxidation catalyst, but had inferior durability of the catalyst in comparison with the oxidation catalytic structural bodies for exhaust gas purification of Examples 1 to 1248. Note that the structured catalyst for oxidation for exhaust gas purification described above had excellent catalytic activity and excellent durability against oxidation reactions of hazardous substances contained in the exhaust gas from an automobile. Therefore, it was confirmed that the structured catalyst for oxidation for exhaust gas purification described above achieves excellent effects.

Other Embodiments

[A] A method for using a structured catalyst for exhaust gas purification, including:
a support of a porous structure composed of a zeolite-type compound; and
at least one oxidation catalyst present in the support and selected from the group consisting of metals and metal oxides, in which
the support has channels that communicate with each other, and the oxidation catalyst is present at least in the channels of the support.
[B] The method for using a structured catalyst according to [A], in which the exhaust gas is an exhaust gas discharged from an internal combustion engine.
[C] The method for using a structured catalyst according to [A] or [B], in which the internal combustion engine is an automobile engine.

REFERENCE SIGNS LIST

1 Structured catalyst for oxidation for exhaust gas purification
10 Support
10a Outer surface
11 Channel
11a Pore
12 Enlarged pore portion
20 Oxidation catalyst
30 Functional substance
$D_C$ Primary average particle size
$D_F$ Average inner diameter
$D_E$ Inner diameter

What is claimed is:

1. A structured catalyst for oxidation for exhaust gas purification, comprising:
   a support of a porous structure composed of a zeolite-type compound; and
   at least one oxidation catalyst present in the support and selected from the group consisting of metals and metal oxides, wherein
   the support has channels that communicate with each other, and
   the oxidation catalyst is present at least in the channels of the support,
   wherein the metal oxides contain at least one perovskite-type oxide,
   the channels have any one of a one-dimensional pore, a two-dimensional pore, and a three-dimensional pore defined by a framework of the zeolite-type compound and an enlarged pore portion that has a diameter different from any of the one-dimensional pore, the two-dimensional pore, and the three-dimensional pore,
   the oxidation catalyst is present at least in the enlarged pore portion, the oxidation catalyst is made of at least one type of oxidation catalytic nanoparticles selected from the group consisting of metal nanoparticles and metal oxide nanoparticles, and
   an average particle size of the oxidation catalytic nanoparticles is greater than an average inner diameter of the channels.

2. The structured catalyst for oxidation for exhaust gas purification according to claim 1; wherein the enlarged pore portion causes a plurality of pores constituting any one of the one-dimensional pore, the two-dimensional pore, and the three-dimensional pore to communicate with each other.

3. The structured catalyst for oxidation for exhaust gas purification according to claim 1, wherein
   the average particle size of the oxidation catalytic nanoparticles is less than or equal to an inner diameter of the enlarged pore portion.

4. The structured catalyst for oxidation for exhaust gas purification according to claim 3, wherein the oxidation catalytic nanoparticles are made of at least one type of metal selected from the group consisting of cobalt, iron, copper, silver, manganese, nickel, chromium, tin, zinc, titanium, and platinum, and oxides of the metals.

5. The structured catalyst for oxidation for exhaust gas purification according to claim 3, wherein the content of the metal element (M) of the oxidation catalytic nanoparticles is from 0.5 to 2.5 mass % with respect to the oxidation catalyst.

6. The structured catalyst for oxidation for exhaust gas purification according to claim 3, wherein an average particle size of the metal oxide nanoparticles is from 0.1 nm to 50 nm.

7. The structured catalyst for oxidation for exhaust gas purification according to claim 3, wherein the ratio of the average particle size of the metal oxide nanoparticles to the average inner diameter of the channels is from 0.06 to 500.

8. The structured catalyst for oxidation for exhaust gas purification according to claim 3, wherein the average particle size of the metal nanoparticles is from 0.08 nm to 30 nm.

9. The structured catalyst for oxidation for exhaust gas purification according to claim 3, wherein the ratio of the average particle size of the metal nanoparticles to the average inner diameter of the channels is from 0.05 to 300.

10. The structured catalyst for oxidation for exhaust gas purification according to claim 1, further comprising at least another one functional substance held on an outer surface of the support.

11. The structured catalyst for oxidation for exhaust gas purification according to claim 10, wherein the content of the at least one oxidation catalyst present in the support is greater than that of at least the other one functional substance held on the outer surface of the support.

12. An automobile exhaust gas treatment device comprising the structured catalyst for oxidation for exhaust gas purification described in claim 1.

13. A catalytic molding comprising a honeycomb substrate and the structured catalyst for oxidation for exhaust gas purification described in claim 1 on a surface of the honeycomb substrate.

* * * * *